Figure 1:
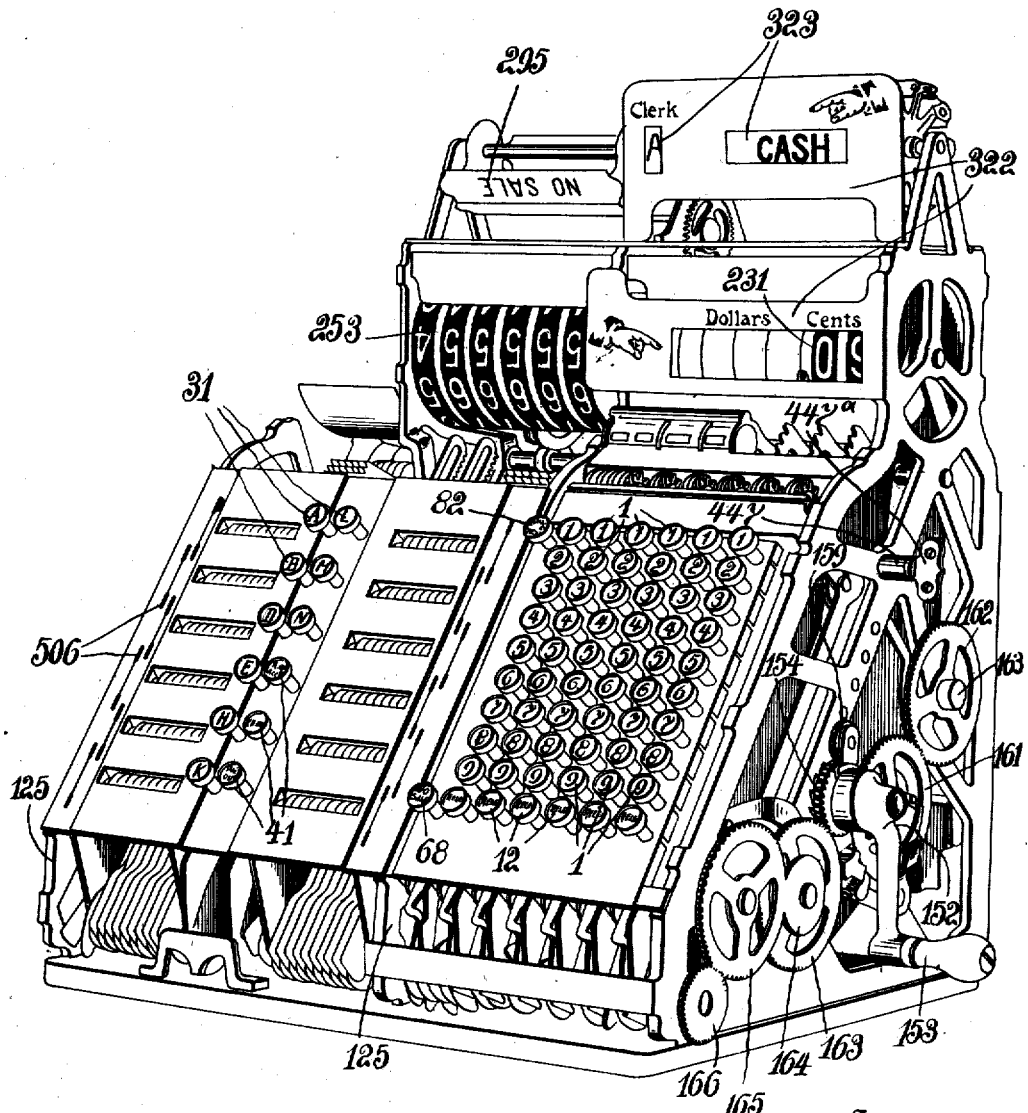

J. P. CLEAL.
CASH REGISTER.
APPLICATION FILED SEPT. 12, 1910.

1,142,079.

Patented June 8, 1915.
31 SHEETS—SHEET 1.

Witnesses
W. M. McCarthy
P. W. Fairchild

Inventor
Joseph P. Cleal
By McKelvey
and Roberts
Attorneys

J. P. CLEAL.
CASH REGISTER.
APPLICATION FILED SEPT 12, 1910.

1,142,079.

Patented June 8, 1915.
31 SHEETS—SHEET 3.

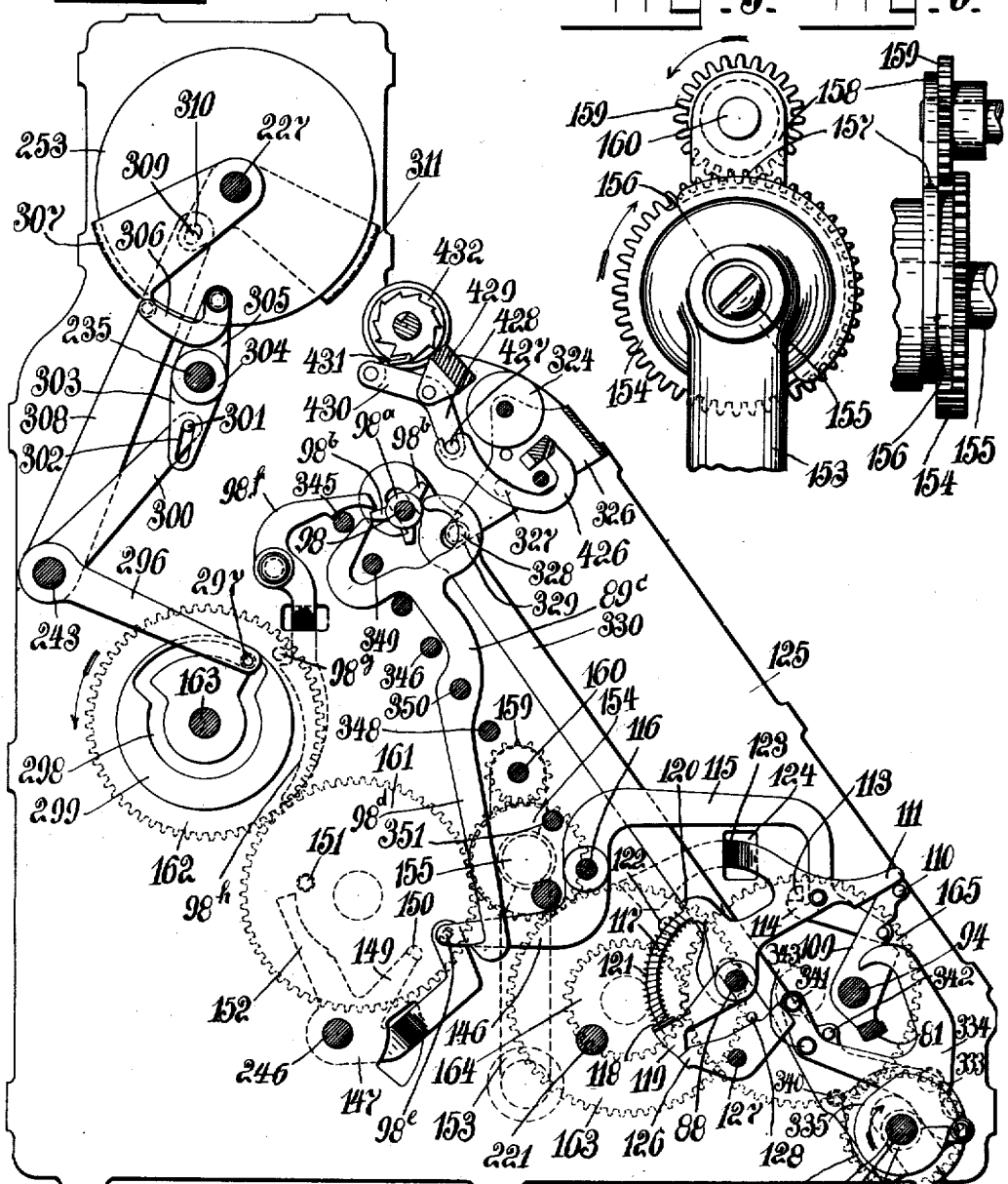

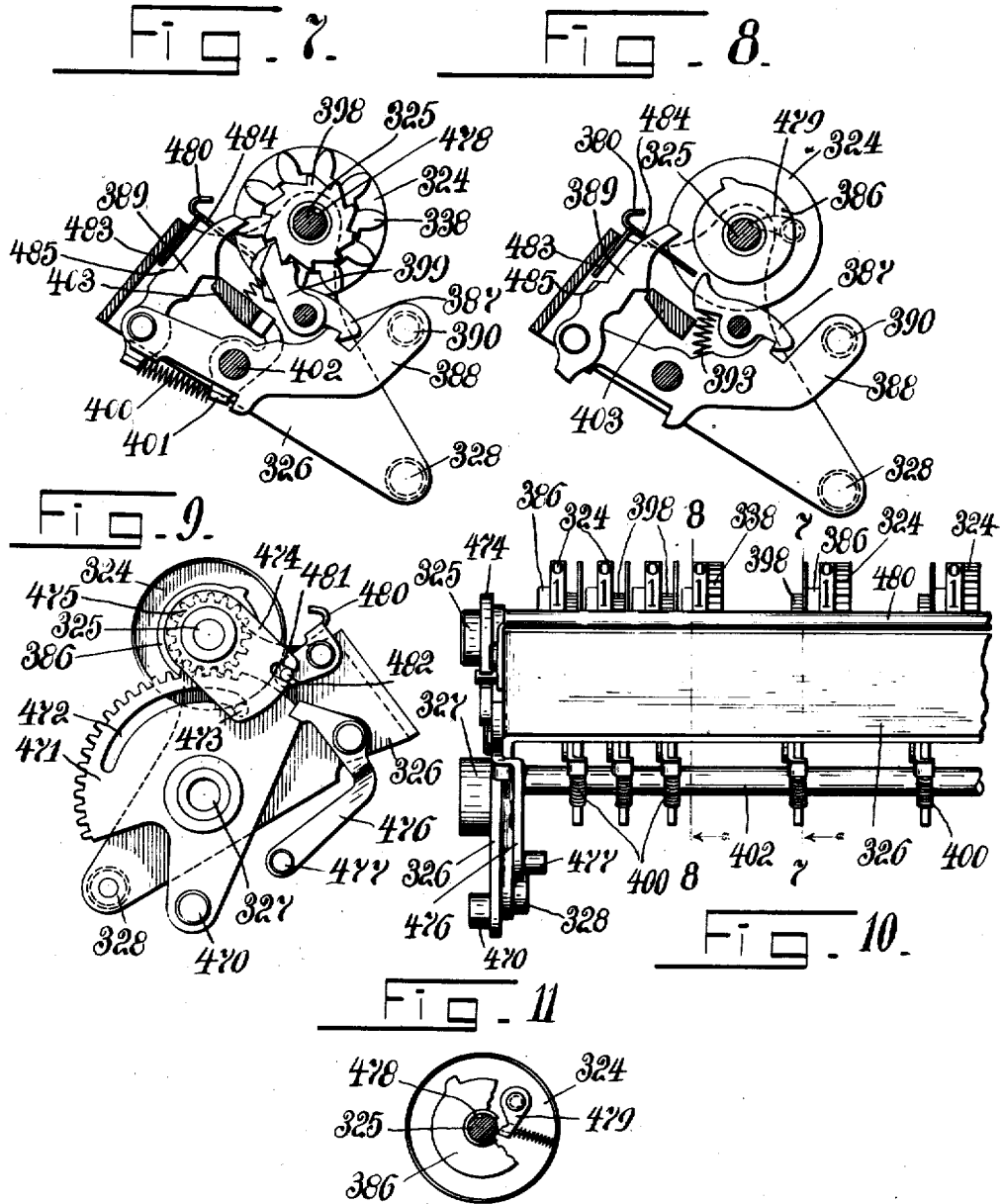

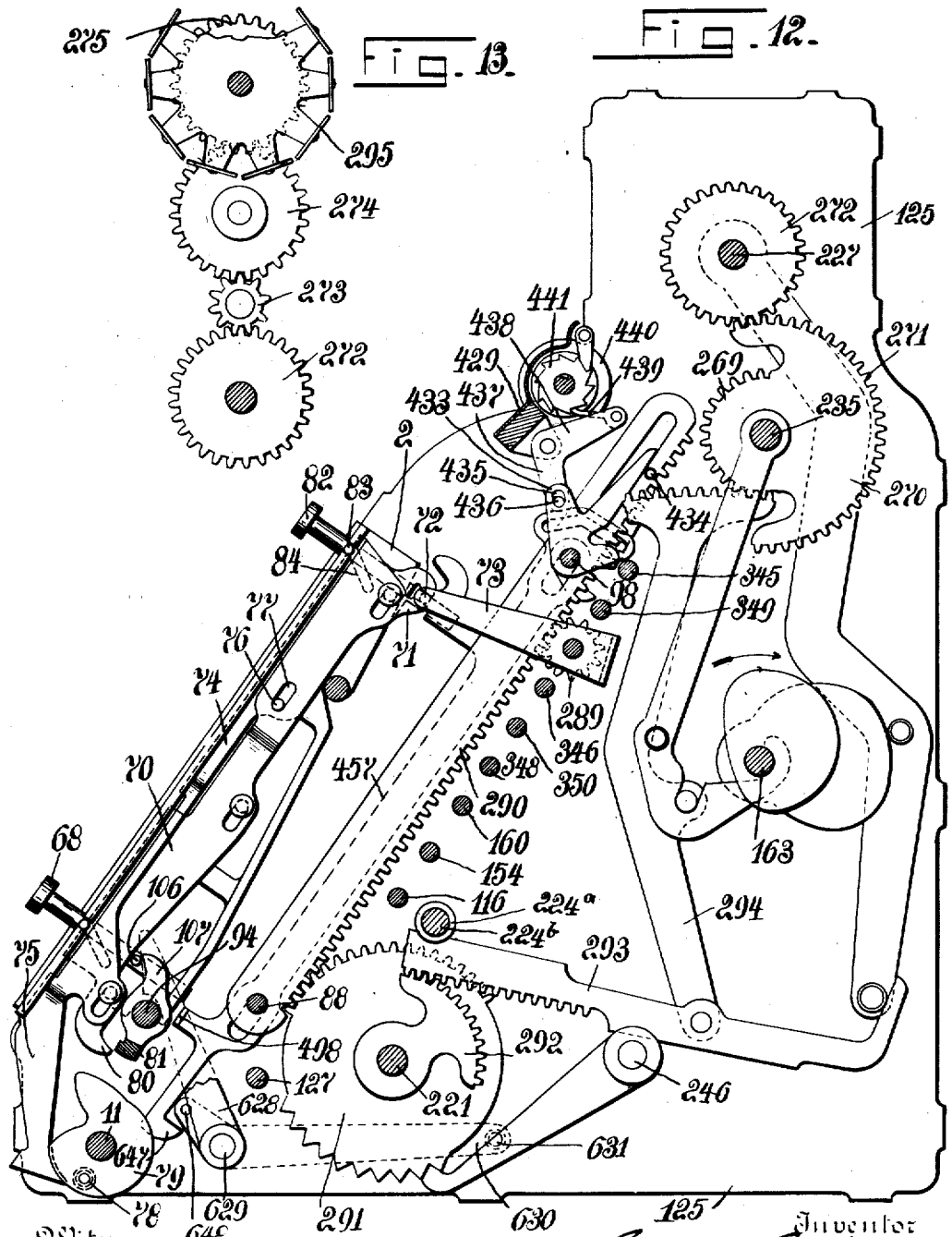

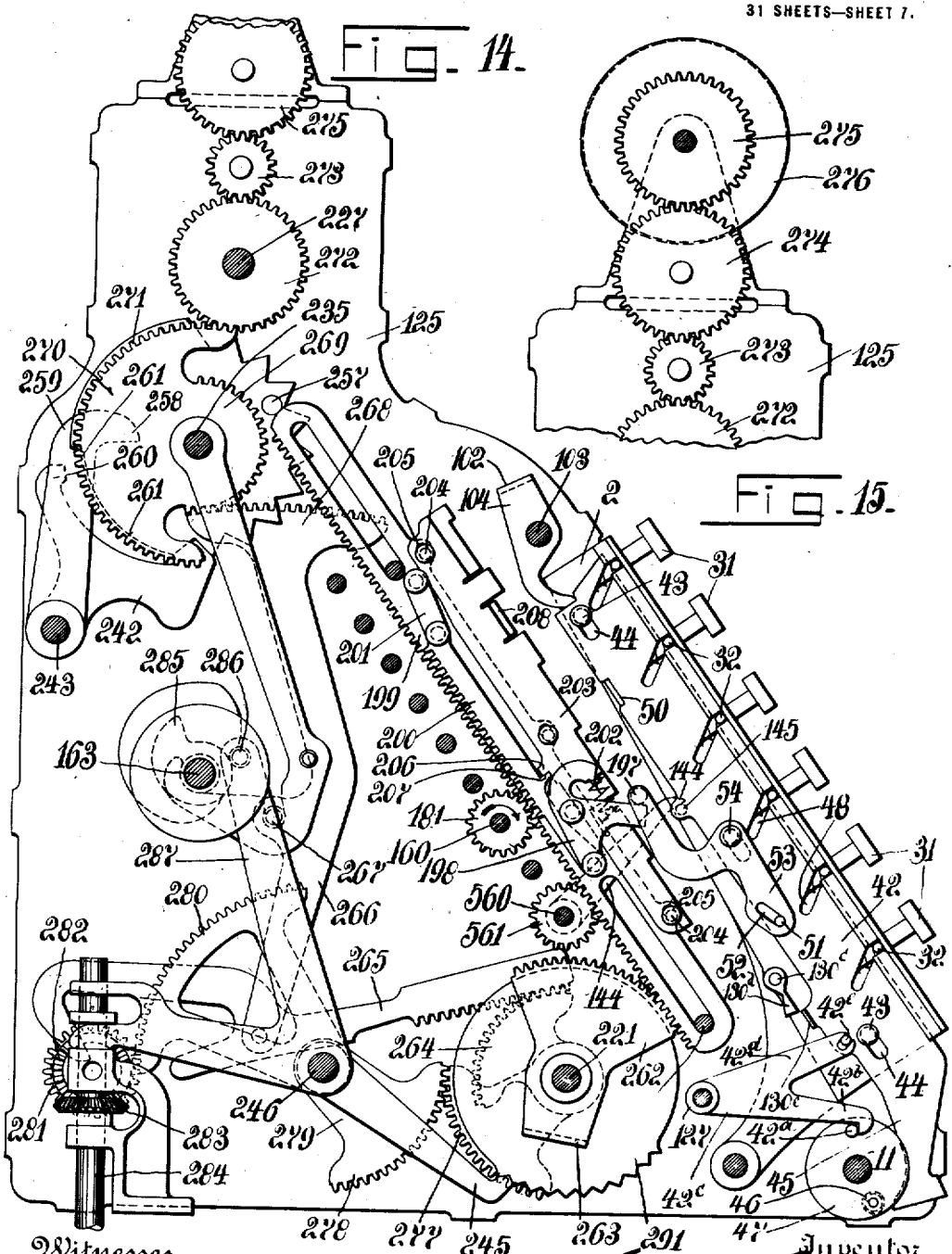

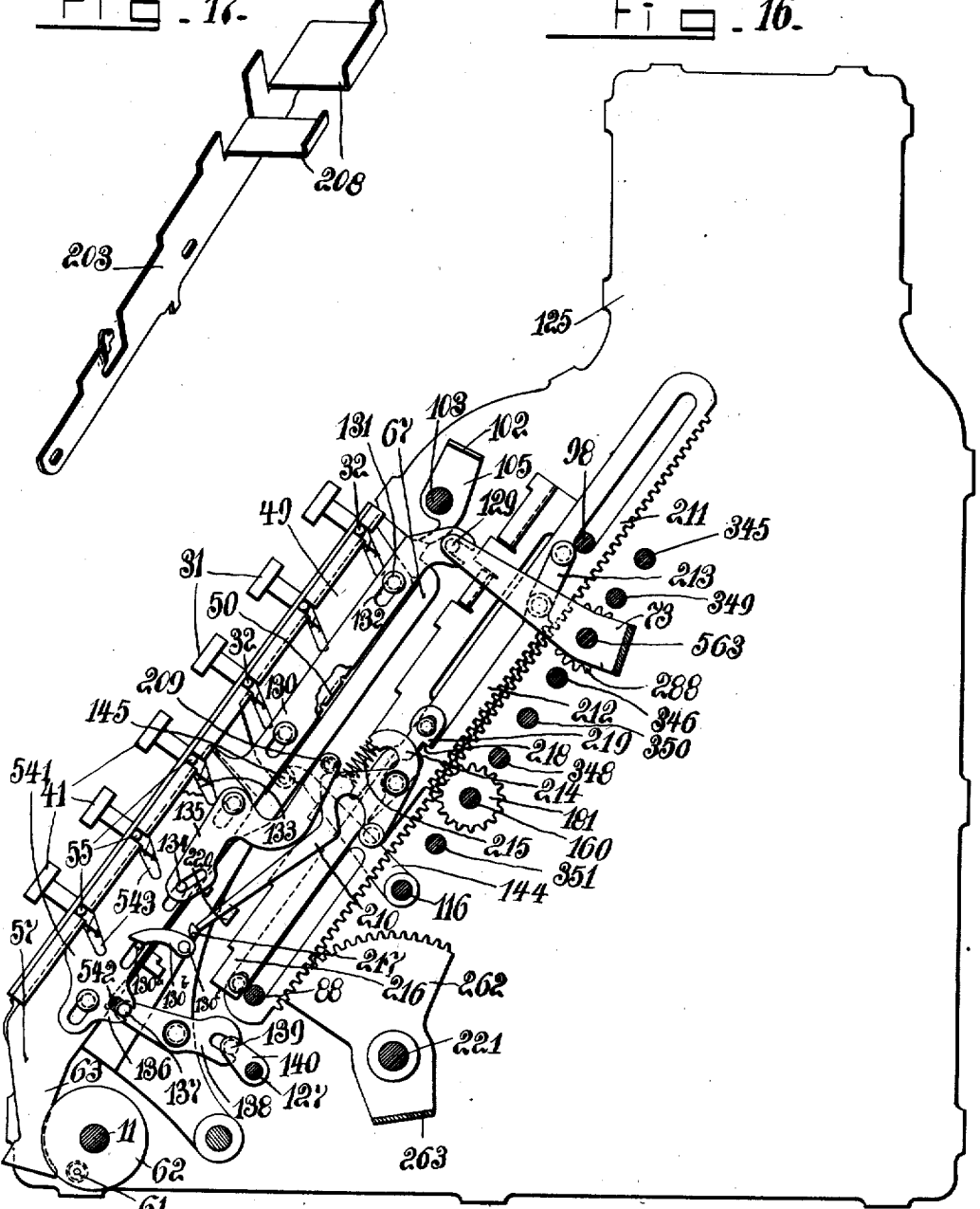

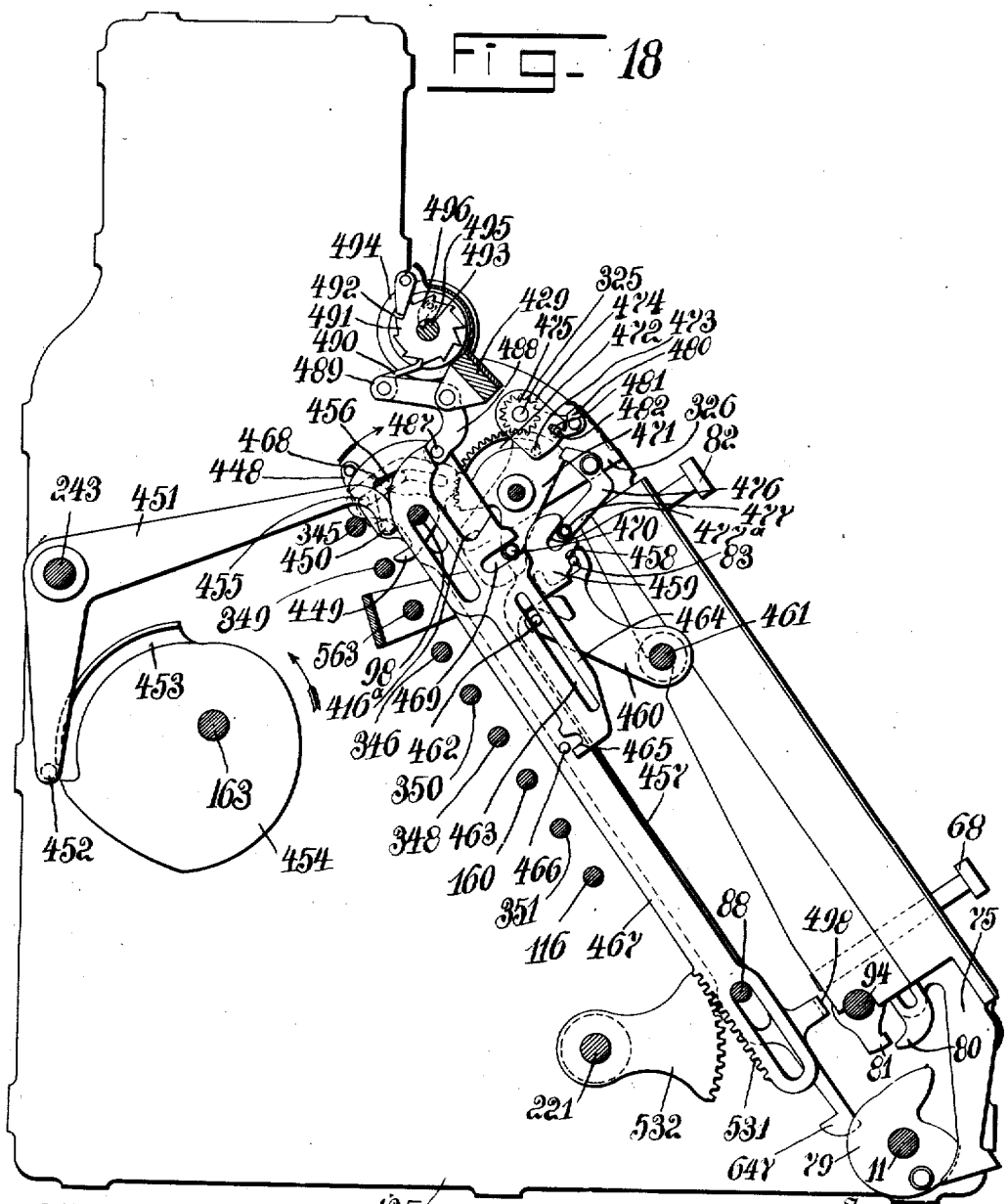

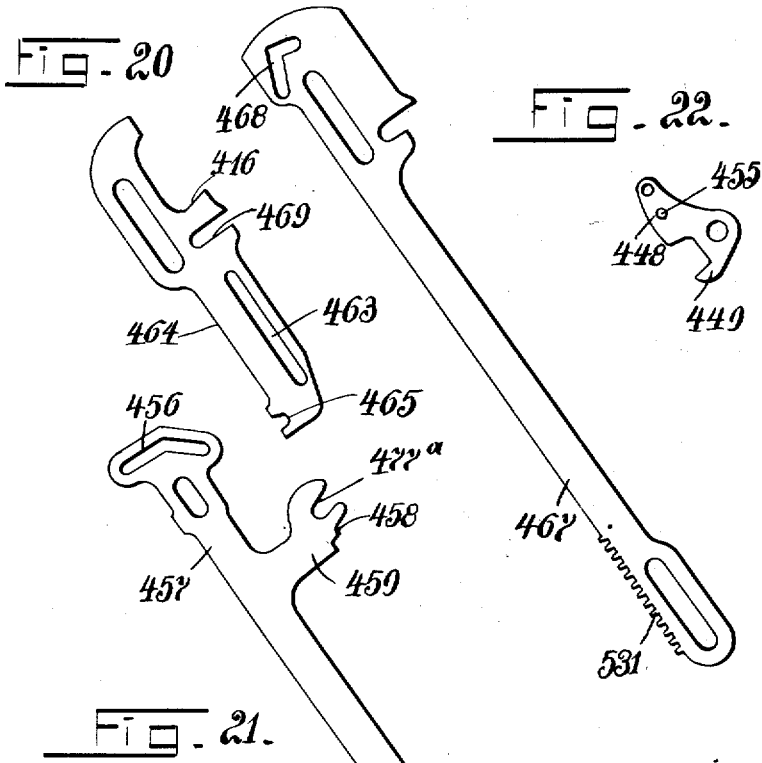

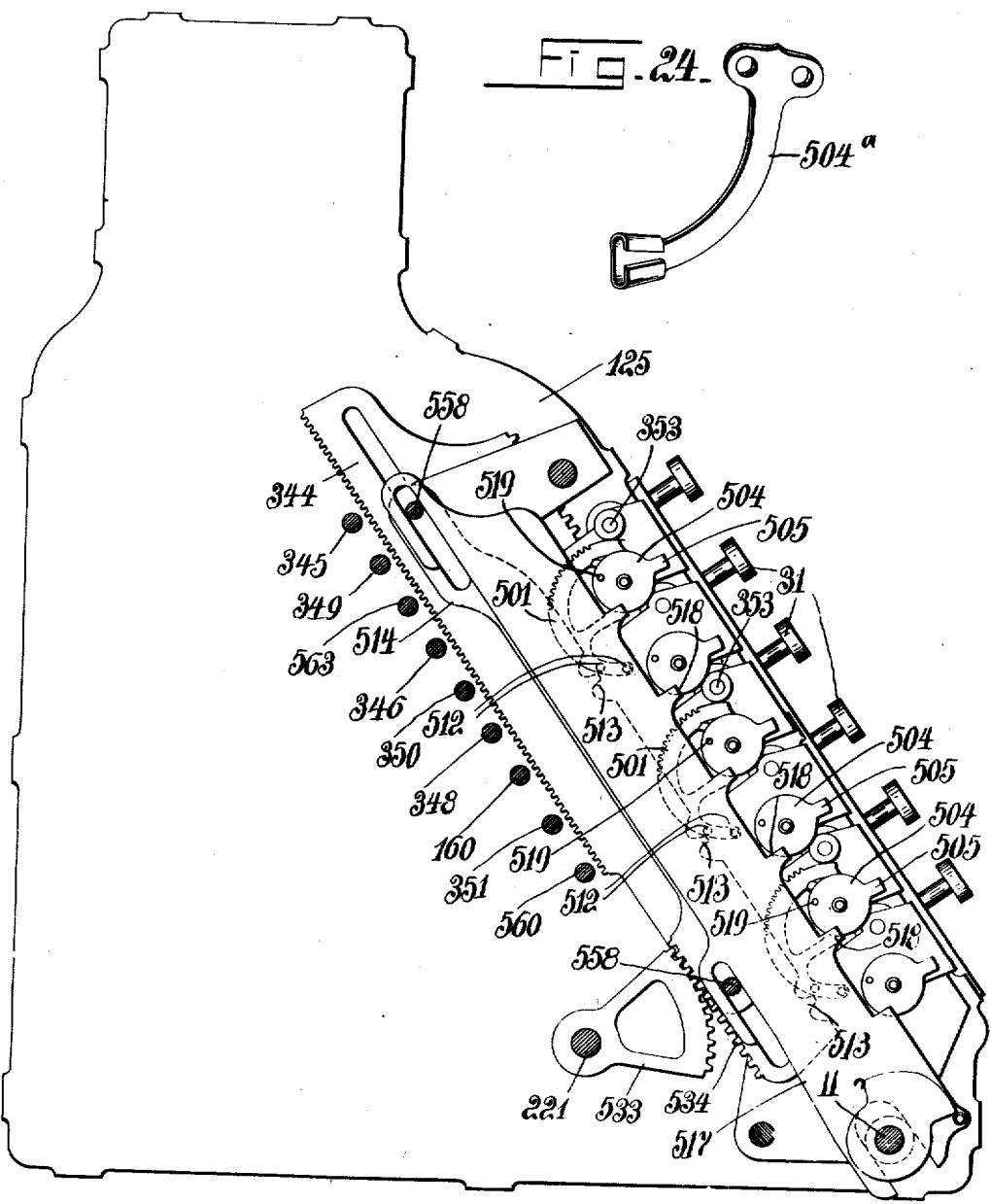

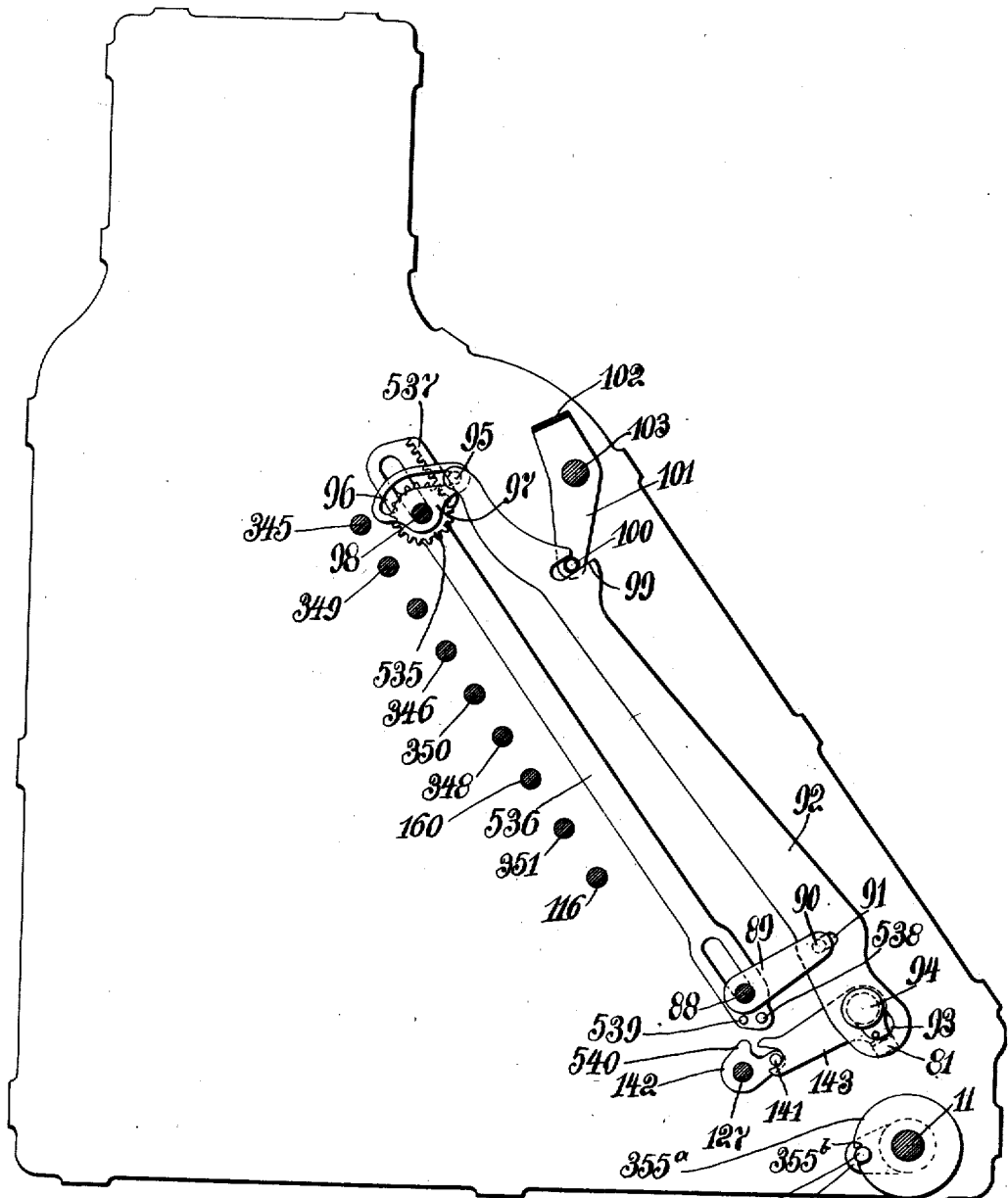

J. P. CLEAL.
CASH REGISTER.
APPLICATION FILED SEPT. 12, 1910.
1,142,079.
Patented June 8, 1915.
31 SHEETS—SHEET 13.
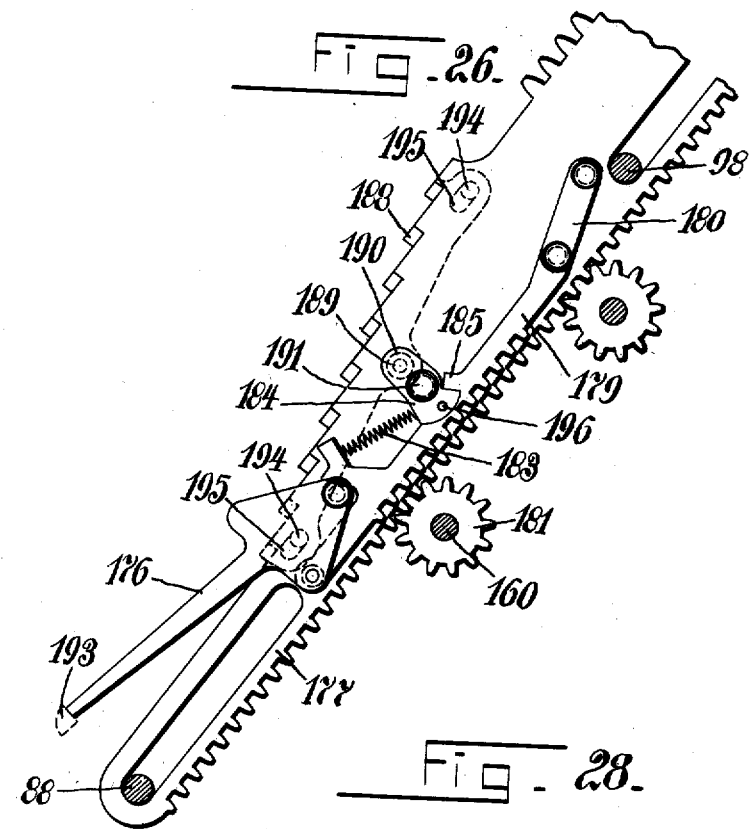
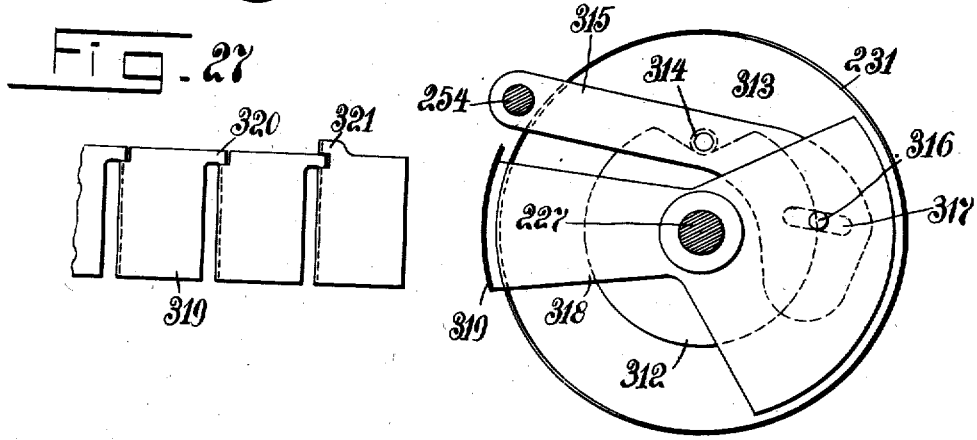

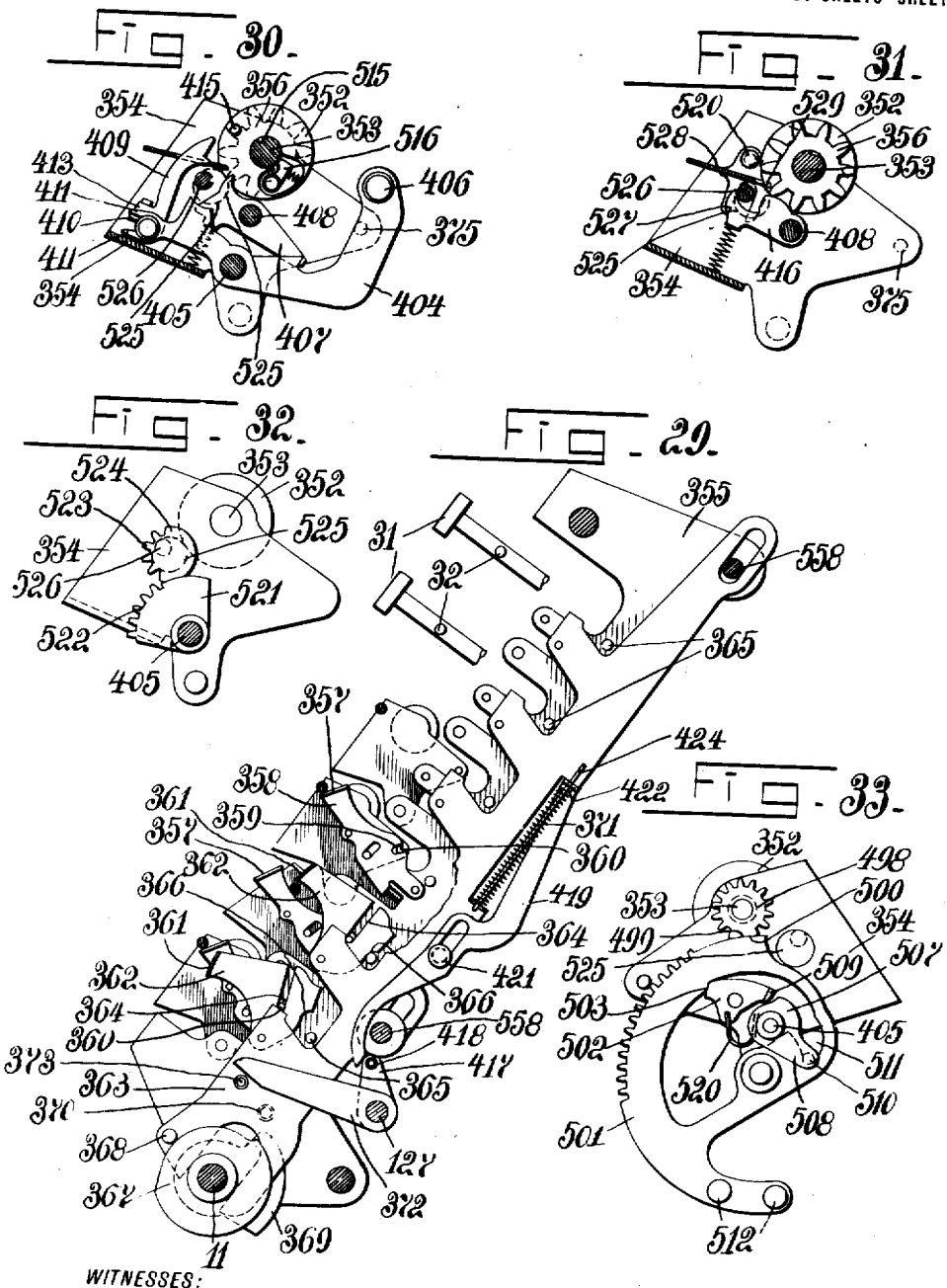

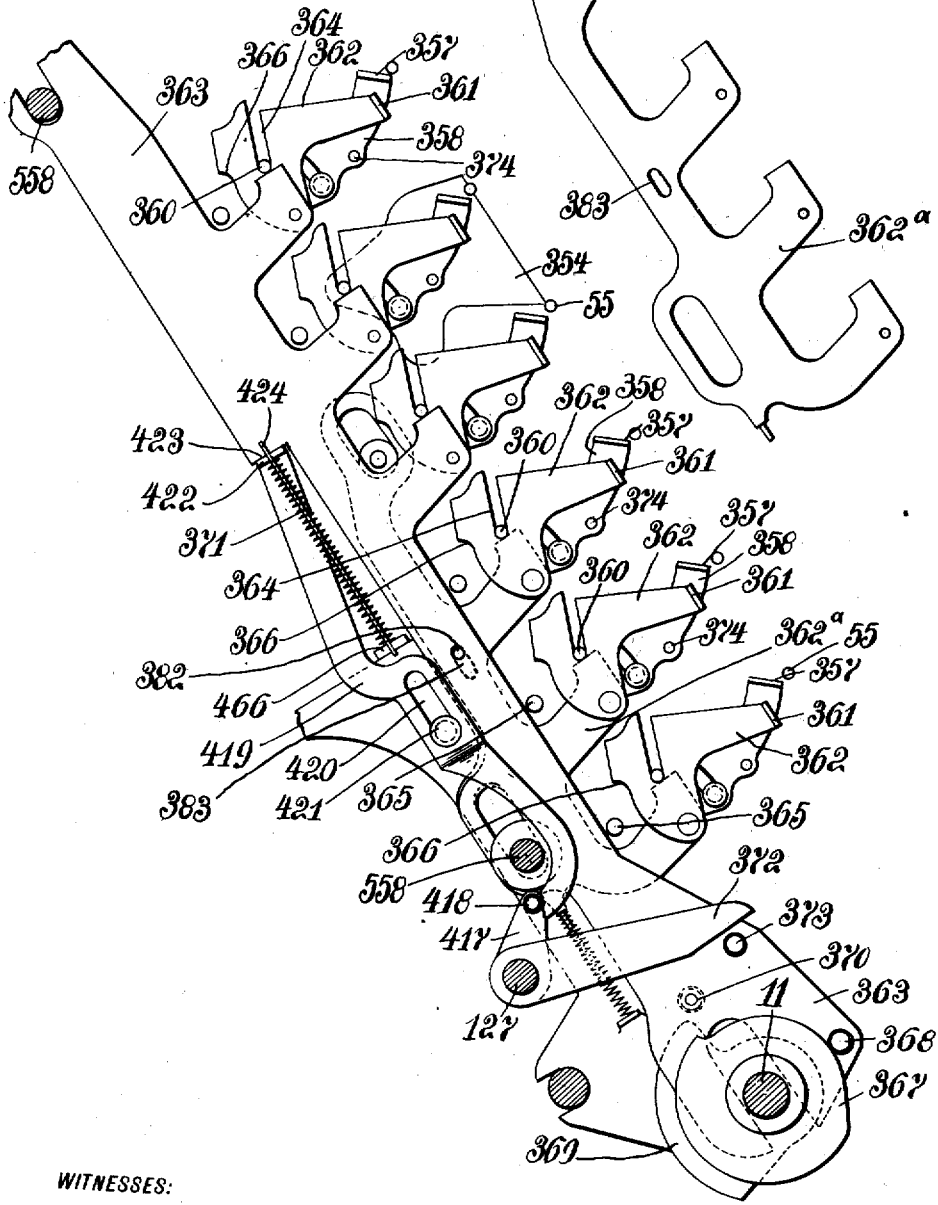

J. P. CLEAL.
CASH REGISTER.
APPLICATION FILED SEPT. 12, 1910.
1,142,079.
Patented June 8, 1915.
31 SHEETS—SHEET 16.
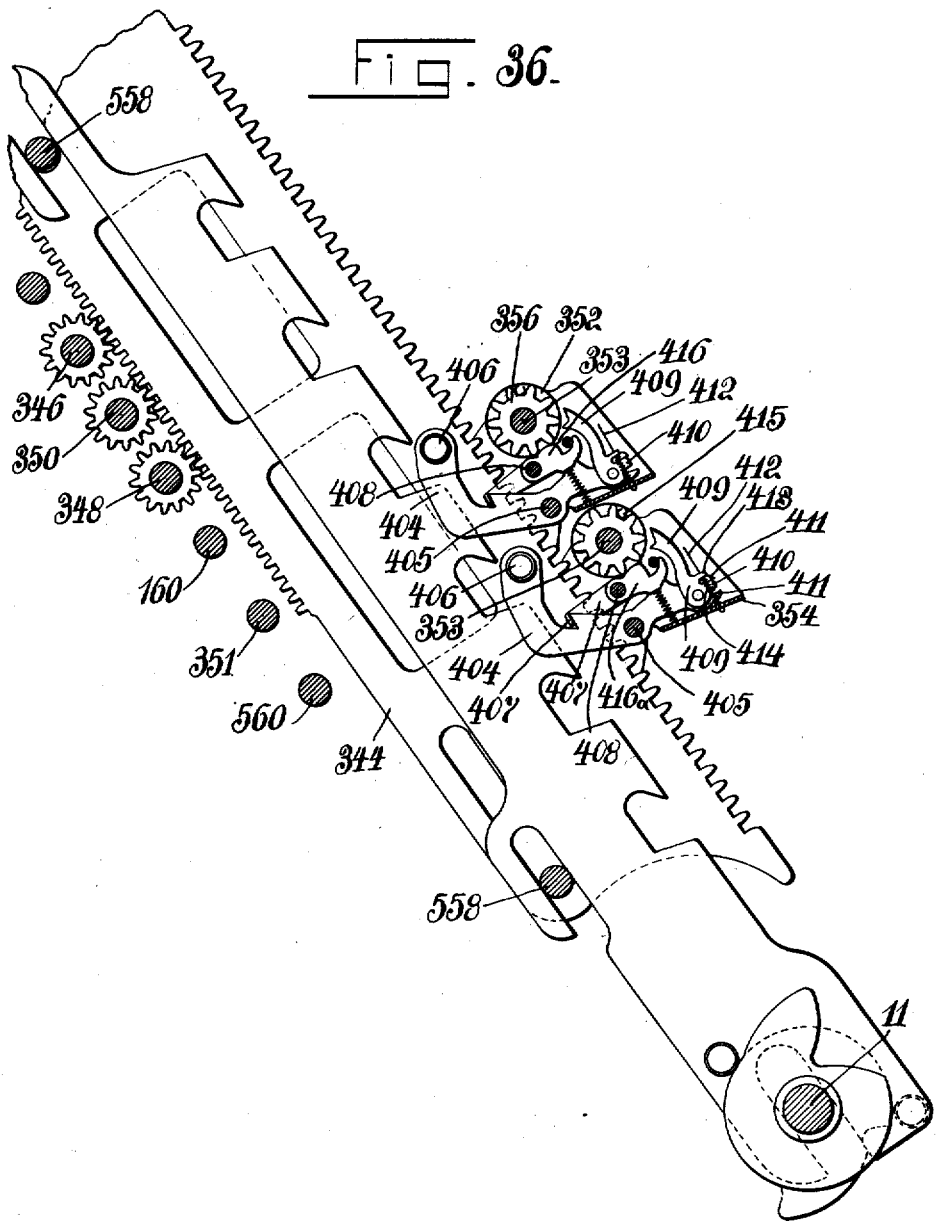

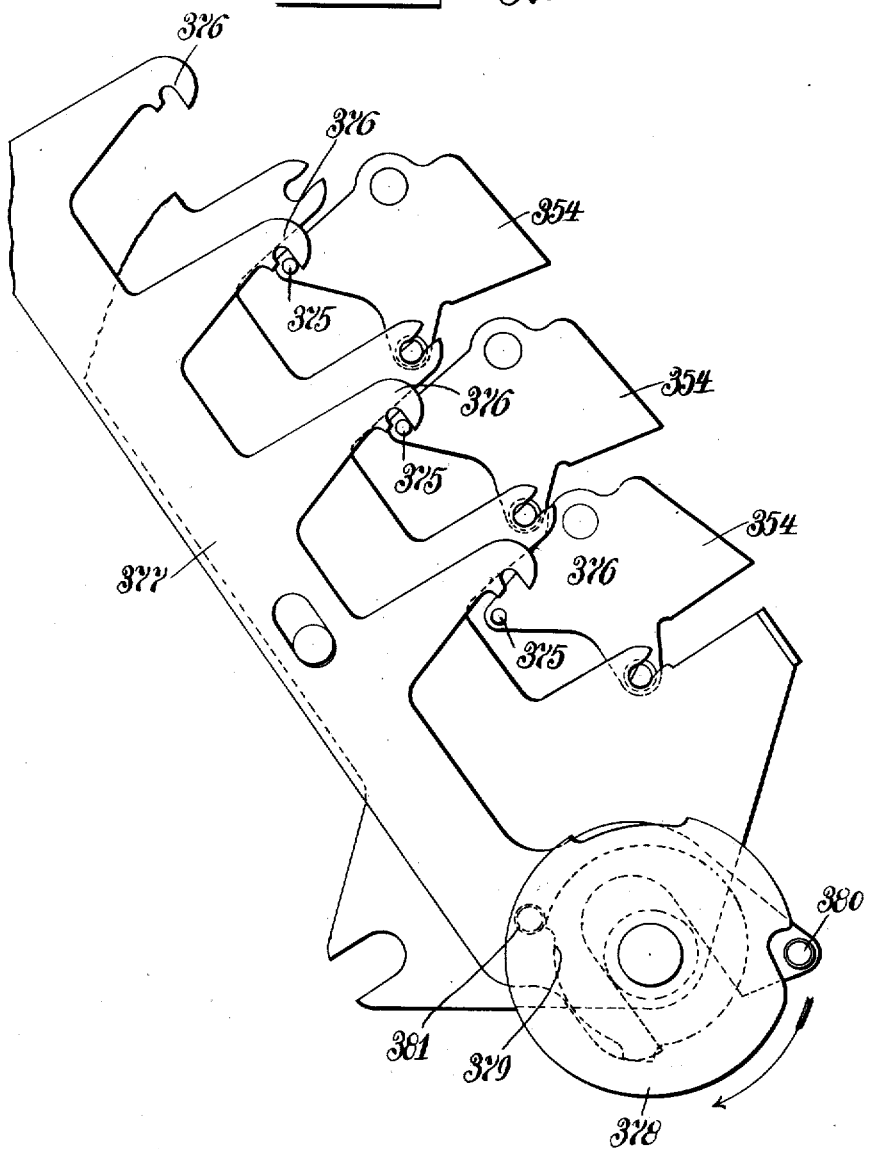

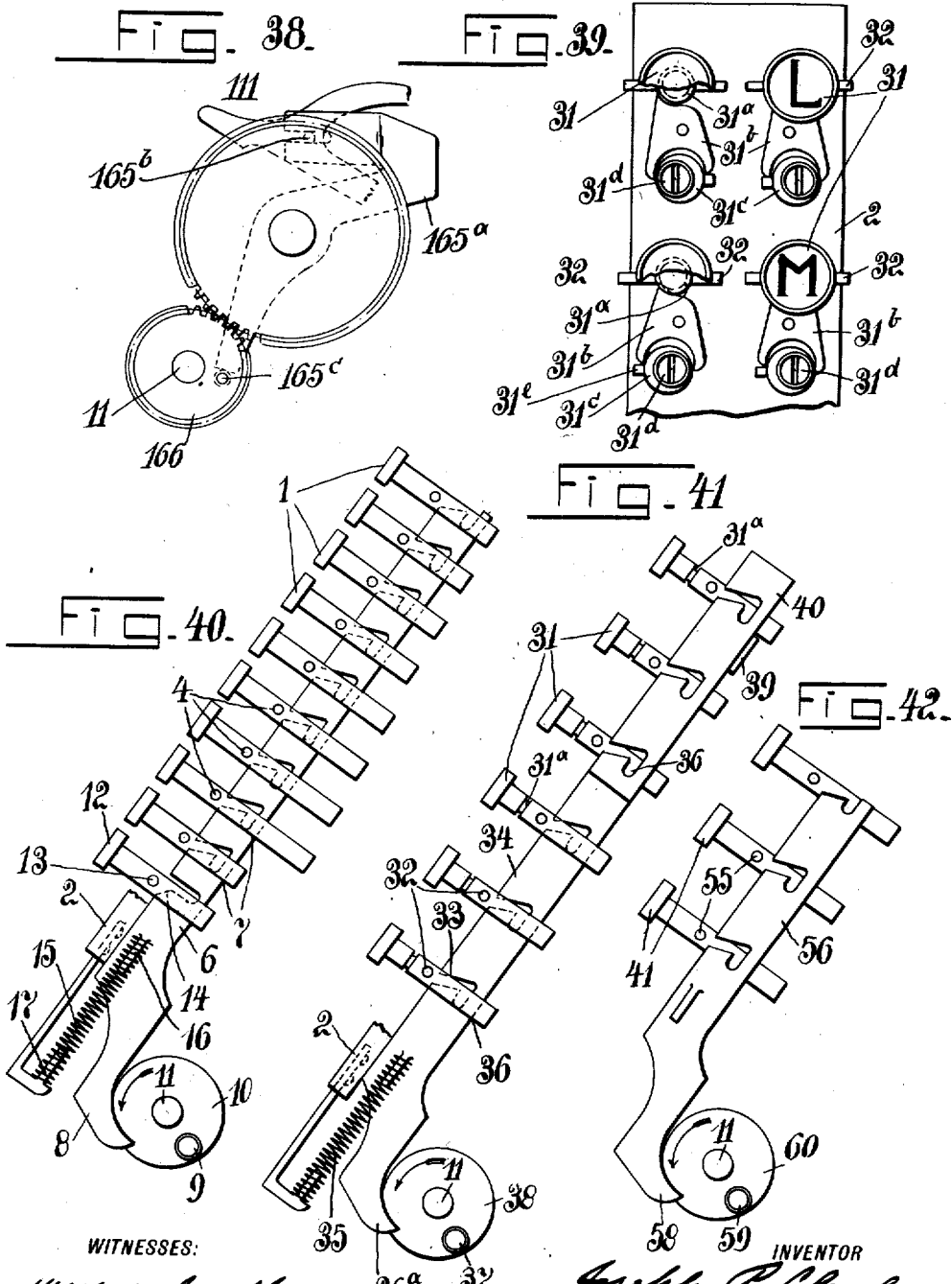

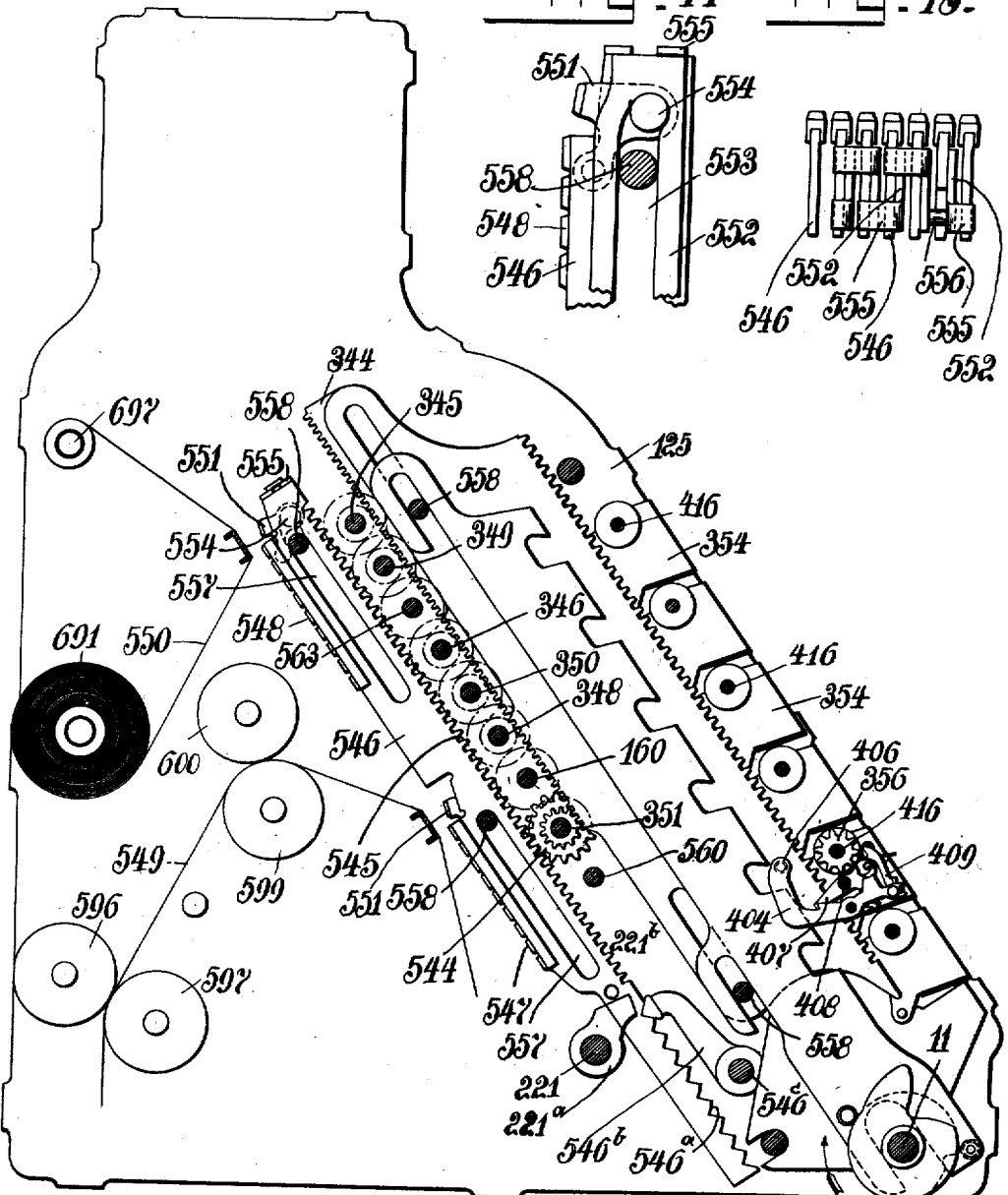

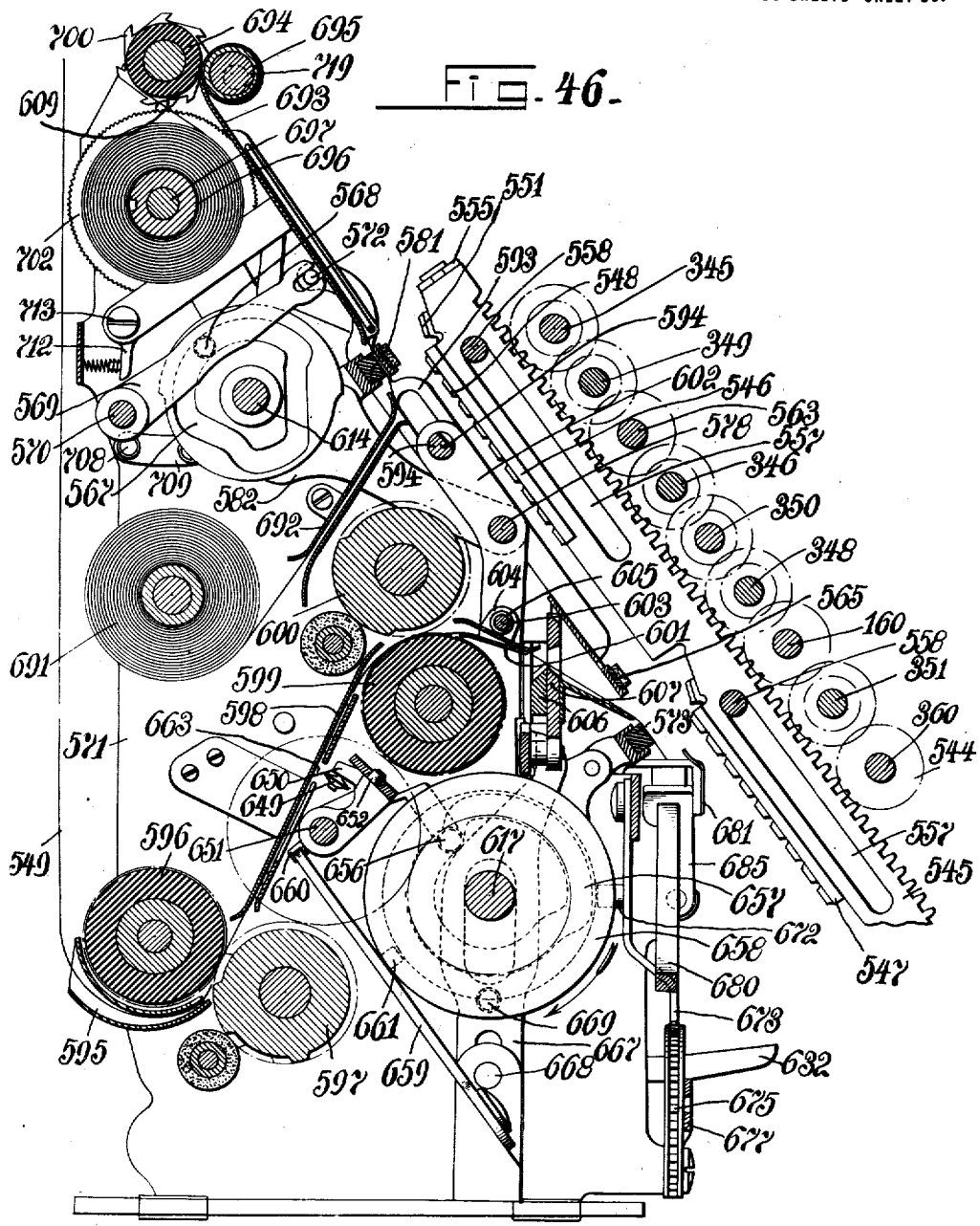

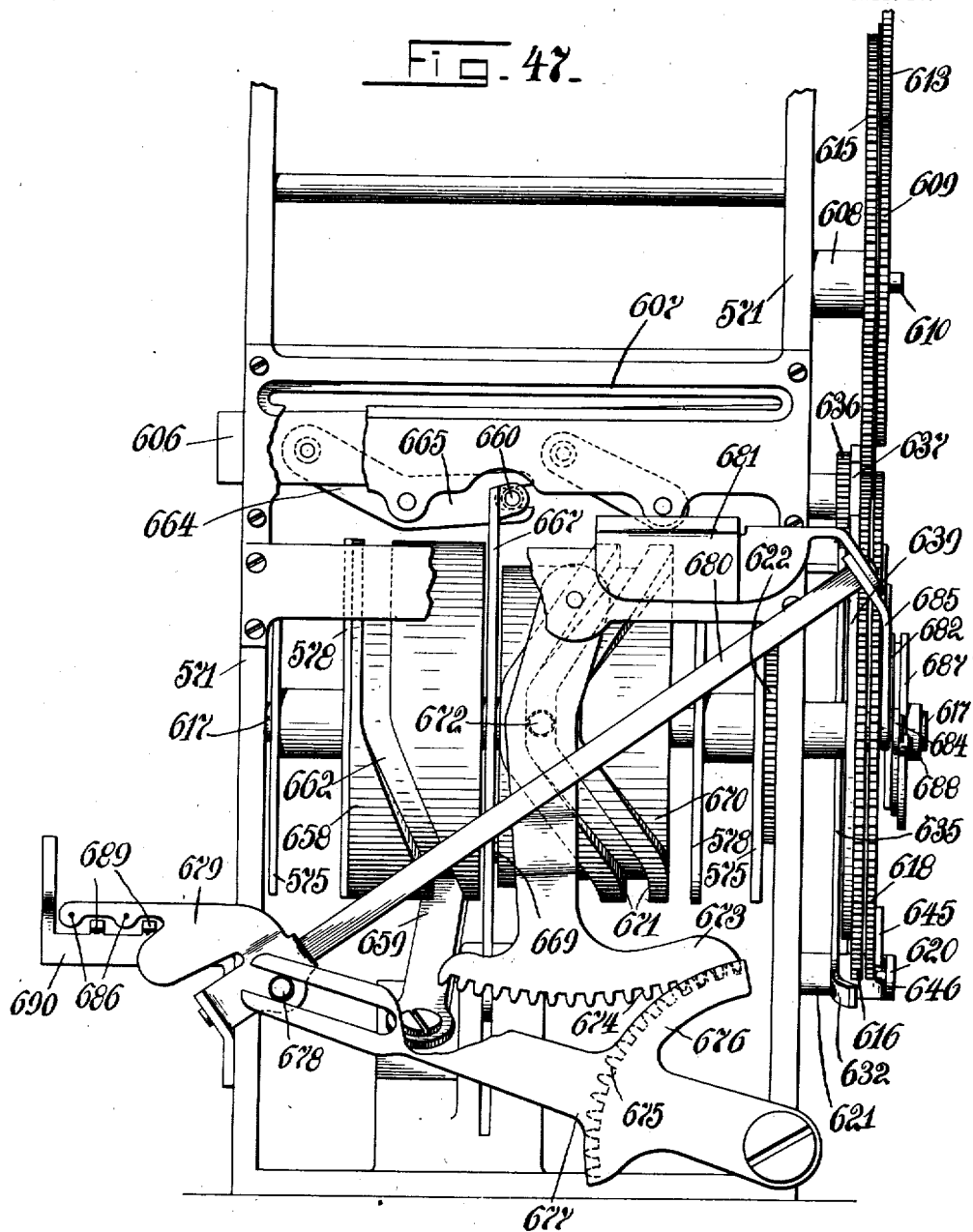

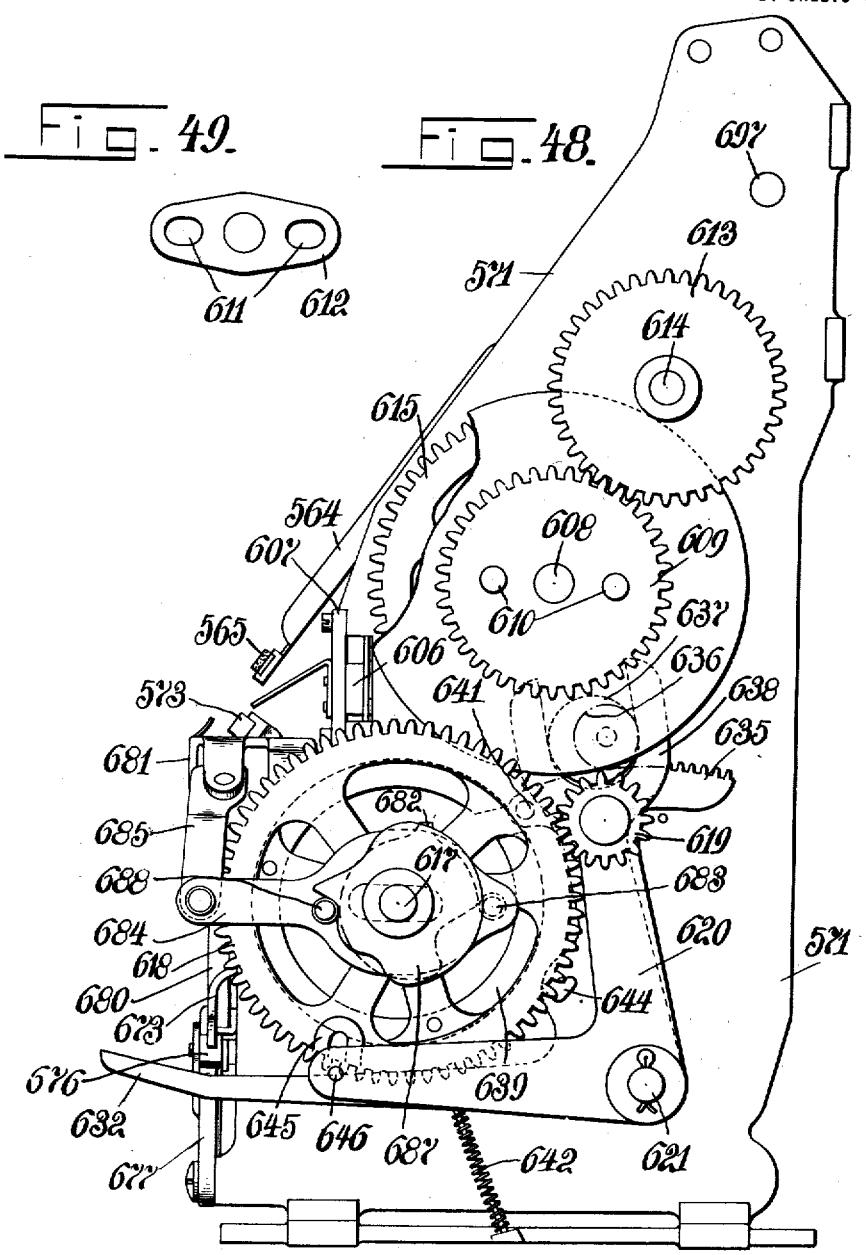

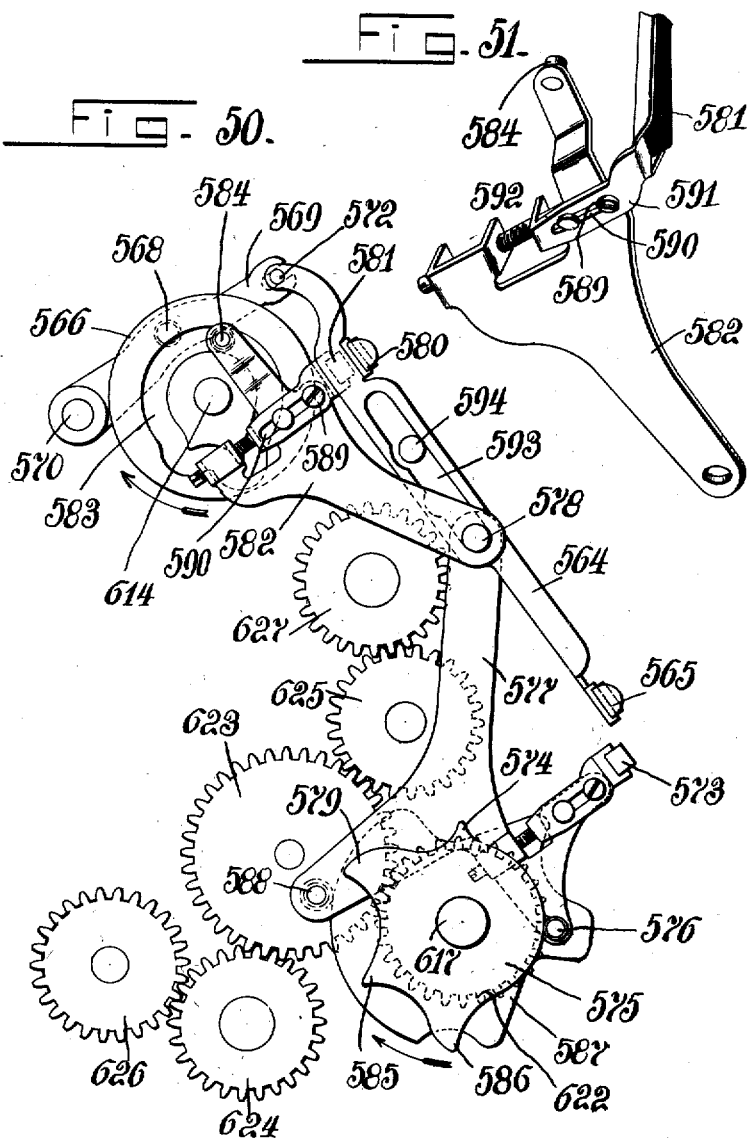

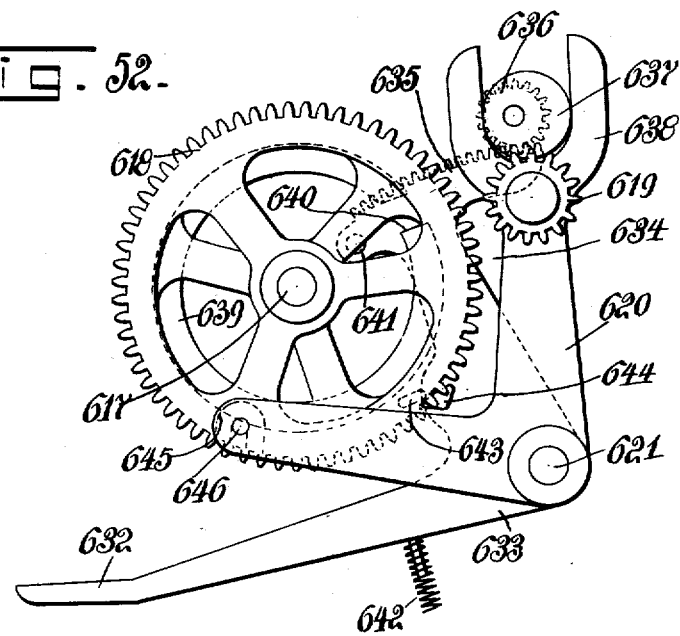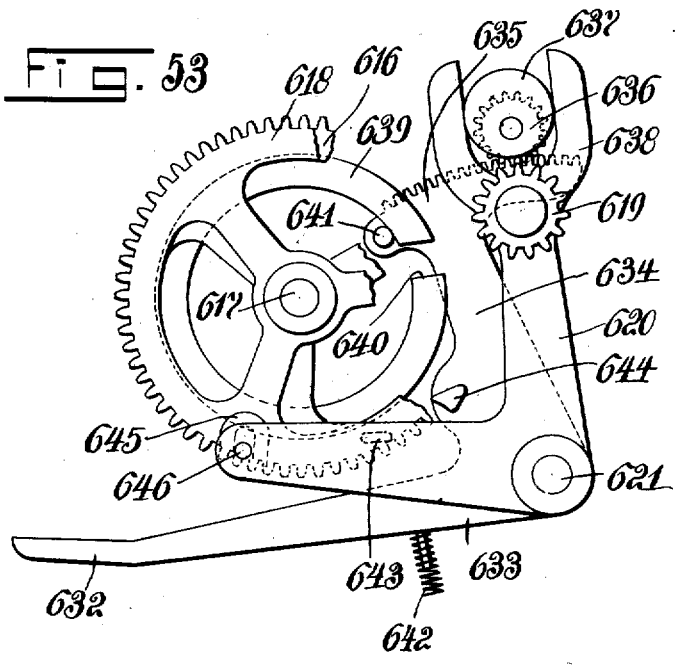

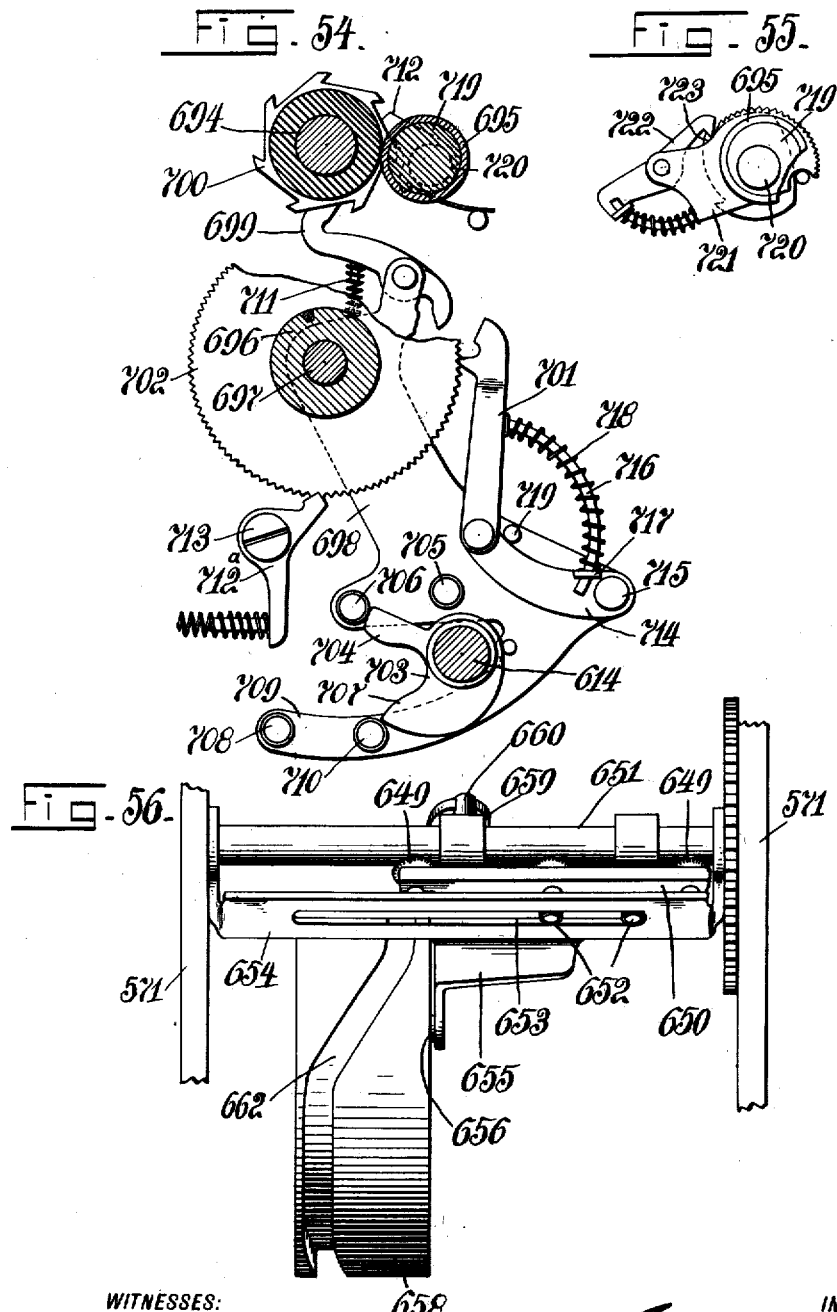

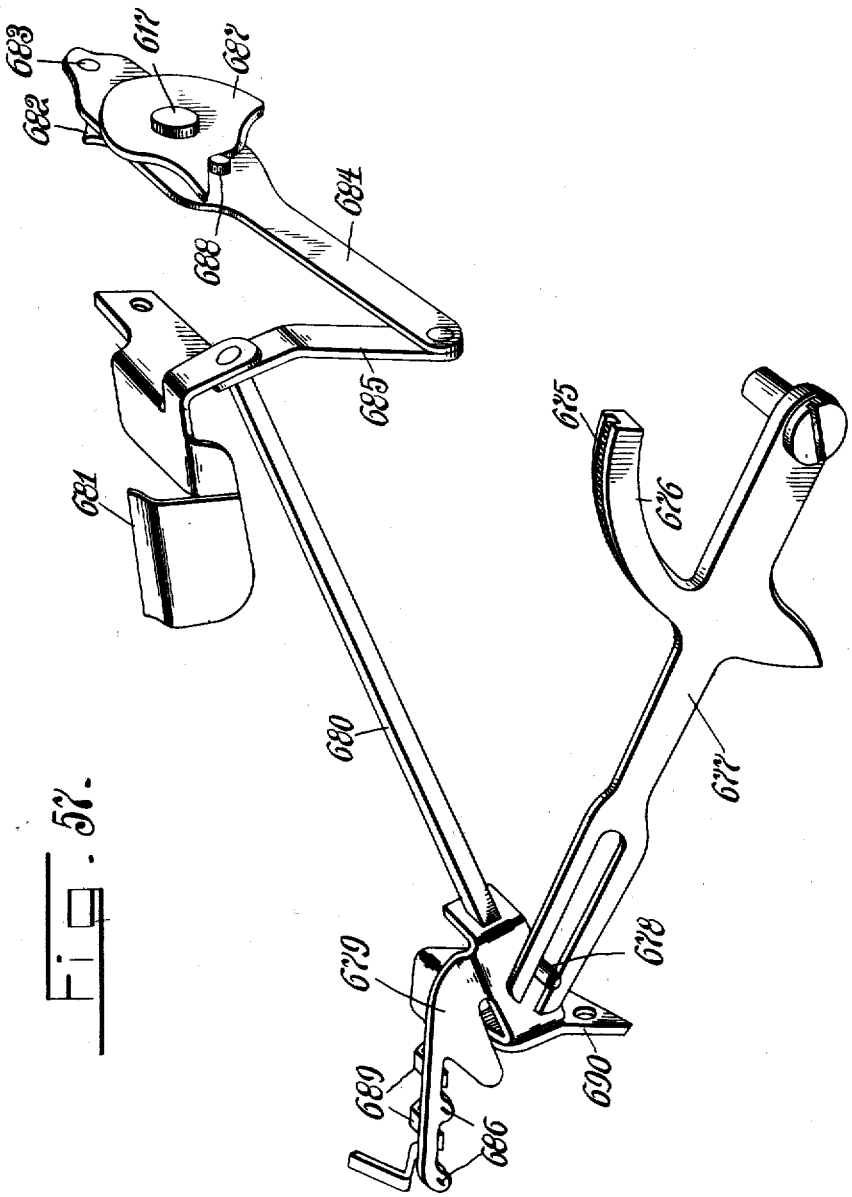

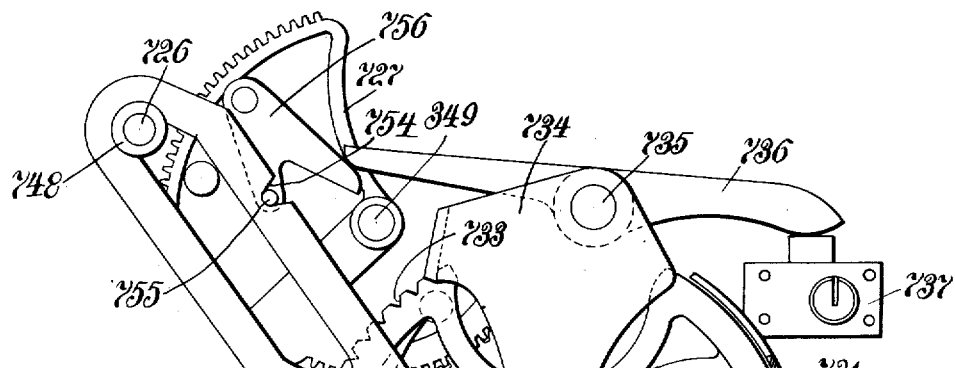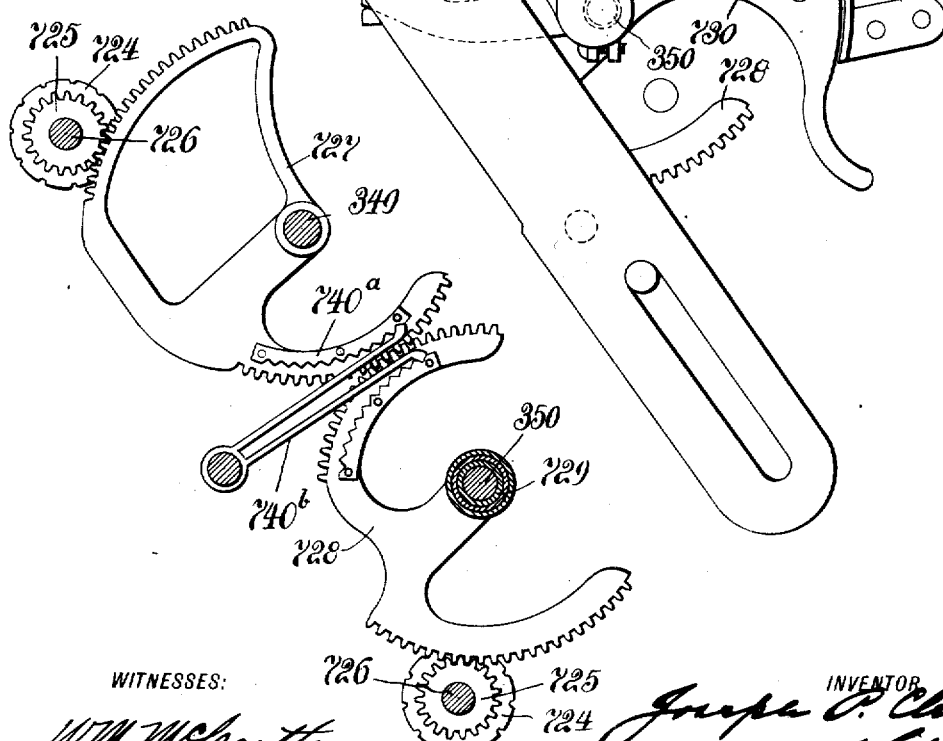

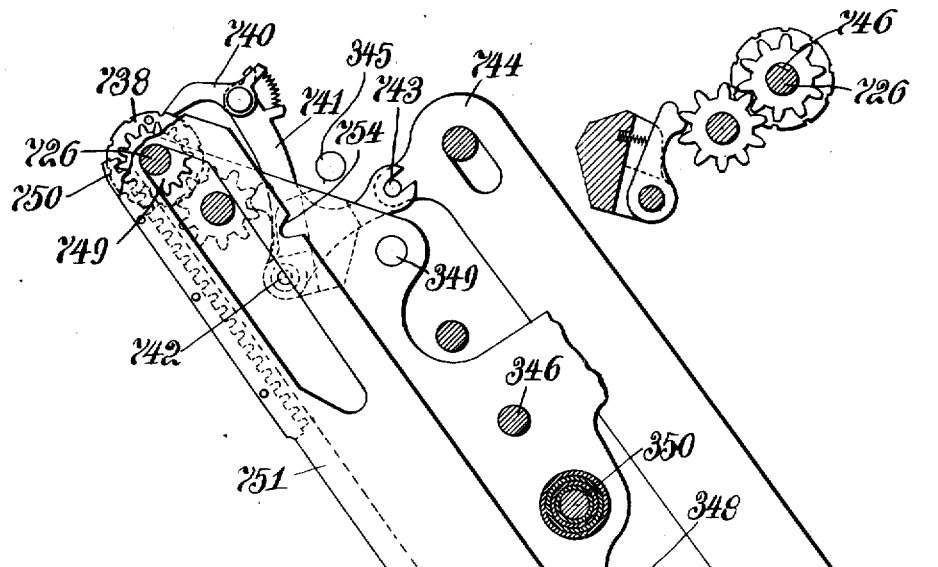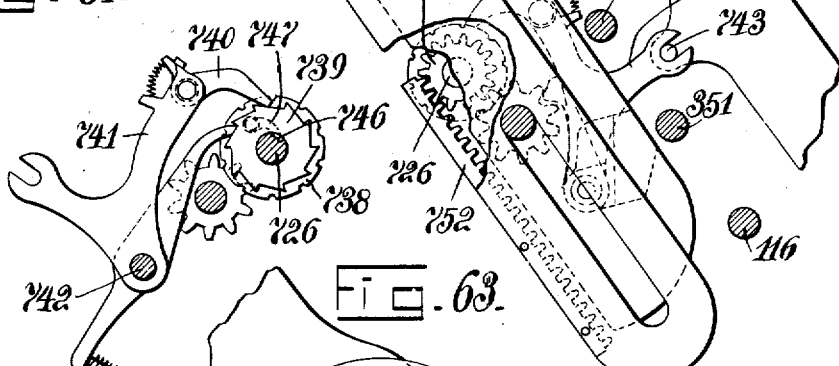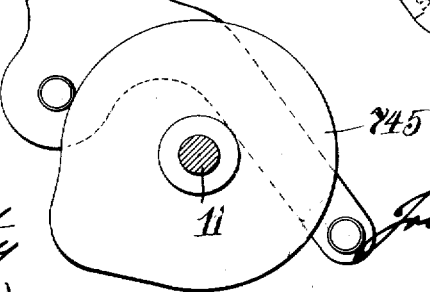

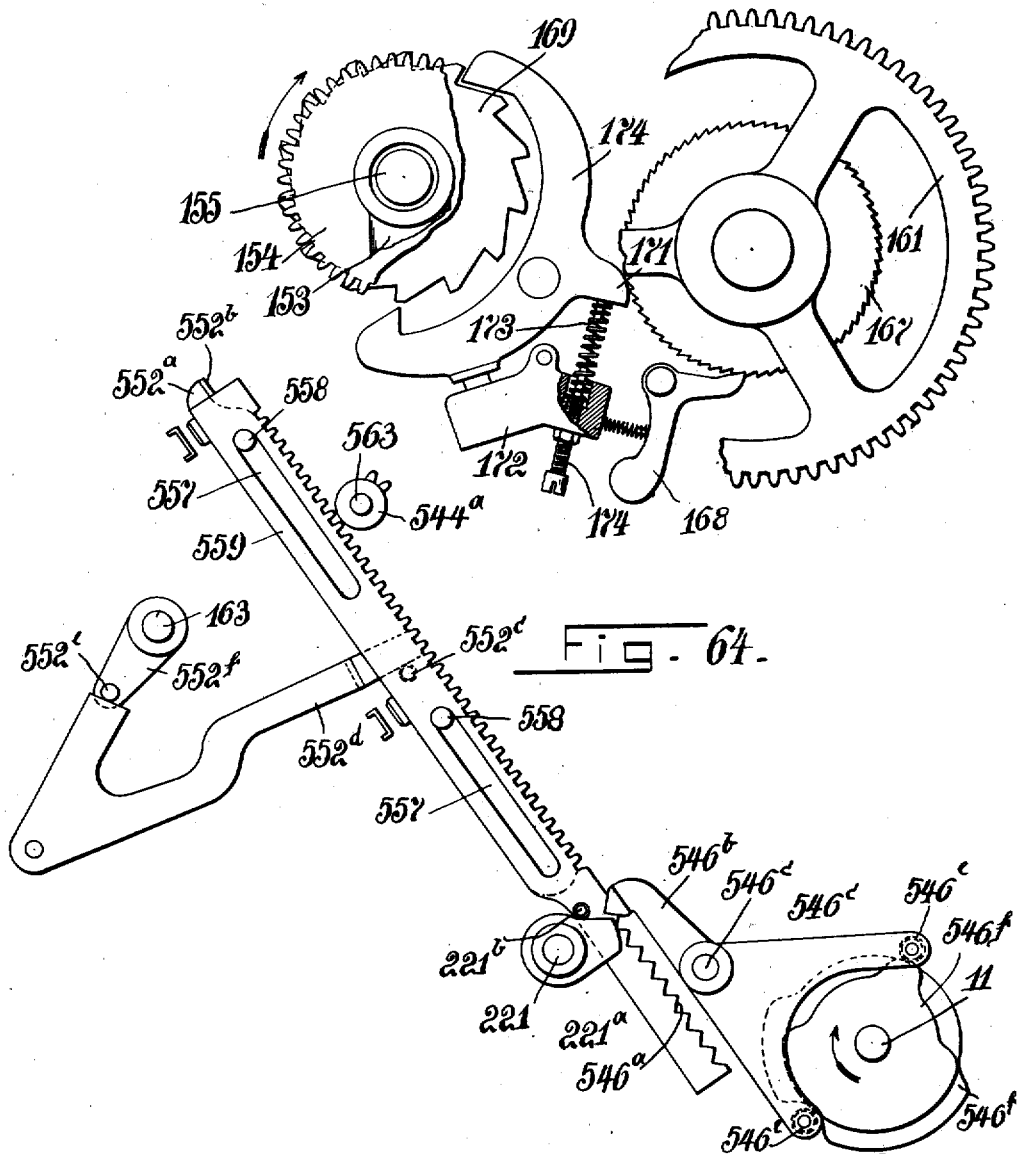

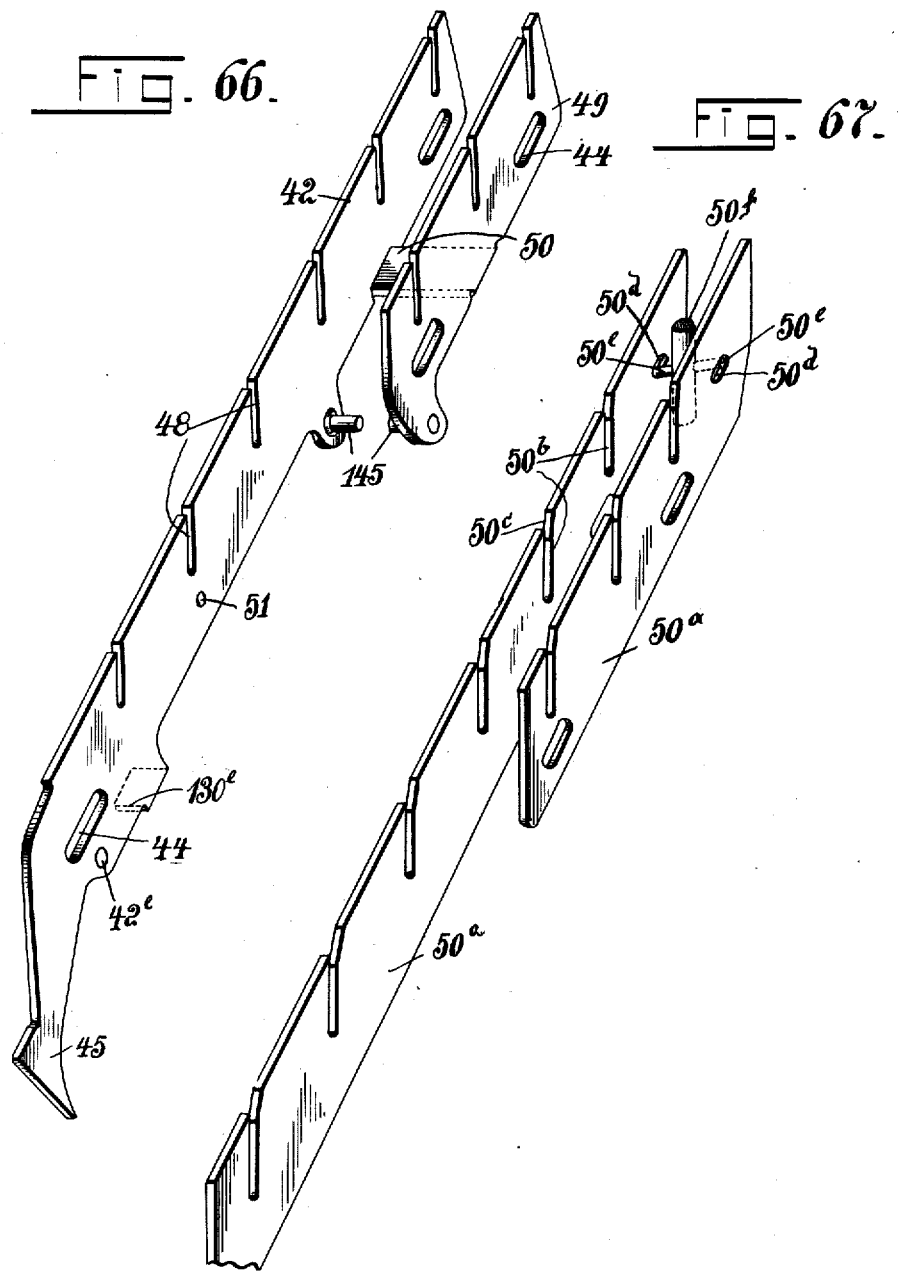

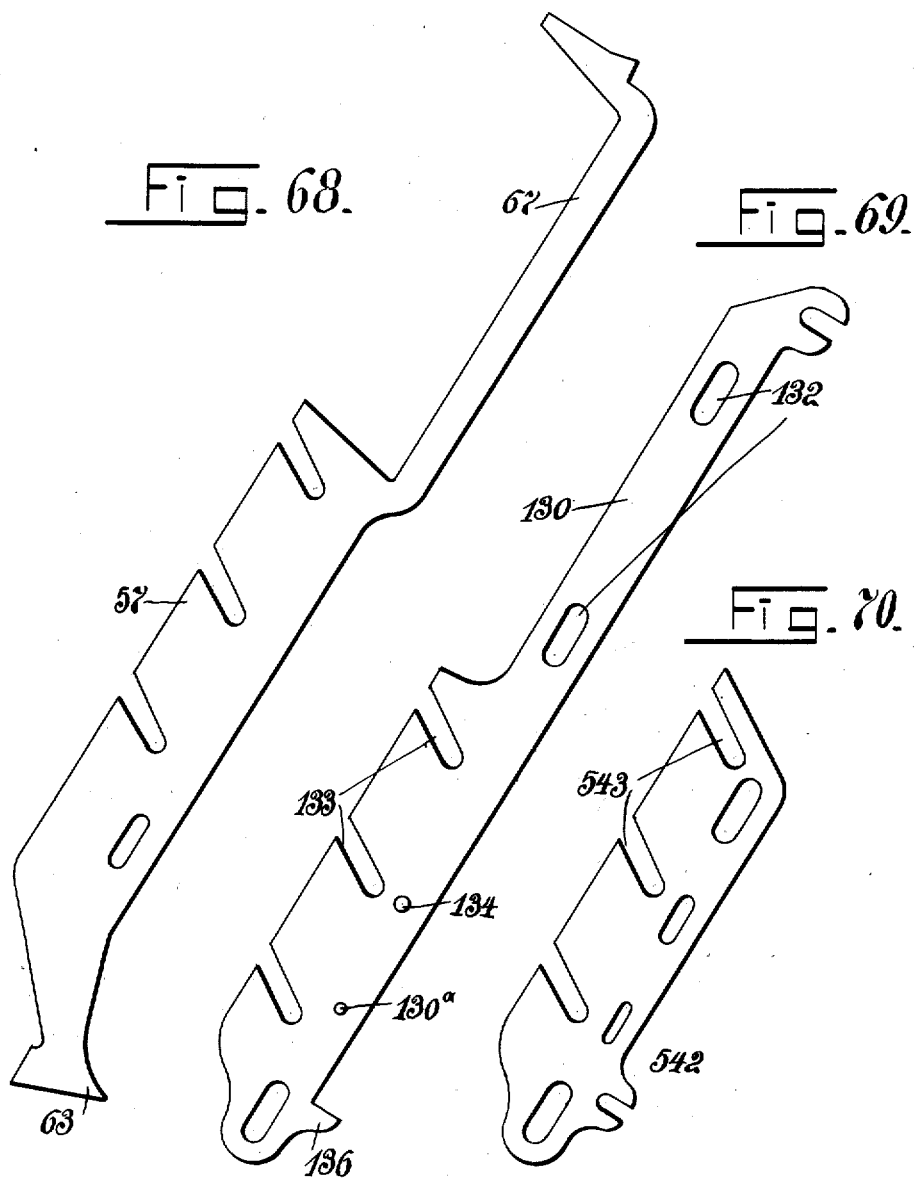

UNITED STATES PATENT OFFICE.

JOSEPH P. CLEAL, OF TORONTO, ONTARIO, CANADA, ASSIGNOR TO THE NATIONAL CASH REGISTER COMPANY, OF DAYTON, OHIO, A CORPORATION OF OHIO, (INCORPORATED 1906.)

CASH-REGISTER.

1,142,079.   Specification of Letters Patent.   Patented June 8, 1915.

Application filed September 12, 1910. Serial No. 581,540.

*To all whom it may concern:*

Be it known that I, JOSEPH P. CLEAL, a citizen of the United States, residing at Toronto, in the Province of Ontario, Canada, have invented certain new and useful Improvements in Cash-Registers, of which I declare the following to be a full, clear, and exact description.

This invention relates to cash registers and more particularly to the style of registers known as multiple totalizer or multiple counter machines.

The principal object of this invention is to provide a plurality of totalizers so that the receipts of different clerks or departments may be kept separately.

Another object is to provide novel means under the control of manipulative devices for connecting and disconnecting the differentially adjustable elements to the operating mechanism.

Another object is to provide an adjustable governor for regulating the speed at which the operating mechanism may be actuated.

Another object of the invention is to provide an improved form of indicating mechanism whereby the indicators instead of returning to zero before assuming a new position, may be moved directly from the position last indicated to the new position.

Another object of this invention is to provide an improved form of flashes whereby the indicator mechanism of the denominations higher than the highest one used will be concealed.

Another object of this invention is to provide an improved means for positively connecting the totalizers with the differentially adjustable elements.

Another object is to provide an improved means for maintaining the clerks' totalizers and the grand totalizer out of engagement with the differentially movable elements when a special key or manipulative device is operated.

A further object is to provide a novel form of transfer mechanism for the different totalizers.

Another object is to provide an improved means for resetting any one or more of the totalizers, or all of them to "zero" by an operation of the machine.

A further object of this invention is to provide an improved form of printing mechanism which is constructed to feed, perforate, sever, and eject a check and also to print upon a record strip and feed the same.

A further object is to provide an improved form of device for perforating the check so that the ejected check may be torn apart if so desired.

A further object of the invention is to provide a novel form of check ejecting mechanism.

A still further object is to provide an equalizing feed device for the record strip whereby said strip is fed an equal distance upon each operation of the machine.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 2:
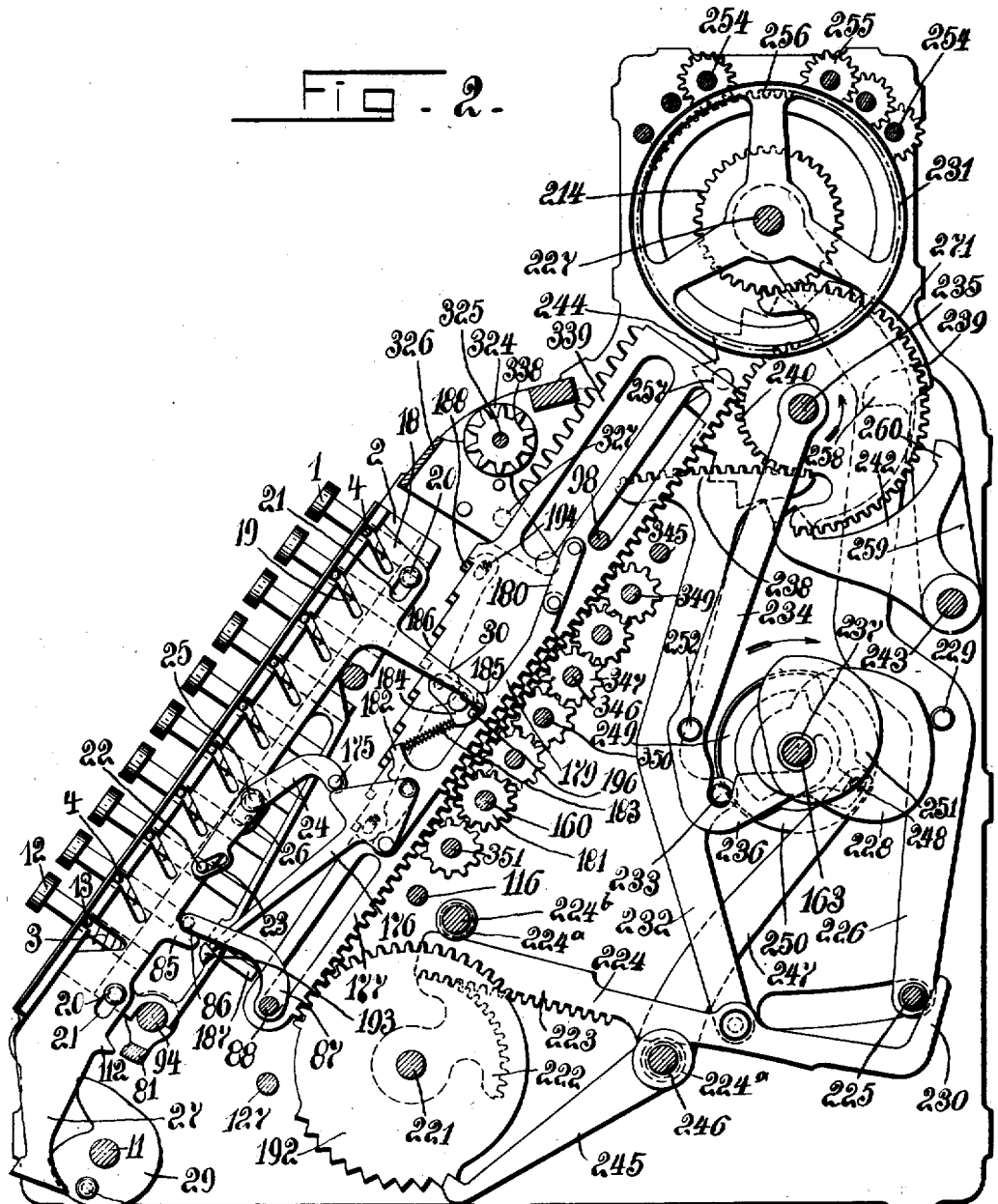
Figure 3:
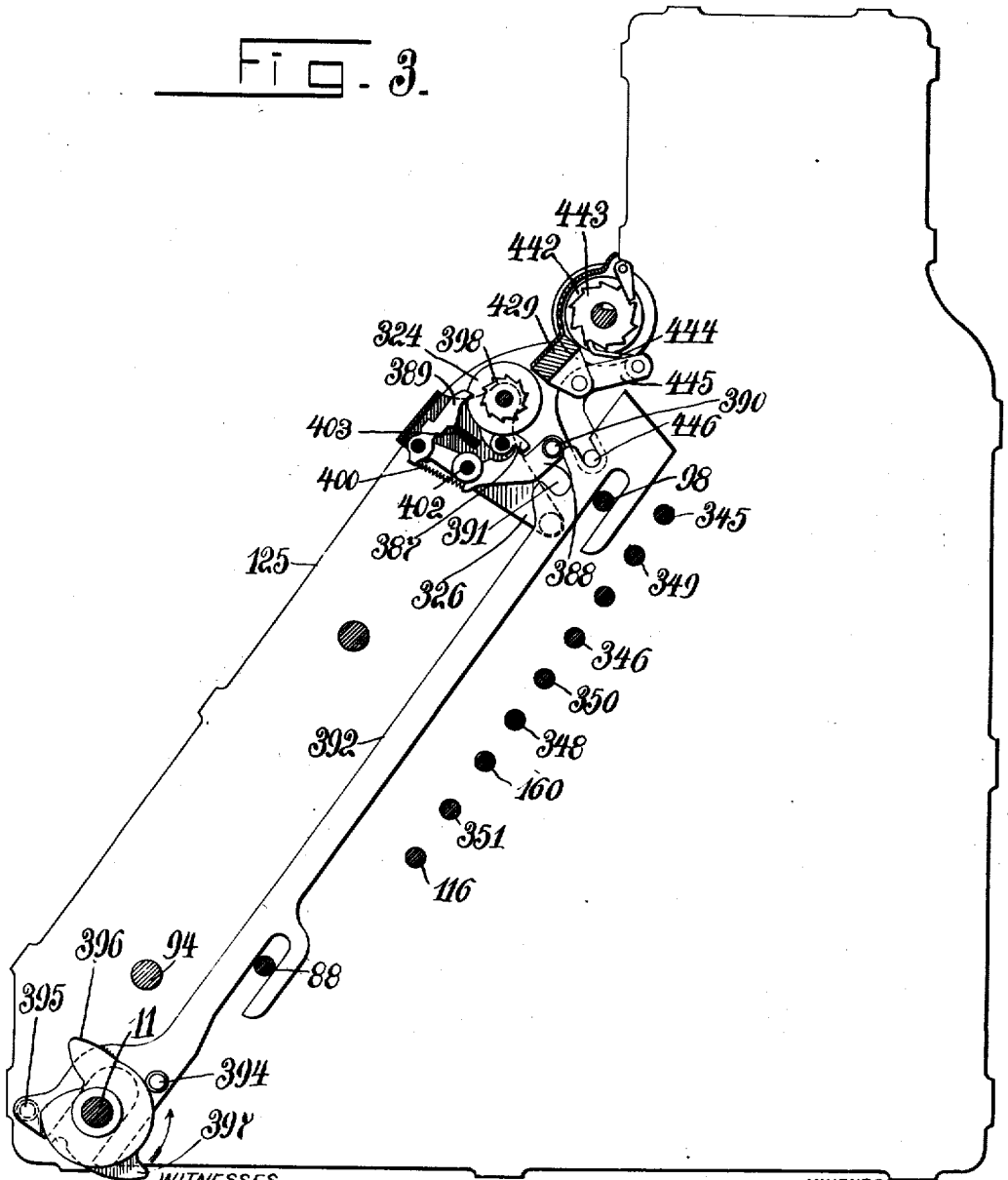

Figure 1 is a perspective view of a machine embodying the invention. Fig. 2 is a transverse sectional view through the machine taken along side of one of the amount banks of keys. Fig. 3 is a transverse sectional view showing the transfer mechanism for the grand totalizer and also the means for actuating the customer counter. Fig. 4 is a transverse sectional view showing the flash operating mechanism, means for rocking the grand totalizer and also the "cash sales" counter actuated by the rocking of the grand totalizer. Fig. 5 is a detail elevation of the operating crank handle and connecting mechanism. Fig. 6 is a rear elevation of the parts shown in Fig. 5. Fig. 7 is a transverse sectional view through the grand totalizer taken on line 7—7 of Fig. 10. Fig. 8 is a view similar to Fig. 7 but taken on line 8—8 of Fig. 10. Fig. 9 is an end elevation of the grand totalizer showing the resetting mechanism for the elements of said totalizer. Fig. 10 is a partial front elevation of the grand totalizer. Fig. 11 is an elevation of one of the totalizer wheels mounted upon its supporting shaft. Fig. 12 is a transverse sectional view through the machine taken along side of the "no sale" and "main counter reset" keys and showing a portion of the gearing for the special transaction indicator, and mechanism for operating the "no sale" counter. Fig. 13 is a detail elevation of the portion of the gearing not shown in Fig. 12 of the special transaction indicators. Fig. 14 is a transverse sectional view of the machine taken along side of the clerks' banks of keys. Fig. 15 is a detail view of a part of the gearing for the clerks' indicator. Fig. 16 is a transverse sectional view taken along side of the special transaction keys. Fig. 17 is a perspective view of the differentially movable slide controlled by the clerks' initial keys. Fig. 18 is a central transverse sectional view taken along side of the "no sale" and "main counter reset" keys and showing the resetting mechanism for the grand totalizer, also showing the special counter for registering the number of times the grand totalizer is reset. Figs. 19 to 22 inclusive are detail views of some of the devices used in the operation of resetting the grand totalizer. Fig. 23 is a transverse sectional view taken along side of the clerks' keys and showing the resetting mechanism for the clerks' totalizers. Fig. 24 is a perspective view of a detachable key for preparing the clerks' and special totalizers for their resetting operation. Fig. 25 is a transverse sectional view through the machine showing certain locks actuated by the manipulative device or detachable key for controlling the setting of the various totalizers. Fig. 26 is a large detail view of the differential element or actuator controlled by the amount keys. Figs. 27 and 28 are detail views of the flashes and operating mechanism therefor. Fig. 29 is a partial elevation of a bank of clerks' totalizers, and manipulative devices for controlling same. Figs. 30 and 31 are sectional views taken through one of the clerks' totalizers. Figs. 32 and 33 are end elevations, looking in the opposite direction, of one of the clerks' totalizers. Fig. 34 is an enlarged elevation of the bank containing the special and clerks' totalizers. Fig. 35 is an elevation of a slide carrying the throwing levers for the special totalizers. Fig. 36 is an enlarged sectional view showing the actuating and transferring mechanism for the clerks' totalizers. Fig. 37 is an enlarged elevation of the device for locking the clerks' or special totalizers in or out of operative relation with their actuating devices. Fig. 38 is a detail elevation of the devices to prevent overthrow of the transfer cam shaft. Fig. 39 is a partial front elevation of the locking devices for the clerks' keys. Figs. 40, 41, and 42 are elevations showing the detents and their operating mechanism for the "amount", "clerks'", and "special transaction" keys. Fig. 43 is a transverse sectional view through the printing mechanism showing only a general outline of a portion of said mechanism. Figs. 44 and 45 are views showing the positioning mechanism for the zero types. Fig. 46 is an enlarged sectional view through the printing mechanism. Fig. 47 is a partial front elevation of the printing mechanism. Fig. 48 is a side elevation of the operating gearing for the printing mechanism. Fig. 49 is a detail view of an arm for connecting the printing mechanism with the main operating shaft of the machine. Fig. 50 is an elevation of the operating mechanism for the platen and inking devices of the printing mechanism. Fig. 51 is a perspective view partly broken away of the record strip platen. Figs. 52 and 53 are views showing different positions of the mechanism for disconnecting the check feeding devices of the printing mechanism. Fig. 54 is an enlarged view of the equalizing feed device for the record strip. Fig. 55 is an end elevation of the devices for holding the feeding rollers for the record strip in operative relation. Fig. 56 is a partial front elevation of the perforating mechanism for the check strip. Fig. 57 is a perspective view of the check gripping and ejecting mechanism. Figs. 58 and 59 are detail views of the setting mechanism for the date printing devices. Figs. 60, 61, and 62 are views showing the operating and resetting devices for the consecutive numbering mechanism. Fig. 63 is a detail elevation of a cam for operating a slide which actuates the consecutive numbering device. Fig. 64 is an elevation of the alining devices and mechanism for returning the type-carriers to normal position. Fig. 65 is an end elevation, partly broken away, of a device for arresting the crank handle if an abnormal speed is obtained, also showing a full stroke device. Fig. 66 is a perspective view of the slide for positively returning the clerks' keys to their normal position. Fig. 67 is a perspective view of the slides for preventing the simultaneous operation of more than one of the clerk's keys. Figs. 68, 69, and 70 are detail elevations of various slides that coöperate with the special keys.

Described in general terms this machine comprises a plurality of banks of amount keys, a bank containing a "main counter reset" and "no sale" keys, and two additional banks of keys, one containing clerks' initials and the other, special keys and clerks' initials. The crank handle or operating mechanism is locked until a clerk's initial key is depressed, these keys in turn being locked until an amount key or the "no sale" key is depressed. Upon the depression of an amount key a rack bar will be depressed and latched in engagement with a pinion connected to the operating mechanism. This rack bar is carried by a larger rack bar which controls the actuation of the grand totalizer and the indicating mechanism. The rack bar which is latched in engagement with the operating pinion can be disengaged therefrom by a slide also carried by the second mentioned rack bar coming in contact with the inner end of the depressed key. It is to be understood that there is one set of differentially adjustable elements, such as that just described, for each bank of amount keys and the movement of these adjustable elements is conveyed to the other side of the machine by horizontal shafts which carry pinions that mesh with differentially movable elements such as rack bars, the latter being located beneath the clerks' or special totalizers, and constructed to actuate the same when they are thrown into engagement with said racks.

As previously described, the clerks' keys or manipulative devices are locked until an amount key is depressed, and each of these clerk's manipulative devices control a totalizer which, upon the operation of any of the clerk's keys or manipulative devices, will be brought into engagement with the racks actuated by the differentially adjustable element previously described.

The operating pinions previously mentioned are given a constant movement at each operation of the machine, and the differentially adjustable elements heretofore described are connected with said pinions previous to the movement of the same, and the extent of the movement imparted to the differentially movable elements by the pinions is controlled by the keys or manipulative devices depressed. The downward movements of the differentially adjustable elements actuate the registering wheels of the grand totalizer, the latter being thrown into engagement with said adjustable elements previous to their downward movement, and also adjusts mechanism which controls the movement of the indicating mechanism by the continued movement of the operating mechanism.

The indicating mechanism comprises two sets of amount indicator wheels, one of which sets indicates at the front and the other at the back of the machine. Above these amount indicators are located indicators for indicating to the front and back of the machine the initial of the clerk and the class of transaction.

There are nine clerks' totalizers, three special totalizers, and one grand totalizer and when a cash sale is to be registered the amount keys representing the sale are depressed, which releases the clerks' keys, and then the key bearing the initial of the clerk who made the sale is depressed By the depression of this clerk's initial key the totalizer belonging thereto will be rocked into engagement with its actuating racks. This operation of the clerk's key will release the main operating handle, upon the operation of which the amount represented by the keys depressed will be added upon the clerk's totalizer and the grand totalizer. When a special transaction occurs the amount keys are depressed the same as in a cash transaction, and a special key representing the class of transaction. As previously explained, the operating mechanism is only unlocked by an operation of one of the clerk's keys, so it will be seen that the machine still remains locked after the depression of the amount and special keys, but by the operation of the special key certain devices are withdrawn from the control of the clerk's key, so that when the latter is depressed to unlock the operating handle the totalizer corresponding to said clerk's key will not be rocked into engagement with the actuating racks, and also by the operation of the special key the rocking mechanism for the grand totalizer will be disabled so that the amount of the transaction will be registered upon the special transaction totalizer only.

The various totalizers may be reset to zero singly or simultaneously as desired. The resetting mechanism is operated by the operating mechanism, but is normally disconnected therefrom, and is connected thereto by the operation of the manipulative devices. The operation of these devices occurs previous to the operation of the crank handle so that upon the operation of the latter any one or all of the totalizers which may have been prepared, will be reset to zero. The operation of the manipulative devices controls locks for the various totalizers so that the same will not be accidentally moved into engagement with the adjustable elements, so that the turning of the registering wheels of the various totalizers will not in any way affect the differential elements. The operation of one of the manipulative devices in preparing the various totalizers to be reset, also controls the locking out of the amount and special keys and the unlocking of the clerks' keys. This manipulative device also controls the withdrawal of the devices that are also controlled by the special keys, so that the operation of the clerk's key to unlock the operating handle in resetting the totalizers to zero, will not engage its totalizer with the actuating racks.

Special counters are provided for each one of the clerk's and special totalizers, and these special counters are placed in operative relation with the operating mechanism when the corresponding one of the totalizers is moved into position to be engaged by its actuating racks. The grand totalizer is provided with a special counter which is actuated as the grand totalizer is moved into engagement with the actuating devices therefor. A customer counter is provided to record the number of operations of the machine. A "no sale" counter is actuated whenever the "no sale" key is depressed and the actuating handle operated. A special counter to indicate the number of times the main totalizer is reset is also provided.

A printing mechanism is provided with a plurality of type bars each carrying two series of type. These bars are suitably connected to the differentially adjustable elements, and impressions are arranged to be taken therefrom upon a record strip and also on a check strip. The means for taking an impression upon the check strip is actuated twice during each operation of the machine, so as to take several impressions upon said check strip, the check strip being perforated between said impressions. After the impressions are taken on the check strip the latter is fed forward and severed into checks, a check ejector meantime being brought into position to receive the severed check and to carry it to a position accessible either to the operator or the customer. A single impression only is taken upon the record strip, and this strip is fed forward by suitable mechanism an equal distance at each operation of the machine. Upon both the check strip and the record strip the day, month, and year are printed as well as the consecutive number. The consecutive numbering device is actuated at each operation of the machine, while the dating device is set by suitable manipulative devices located at one side of the machine.

With this general description it is believed that the detailed description given hereafter may be more advantageously followed.

Keyboard mechanism.

*Amount keys.*—The keys 1 of each amount bank are mounted to slide in a frame 2 (Fig. 2) and are normally held in their outermost position by springs 3 the ends of which abut against pins 4 projecting from the keys and the inner portion of the frame 2. Each bank of amount keys is provided with a sliding detent plate 6 suitably mounted within the frame 2 (Fig. 40). Each detent plate is provided with locking projections 7 which are arranged to engage with the key pins 4 when the keys are fully depressed and lock the keys in their depressed positions. Extending downwardly from each plate 6 is a foot 8 which, near the end of each operation of the machine, is engaged by a pin 9 projecting from a disk 10, the latter being secured to a transverse shaft 11. This shaft 11 is given a rotation at each operation of the machine, and the pin 9 is arranged to engage with the foot 8 and thereby depress the detent plate 6 to release the depressed key. Immediately below each bank of amount keys is a release key 12 which can be depressed to release an amount key if the latter has erroneously been depressed. This key 12 corresponding to each amount bank lowers the detent plate 6 by a key pin 13 engaging with an inclined wall 14 of said plate 6. This plate 6 is normally held in latching position by a spring 15 interposed between a lug 16 projecting from said plate and a lug 17 projecting from the key frame 2. On the opposite side of the key frame 2 from that on which the detent plate 6 is located, is a sliding releasing plate 18 (Fig. 2) with inclined slots 19. This plate is mounted upon the key frame 2 by pins 20 which pass through elongated slots 21 formed in the plate 18. This releasing plate 18 is provided with a pin 22 which plays in an inclined slot 23 formed in a lever 24 which is centrally pivoted as at 25 to the key frame 2. The plate 18 is provided with an elongated slot 26 through which the pin 25 passes. This slot 26 is simply to permit the mounting of the lever 24 upon the key frame 2. The plate 18 is provided with a foot 27, which is arranged to be engaged by a pin 28 secured to a cam disk 29, near the end of the operation of the machine thus positively forcing said slide 18 to its normal position, thereby camming the depressed key to its outer position. This action of the plate 18 does not take place until after the operation of the detent plate 6. Ordinarily the springs 3 are sufficient to return the keys to normal position, but in case they should fail to perform their function the plate 18 will positively restore said keys. The plate 18 is provided with a rearwardly extending arm 30 the function of which will be hereafter described.

*Clerks' keys.*—The clerks' keys 31 (Figs. 14, 16, and 41) are provided with key pins 32 which engage with inclined slots 33 in a detent 34, and move said detent down against the tension of a spring 35 until said keys are fully depressed, when the detent will spring upward by its spring 35 so that locking shoulders 36 formed on the detent plate will engage with the pins of the depressed keys. This detent is provided with a foot 36ª which is arranged to be engaged by a roller 37, projecting from a disk 38 secured to the shaft 11 previously described at the end of the operation of the machine, to move said detent downwardly so as to release the depressed key. The detent 34 (Fig. 41), which is for the left hand bank of clerks' initial keys, is connected as at 39 to a detent 40 for the three clerks' keys 31 that are in the same bank with special keys 41, and a slide 42 (Fig. 14) is mounted upon the key frame 2 by pins 43 which play through elongated slots 44 formed in such slides. This slide is provided with a foot 45 which near the end of the operation of the machine is actuated by a roller 46 projecting from a disk 47 secured to the shaft 11. This roller engages with the foot 45 just after the detent is operated to release the key pin, and if said key has not been returned to normal position, inclined slots 48 formed in said slide will engage with the key pins 32 and positively move the keys to their outer positions. This slide, as best shown in Fig. 66, is connected to a similar slide 49 for the three clerks' keys that are in the same bank with the special transaction key, by a plate 50. From this description it will be seen that as any one of the clerk's keys is operated, the slides 42 and 49 will be raised by the plate 50 and thereby lock out the unoperated clerks' keys. The plate or slide 42 has a pin 51 (Fig. 14) projecting therefrom into an inclined slot 52 formed in the lower end of a lever 53, which is centrally pivoted as at 54 to the key frame 2. The rocking of the lever 53 by the upward movement of the slide 42 is for connecting the differentially adjustable elements to the operating mechanism as hereafter described.

The shank of each of the clerk's keys 31 is provided with an annular groove 31$^a$ (see Fig. 39) into which one end of a pivoted lever 31$^b$ is arranged to be moved to lock the key from operation. The other end of said lever is forked and straddles a cam disk 31$^c$ secured to a key barrel 31$^d$. Whenever a clerk desires to leave the establishment he inserts his key in the key barrel 31$^d$ and turns said barrel. By the turning of this barrel the cam disk 31$^c$ will rock the lever 31$^b$, so that one end of said lever will pass into the groove 31$^a$ formed upon the key shank, and thereby lock the key from operation and consequently the totalizer controlled by said key. The disk 31$^c$ is provided with an extension 31$^e$ which engages the prongs of the forked end of the lever 31$^b$ and limits the movement of the key barrel 31$^d$. In Fig. 39 the lower left hand key is shown as being locked from operation by its lever 31$^b$.

In order to prevent the simultaneous depression of more than one of the clerks' keys, there is mounted adjacent to each bank of clerks' keys a slide 50$^a$, see Fig. 67, with slots 50$^b$ cut therein. The forward upper edge of each of the slots 50$^b$ is inclined as at 50$^c$ with which the pins 32 of the clerk's keys are arranged to engage and thereby elevate one of the slides when any one of the said keys is depressed. The extreme upper end of each of these slides 50$^a$ is provided with an elongated slot 50$^d$ into which project pins 50$^e$ that extend from a short rock shaft 50$^f$ suitably mounted in the key frame 2 supporting the clerks' keys. As will be seen from Fig. 67, when either of the slides 50$^a$ is elevated the bottom of the slot 50$^d$ formed therein will engage with the pin 50$^e$ and rock the shaft 50$^f$ so that the pin 50$^e$ extending into the slot 50$^d$ of the other slide 50$^a$ will contact with the lower edge of said slot and thereby prevent the elevation of said slide and consequently the depressing of any other of the clerks' keys.

*Special keys.*—The three special keys 41, which represent "received on account", "charge", and "paid out" have pins 55 projecting therefrom which engage with a detent plate 56 (Fig. 42) and a sliding releasing plate 57 (Fig. 16) somewhat similar to the previously described detents and plates. The detent plate 56 has a foot 58 which is arranged to be engaged by a pin 59 projecting from a disk 60 secured to the cam shaft 11, near the end of the rotation of said shaft to operate the detent to release the key. Just after the operation of the detent a pin 61 (Fig. 16) projecing from a disk 62 also secured to the shaft 11 will engage with the foot 63 of the releasing slide 57 and positively return said slide and any key that has not been returned by its spring. This slide 57 has an upwardly extending arm 67 which at its upper end extends forwardly over the slide 49 so that any movement of the slide 49 will be conveyed to the slide 57. This arm 67 is also engaged by suitable mechanism to prevent the raising of said arm by an operation of one of the special keys until after an amount key has been depressed. This mechanism for locking said slide will hereafter more fully be described.

*"No sale" key.*—The "no sale" key 68 (Fig. 12) is mounted adjacent to the amount banks and is provided with a detent (not shown) similar to the detent of the amount banks and a suitable cam disk is provided to operate the said detent in a manner similar to the detents of the amount banks. A slide 70 suitably mounted upon the key frame 2 is moved upwardly upon the operation of the "no sale" key 68. This slide 70 is provided with a shoulder 71 which is positioned to engage a pin 72 mounted upon the forward end of a yoke shaped frame 73 and rock said frame as the slide is raised. The rocking of the frame 73 performs certain locking functions and also controls the operation of the indicator for the special transaction as hereafter more fully described. Adjacent to the slide 70 is another slide 74 provided with a foot 75. This slide is provided with a pin 76 which normally rests in the lower end of a slot 77 formed in the slide 70. The foot 75 of the slide 74 is positioned to be operated at the end of each operation of the machine by a roller 78 projecting from a cam disk 79 which is secured to the rotation shaft 11, and positively returns the slide 74 to normal position and by means of the pin 76 also returns the slide 70. This latter slide 70 is provided with a foot 80 with which a frame 81 is arranged to engage when the machine is operated without depressing the "no sale" key 68 to lock said key from operation, as will hereafter more fully appear.

*Main counter reset key.*—This resetting key 82 (Fig. 12) is provided with a pin 83 which engages an inclined slot 84 formed in the upper end of the slide 74 and thereby raises this slide independently of the slide 70 when the "main counter reset" key 82 is operated, this key being positively restored by the roller 78 contacting with the foot 75 of the slide 74 at the end of the rotation of the shaft 11. From this description it will be seen that when the "no sale" key 68 is operated, the slide 70 will be raised, and by the bottom of the slot 77 contacting with the pin 76 projecting from the slide 74 will also raise said slide, and thereby lock out the "main counter reset" key 82.

Interlocks.

Between "amount keys" and "clerks' keys."—The releasing slide 18 of each bank of amount keys is provided with a rearward extension 85, which, when the slide is raised, contacts with a pin 86 projecting laterally from an arm 87 which is secured at its rear end to a horizontal shaft 88. This shaft 88, see Fig. 25, has a forwardly extending arm 89, provided with a laterally extending pin 90 which plays in a slot 91 formed near the lower end of a slide 92. From this it will be seen that when an amount key is depressed the shaft 88 will be rocked, carrying the slide 92 upwardly. This slide 92 is provided at its lower end with an elongated slot 93 which straddles a reduced portion formed upon one end of a shaft 94. this shaft acting as a guide for said slide 92. As this slide is raised by the operation of an amount key, as previously described, a pin 95 carried by the upper end of the slide will be drawn slightly rearward as it rides in a cam groove 96 formed in a plate 97 secured to a shaft 98, the operation of the latter being fully described hereafter. By the upward movement of the slide 92 upon an operation of an amount key a shoulder 99 formed thereon will engage with a roller 100. projecting from one arm 101 of a yoke shaped frame 102 and rock said frame, which is pivoted upon a transverse rod 103. This yoke shaped frame 102, as will be seen from Figs. 14 and 16, has downwardly extending arms 104 and 105 which normally engage with the slides 42 and 67 respectively so as to prevent the operation of both the special and clerks' keys, until an amount key is operated.

Between "no sale", "special", and "clerks'" keys.—As it is frequently desired to operate the machine in order that a coin or bill may be changed, and as the operating mechanism can only be released by the operation of one of the initial keys, it is necessary to provide mechanism for unlocking the initial keys when the "no sale" key is operated. This mechanism is operated as follows: Upon the operation of the "no sale" key 68 a pin 106 carried near the inner end of the "no sale" key, see Fig. 12, contacts with the forward side of an arm 107 projecting upwardly from the frame 81. This arm 107 is centrally pivoted upon the transverse shaft 94 and the frame or bar 81 extends across the machine parallel to the shaft 94 and at its outer end is supported by an arm 109 also mounted upon the shaft 94, see Fig. 4. This arm 109 carries a pin 110 which contacts with the under side of a forwardly extending arm 111, secured at its inner end to the previously described transverse shaft 88 and through the arm 89, see Fig. 25, raises the slide 92 and rocks the yoke 102 thereby carrying the arms 104 and 105 out of the path of the slide 42 and the extension 67 of the slide 57 hereinbefore described. The movement of the frame or bar 81 by the operation of the "no sale" key, as just described, causes the bar to pass over a projection 112 formed upon each one of the amount slides 18, see Fig. 2, and thereby locks the amount keys from operation.

An additional lock for the "clerk's" key is provided which is operated by both the "no sale" and amount keys. From the previous description it will be recalled that the shaft 88 is rocked by an operation of either the amount or "no sale" keys and the rocking of this shaft carries the arm 111, see Fig. 4, rearwardly. This arm 111 is provided with a lug 113 which is withdrawn from the path of a projection 114 formed near the forward end of a lever 115 which is secured to a transverse shaft 116. This lug 113 normally rests over the projection 114 and prevents the rocking of the shaft 116 by an operation of the clerks' keys as hereafter described. The arm 111 has a circular extension 117 the end of which passes through a flange 118 formed upon an arm 119 loosely mounted upon the shaft 88. Surrounding this extension 117 and interposed between flange 118 and a shoulder 120 formed upon the arm 111 is a coil spring 121 which is compressed as the shaft 88 is rocked by an operation of either the "no sale" or amount keys. This spring 121 is of sufficient strength to return the parts secured to the shaft 88 to normal position when the keys controlling said shaft are returned to normal position. If this spring 121 should fail to return the shaft and devices connected thereto to normal position, a pin 122 carried upon one of the operating gears, will contact with a rearward extension 123 of the arm 111 and positively restore said parts to normal position. This positive return of the arm 111 will, by contacting with the pin 110 of arm 109, return the frame or bar 81 to normal position. The extension 123 passes through an opening 124 formed in the right hand register frame 125 so as to be in the path of the pin 122 carried by the operating gear which is mounted on the outside of the side frame 125. The arm 119 contacts with an arm 126 which is secured to a transverse shaft 127. The forward and upward end of the arm 126 normally contacts with a pin 128 extending inwardly from the side frame 125. From this it will be seen that the arm 126 acts as a stop for the arm 119 so that when the shaft 88 is rocked a spring 121 surrounding the extension 117 of the arm 111 can be compressed. The arm 126 forms a part of the throw-out mechanism for the totalizer as hereafter described.

Owing to the fact that the "no sale" and the three special keys control the same indicators, it is desirable that the operation of the "no sale" key may lock out the special keys, and an operation of a special key may lock out the "no sale" key and the following mechanism has been designed to accomplish this. Upon the operation of a "no sale" key the slide 70, as previously described, see Fig. 12, will be raised and the shoulder 71 located at the upper end of said slide will contact with the pin 72 carried at the forward end of an arm of the yoke shaped frame 73 which is loosely pivoted upon one of the transverse shafts of the machine. The other end of the arm of this frame 73, as shown in Fig. 16, is provided with a pin 129 which plays in a bifurcated portion formed in the upper end of a slide 130, which is mounted upon the key frame 2 by pins 131 which extend through slots 132 formed in the slide 130. Upon the raising of this slide by the yoke frame 73, as just described, inclined slots 133 in said slide, see Figs. 16 and 42, will pass from in front of the key pins 55 of the special keys 41, and bring the solid front portion of said slide into the path of said key pins, thereby locking the special keys from operation. This movement of the slide will, by means of a pin 134 carried thereby, rock a centrally pivoted lever 135 which is pivoted to the key frame 2, and operate mechanism for connecting the differentially adjustable mechanism controlled by the special keys to the operating mechanism. This slide 130 is also actuated by the special keys 41 in connection with the slide 49 which positively returns the keys to their normal position, as previously described.

The raising of the slide 130 by the operation of the special keys 41 will by a shoulder 136 formed thereon striking a pin 137 projecting from the forward end of a centrally pivoted arm 138 rock said arm so that a bifurcated portion formed in the rearward end of said arm, and which straddles a pin 139 projecting from an arm 140 extending from the shaft 127, will rock the latter shaft. The rocking of this shaft 127 will rock the frame 81 by the following means: Projecting from the shaft 127, see Fig. 25, is an arm 142 which carries a pin 141 at its forward end, which pin contacts with the lower prong of a bifurcated portion of an arm 143, the latter being loosely mounted upon the shaft 94 and secured to the locking bar or frame 81. This rocking of the frame 81 by the operation of the slide 130 from the special keys 41, will lock out the "no sale" key and the unoperated amount keys by said frame passing over the projections 80 and 112 mounted upon the slides 70 and 18 which are actuated by the "no sale" and amount keys respectively and thereby lock said keys from operation.

While a special key 41 is being depressed the amount keys 31 will be locked in their outermost position by the following mechanism: A pin 130<sup>a</sup> projecting from the slide 130, which is elevated upon the operation of any of the special keys, will contact with the forward end of an arm 130<sup>b</sup> projecting from a short shaft 130<sup>c</sup> which is suitably mounted in the key frame 2, see Fig. 16. The other end of this shaft, see Fig. 14, is provided with a downwardly extending arm 130<sup>d</sup> which, while the special key 41 is being depressed, will pass over a flange 130<sup>e</sup> projecting from the slide 42 that is operated by the clerks' keys. When the special key 41 is fully depressed the arm 130<sup>d</sup> will have passed in front of the flange 130<sup>e</sup> and so that the slide 42 may thereafter be elevated by depressing a clerk's key. This mechanism also acts as an additional lock for the special keys when a clerk's key is first operated, as the flange 130<sup>e</sup> passes in front of the forward edge of the arm 130<sup>d</sup> and thereby prevents the rocking of the shaft 130<sup>c</sup> by the pin 130<sup>a</sup> projecting from the slide 130.

*Between "clerks'" keys and the operating handle.*—As previously described, the operating handle is normally locked and is released by an operation of one of the clerks' keys only. This locking mechanism controlled by the clerks' keys will now be described. It will be recalled that the arm 115, which is fast to a transverse shaft 116, is locked until either an amount key or the "no sale" key is operated by a lug 113 secured to the arm 111, see Fig. 4. This shaft 116 extends across the machine and has two forwardly extending arms 144, see Figs. 14 and 16, which extend into the path of pins 145 projecting laterally from the slides 42 and 49 which are actuated by the clerks' keys or manipulative devices 31. It will be seen that the "no sale" or amount key having been operated, the operation of one of the clerks' keys will, through the pin 145, rock the arms 144 and shaft 116, so that a rearward extension 146 of the arm 115, see Fig. 4, will be rocked downwardly. This downward movement of the extension 146 will rock a three pronged lever 147 clockwise as shown in said figure. This lever 147 is pivoted loosely upon a transverse shaft 246, and the center prong 149 of said lever normally stands in the path of a pin 150 carried by one of the operating gears. The rocking of this three prong lever by the downward movement of the extension 146 will carry the prong 149 out of the path of the pin 150 so that the said gear may rotate. Near the end of the rotation of the operating gear, a pin 151 carried thereby will contact with the rear prong 152 of the arm 147, and positively restore said arm and the arm 115, through the extension 146, to normal position, so that the prong 149 will intercept the pin 150 and thereby prevent a second operation of the operating gearing until the arm 147 has been again tripped.

*Main counter reset key lock.*—This resetting key 82 is normally locked and is released only when it is desired to reset the totalizers to zero, and the lock for this key will be described in connection with the resetting mechanism hereinafter described.

Operating mechanism.

*Operating gearing.*—The machine is shown as a manually operated machine but the invention is not limited to such an operation, as any of the motor drives, well known in the art, may be substituted therefor. The operating crank handle 153, see Figs. 4, 5, and 6, has attached thereto an operating gear 154 mounted upon a stub shaft 155 projecting from the side frame 125. This gear 154 for half of its periphery has the teeth thereon reduced to half the width of the teeth on the remaining half of said gear. That portion of the gear which has its teeth cut away is provided with a semicircular locking disk 156 which engages with a concave portion 157 of a locking plate 158 secured rigidly to a pinion 159 which is fast to a transverse shaft 160. Shortly after the beginning of movement of the crank handle 153 clockwise one of the wide teeth of the gear 154 will contact with the tooth of the pinion 159 and start to rotate said opinion. Just at that time the end of the semicircular locking disk 156 passes beyond the central portion of the concave part 157 of the plate 158 thereby permitting the pinion 159 to rotate. This pinion is half the diameter of the gear 154 so that a half rotation of said gear will give the pinion 159 a full rotation. During the second half movement of the gear 154, the semicircular locking disk 156 will engage with the concave portion 157 and lock the pinion 159 from any accidental displacement. The gear 154 is only half the diameter of some of the gears which it operates and as these larger gears require a full rotation the operating gear 154 will require two rotations, and two rotations of this gear 154 will of necessity rotate the pinion 159 twice, but as all the work intended to be done by the rotation of the pinion 159 and the shaft 160 is accomplished during the first rotation, the second rotation of said pinion and shaft is an idle one. The gear 154 meshes with a gear 161 which carries the pins 150 and 151 previously described. This gear is an idler and is mounted upon the side frame 125. Meshing with this idler 161 is a gear 162 which is attached to a shaft 163 which is one of the main operating shafts of the machine. The gears 161 and 162 are twice the diameter of the gear 154 and consequently receive one full rotation at the two rotations given to the crank handle. Also meshing with the gear 154 is an idler 163 suitably mounted on the side frame 125, and attached to this idler is a small gear 164 which meshes with another idler 165, secured to the side frame of the machine. This gear 165 in turn meshes with a gear 166 which is secured to the cam shaft 11. The ratio of the gearing between the gear 154 and the gear 166 secured to the shaft 11 is such that for every two rotations of the crank handle 153 the shaft 11 is given one complete rotation. A ratchet wheel 167 (Fig. 65) is attached to the idler 161 and a pawl 168 engages said ratchet so as to insure the turning of the gear 161 always in one direction.

*Speed regulator.*—In order to insure a uniform operation of the machine the following mechanism is provided: Attached to the operating gear 154 is a ratchet wheel 169 with which an escapement pawl 174 engages. This escapement pawl is centrally pivoted and has a rearward extension 171 between which and a lug 172 projecting from the side frame is interposed a spring 173 so as to force the upper arm of the escapement pawl normally into engagement with the ratchet wheel. An adjusting screw 174 is provided so as to regulate the tension of the spring 173 and thereby govern the operation of the escapement pawl. When the machine is properly operated both arms of the pawl will pass idly into and out of engagement with the ratchet 169 but if an abnormal rate of speed is attained the teeth of the ratchet will impart such a sudden blow to the upper arm of the escapement pawl as to throw the lower member of said pawl into full engagement with the ratchet and thereby lock said ratchet and the operating handle 153 to which it is connected. It is obvious that when the tension on the spring 173 is increased it will require a greater speed of the ratchet 169 to throw the lower arm of the escapement pawl into full engagement with the ratchet teeth than if the spring is under a light tension only.

Differentially adjustable elements.

The differentially adjustable elements are constructed to be positively connected to the invariably movable operating mechanism, and the differential movement of said elements are controlled by the manipulative devices or keys of the machine.

*Controlled by the amount keys.*—There has been shown only one set of the differential adjustable elements for the amount banks, but as all of them are similar a description of this one will suffice for them all. As previously described, the amount keys 1, see Fig. 2, move a releasing slide 18 mounted upon the key frame by key pins 4 carried by the keys which engage with inclined slots 19 formed in the slide 18. A pin 22 carried by said slide will, as previously described, rock the pivoted arm 24 by passing up the inclined slot 23 formed in the lower end of said arm, there being one of these arms 24 for each bank of amount keys. Each of these arms 24 carries at its upper end a laterally extending pin 175 which engages with the forward edge of a spear shaped latching pawl 176 (Figs. 2 and 26) which is pivoted to the side of the differentially adjustable element or rack bar 177, the latter being guided in its movement by the transverse shaft 98 at its upper end and at its lower end by the shaft 88. At the side of the pawl 176 opposite to that with which the pin 175 contacts it is pivoted to the lower end of a rack bar 179. This rack bar at its upper end is pivoted to a link 180 which in turn is pivoted to the side of the adjustable element 177. From this construction it will be seen that as the slide 18 is elevated the arm 24 will be rocked and pin 175 carried thereby will contact with the pawl 176 and rock said pawl so as to move the rack 179 into engagement with a driving pinion 181 secured to the operating shaft 160. The rack 179 on its forward edge has a projection 182 against which one end of a coil spring 183 contacts, the other end of said spring contacting with the rear end of a latching pawl 184. As the rack 179 is moved rearward upon depressing one of the keys it will be seen that it has a slight upward movement owing to the location of the pivotal points of the pawl 176 and the link 180. This slight upward movement of the rack 179 will compress the spring 183, and as the rack 179 reaches the limit of its rearward movement the said spring 183 will force the pawl in front of a lug 185 projecting from the rack 179 and thereby hold the rack in its rearward position in engagement with driving pinion 181.

The front edge of each adjustable element 177 is provided with a series of steps 186 which are arranged to contact with the inner ends of the depressed keys and be arrested thereby. This is true of all the keys with the exception of the "nine" key. This key is shorter than the rest and where the inner end of said key would ordinarily project through the key frame a stationary lug 187 is provided with which the ninth step of the adjustable element 177 contacts when this key is depressed. Each bank of keys is arranged with relation to the steps 186 of the adjustable element 177 coöperating therewith in such a manner that, upon the depression of the "one" key and an operation of the crank handle, the adjustable element 177 will be permitted to move one step while upon the depression of the "five" key said element will move five steps, and when the ninth key is depressed the element will be moved until it has moved nine steps, when it will be stopped by the stationary lug 187 projecting from the key frame.

In order to permit the differential adjustment of the element 177 it is necessary that the rack 179 carried thereby should be disconnected from the driving pinion 181 at different times. This disconnection of the rack 179 from the pinion 181 is accomplished in the following manner: A stepped plate 188 is carried by the differential element 177, said element having pins 194 riding in slots 195 in the stepped plate, so that the plate may have a slight movement relative to the differential element. The steps of this plate are slightly lower than the steps 186 of the adjustable element 177 so that the inner end of the depressed key will first come into contact with the step of the plate 188 and arrest the movement of said plate while the element 177 will continue to have a slight downward movement until its corresponding step contacts with the inner end of the depressed key. This independent movement of the element 177 which carries the latching pawl 184 is sufficient to bring a pin 189 (Fig. 26), carried by latching pawl 184 and projecting through the element 177, into contact with the lower portion of a recess 190 formed in the plate 188 and rock said pawl 184 about its pivot 191 so as to withdraw the rear end of the pawl from engagement with the lug 185 of the rack 179. This rocking of the pawl 184 will slightly compress the spring 183 so that when the latch is withdrawn from the lug 185 this spring will disconnect the rack 179 from the pinion 181. In the normal position the lower end of each of the pawls 176 connected to the adjustable elements engages with a lug 193 projecting from the key frame and thereby forms a lock to prevent the accidental displacement of the adjustable element. It is to be understood that the adjustable elements or racks 177 are not directly geared with the operating pinions 181 but are to one side of the said pinions and are only connected thereto by the racks 179. In order to prevent any friction between the latching pawl 184 and the lug 185 of the rack 179 the slide 18 (Fig. 2), as previously described, has a rearwardly extending arm 30 which contacts with a pin 196 when the slide is positively returned at the end of the operation of the machine and slightly withdraws the edge of the pawl 184 out of contact with the lug 185.

*Controlled by the clerks' keys.*—The connection of the adjustable element controlled by the clerks' keys or manipulative devices with its operating pinion, is very similar to that described in connection with the amount keys, with the exception that instead of employing an independent latch to hold the adjustable element connected to its operating pinion, the step plate carried by said element is employed for that purpose. Referring to Fig. 14 of the drawings it will be seen that upon the operation of any of the clerk's keys 31 the slide 42 will be elevated and by the pin 51 carried thereby will rock the arm 53 about its pivot 54. The upper end of this arm 53 carries a pin 197 which contacts with one prong of a three pronged pawl 198 pivoted to the clerks' adjustable element 199. The downwardly extending prong of the pawl 198 is connected to the lower end of a rack 200 which at its upper end is connected to a link 201 which is pivoted to the adjustable element 199. The other prong of the pawl 198 is formed like a goose neck against which one end of a coil spring 202 contacts, the other end of said prong engaging with an offset of a slide 203 mounted upon the adjustable element 199 by pins 204 projecting from said element through slots 205 formed in the slide 203. Upon the operation of one of the clerk's keys 31 the three pronged pawl 198 will be rocked and by the link 201 carry the rack into engagement with the operating pinion 181 for the clerk's bank of keys. This rocking of the pawl 198 will compress the spring 202 so that when the rack 200 is in engagement with the pinion 181 a shoulder 206 extending rearwardly from the slide 203 and normally held in its uppermost position by a shoulder 207 on the rack 200 will be carried in front of the shoulder 207 and thereby lock the rack in engagement with the operating pinion 181. Now as the operating pinion is turned in the direction of the arrow shown in Fig. 14, the adjustable element 199 will be lowered until one of the steps formed on the plate 203 carried by said adjustable element contacts with the inner end of the depressed key. This will arrest the plate 203 while the adjustable element 199 will have a slight additional downward movement. This additional movement of the element 199 will carry the shoulder 207 of the rack 200 below the shoulder 206 of the step plate 203 so that the spring 202 will rock the three pronged pawl 198 about its pivot and thereby carry the rack 200 out of engagement with its operating pinion 181. The adjustable element 199 is returned to normal position by mechanism hereafter described.

Owing to the fact that the clerks' keys are arranged in two banks and in order to have the differential element 199 controlled by all of said keys, the step plate 203 mounted on the adjustable element 199 has lateral extensions 208, as shown in Fig. 17 of the drawings, so that the steps formed on the extensions 208 will be in the path of the clerks' keys that are in the same bank with the special keys.

*Controlled by special transaction keys.*— The special transaction manipulative devices or keys 41 through engagement of their key pins 55 with the sides of inclined slots 133, elevate a slide 130. The raising of this slide 130 will rock an arm 135, as a pin 134 carried by said slide projects in an inclined slot formed in the lower end of the arm 135. The upper end of this arm carries a pin 209, see Fig. 16, which contacts with the front side of a pawl 210 pivoted to the adjustable element 211 controlled by the special keys, and this pawl below its pivot point has connected thereto the lower end of a rack 212, the upper end of which is connected by a link 213 to the adjustable element 211. This pawl 210 also has a goose neck portion 214 with which one end of a spring 215 contacts; the other end of said spring bearing upon an offset of a step plate 216 slidingly mounted upon the adjustable element 211. The steps of this plate 216 are arranged to contact with the inner ends of the special transaction keys 41 when said keys are operated. When the parts are in normal position the lower end of the pawl 210 will engage with a lug 217 projecting from the key frame and prevent the accidental movement of the adjustable element 211.

Upon the operation of one of the special keys 41 the pawl 210 will be rocked about its pivot, and will carry the rack 212 into engagement with its operating pinion 181 fast to the operating shaft 160. The rocking of this pawl compresses the spring 215 until the rack 212 is fully in engagement with the pinion 181. When this rack 212 is in engagement with the pinion 181 a shoulder 218 formed on the forward side of said rack will pass behind a shoulder 219 formed upon the slide 216 and thereby permit the spring 215 to force the slide 216 downwardly, which movement will carry the shoulder 219 in front of the shoulder 218 of the rack 212 and will lock said rack in engagement with its operating pinion 181. Upon the rotation of the pinion 181 by the operation of the crank handle 153, the adjustable element 211 which is controlled by the special transaction keys will be moved downwardly carrying the plate 216 therewith until one of the steps on said plate contacts with the depressed special transaction key, the pinion in the meantime carrying the adjustable rack 211 a slight additional distance until the shoulder 218 passes below the shoulder 219 formed upon the slide 216. At this moment the spring 215 will rock the pawl 210 so as to carry the rack 212 out of engagement with its operating pinion thus permitting the latter to continue its movement independently of the rack.

Owing to the fact that the type-carrier and indicator, hereinafter described, for the special transaction keys also contain a character to indicate and record "No Sale" the same mechanism can be used to connect the differentially adjustable element 211 to the operating pinion 181 when the "No Sale" key is depressed. It will be recalled that upon the operation of the "No Sale" key the yoke frame 73 is rocked, and that, by the pin 129 carried in the forward ends of one of the arms of said yoke frame, the slide 130 is elevated. This elevation of the slide 130 will, through the pin 134 carried thereby, rock the releasing arm 135 so as to rock the pawl 210 carrying the rack 212 into engagement with the pinion 181. As the adjustable element 211 is carried downwardly by the rotation of the pinion 181 a stationary lug 220 will engage with the uppermost step of the slide 216, and thereby disconnect the differentially movable element from the operating pinion 181. This movement of the element 211 controls the setting of the "No Sale" character to indicating and printing position as hereafter described.

*Indicating mechanism.*

All of the indicators hereafter described are constructed to move from their previous indicating position to a position to indicate a new transaction, without first returning to their zero position. This construction is very valuable as it saves considerable wear and tear on the machine, as with the former style of indicators if "nine" was exhibited and it was desired to indicate "eight" the indicator would be first returned to zero position and then back to "eight," moving a distance of seventeen spaces whereas with the present form of indicating mechanism the indicator would move one space only from "nine" to "eight." With this general description of the operation of the indicating mechanism a more detailed description will now be given of the amount, transaction, and clerks' indicators.

*Amount indicators.*—Referring now to Fig. 2 it will be recalled that each differential element 177, controlled by its bank of manipulative devices, in its downward movement rotates a disk 192 loosely mounted upon a transverse shaft 221. Attached rigidly to each one of the disks 192 is a segmental rack plate 222 the teeth of which engage with teeth 223 formed upon the forward underside of a plate 224 and move said plate forwardly as the disk 192 is rotated. Just previous to the forward movement of the plate 224 a cross bar 225 supported in the lower end of arms 226 which are pivoted upon the amount indicator shaft 227, is permitted to move forward by cams 228 (only one of which is shown), which pass out of engagement with rollers 229 projecting from the arms 226, so that the upturned portion 230 of each rack bar 224 will not be intercepted by the cross rod 225. Each of the rack plates 224 is guided in its movements by rollers 224ª which are loosely mounted upon transverse shafts 224ᵇ and 246.

In the position shown in Fig. 2 the indicator 231 is at zero, and as the rack plate 224 moves forwardly the lower end of a lever arm 232 secured thereto is also moved forwardly. This arm has a roller 233 carried in a notch in a floating arm 234 which is pivoted upon a transverse shaft 235. The lower end of this arm 234 has a rearward extension 236 which hooks around a collar 237 upon the shaft 163. In the position shown in said figure the arm 234 on account of its hook extension 236 cannot be moved any farther forward so that as the rack plate 224 is moved forwardly the lever arm 232 is rocked with the pin 233 as its fulcrum and this rocking of the arm 232 will carry the segmental rack portion 238 of said arm rearwardly, and turn a segmental gear 239 as the teeth of the rack 238 engage with teeth 240 formed upon the gear 239. By the rotation of the gear 239 the indicator 231 is rotated through a gear 241 attached to said indicator, which engages with the teeth of the gear 239, and brings said indicator to a position to indicate the extent of movement imparted to the adjustable element 177 by its operating pinion 181. After the indicator 231 has been properly set, an alining pawl 242 rigidly mounted upon a transverse shaft 243 will engage with one of the V shaped notches formed in a disk 244 fast to the gear 239 and aline said indicator, the pawl 242 being withdrawn from engagement with the notched plate 244 while the indicator 231 is moving by devices hereafter described. Shortly after the indicator 231 has been set the cams 228, only one of which is shown, will engage the rollers 229 projecting from the arms 226 and move said arms and the rod 225 carried at the extreme end of the arms rearwardly. This rearward movement of the rod 225 will, through the upright portions 230 of the rack plates 224, also carry said plates rearwardly, which in turn will rotate the disks 192 and restore the adjustable elements 177 to normal position. There is an alining pawl 245 for each one of the disks 192 and said alining pawl is secured to and projects forward from the transverse shaft 246. This shaft also has fast thereon an upwardly extending arm 247, provided with a roller 248 at its upper end which plays in a cam groove 249 formed in a disk 250 secured to the driving shaft 163. The configuration of the cam groove 249 is such that upon the beginning of movement of the shaft in the direction of the arrow shown in Fig. 2, each of the pawls 245 will be rocked out of engagement with the V shaped alining notches of the disks 192 to permit the downward movement of the adjustable elements 177. After the disk 192 has been properly set, the pawl 245 will be rocked into engagement with one of the notches in said disk and held there until the frame comprising the arms 226 and the rod 225 starts rearwardly. Just at this moment the pawl 245 will again be rocked out of engagement with its alining notch, to permit the rod 225 to return the rack plate 224 and devices previously described, to normal position, when the pawl will again be rocked into engagement with the notches on the disk 192. While each of the rack plates 224 and its connected parts, including the arm 232, is being returned to its normal position the indicator alining pawl 242 is held in engagement with one of the notches in the disk 244, so that the rack teeth 238 upon the upper edge of the lever arm 232 will act as a fulcrum about which the said arm moves. This rearward movement of the lower portion of the arm 232 will, through the roller 233 carried thereby, carry the hook extension 236 of the arm 234 rearwardly, an extent depending on the position given the indicator.

At the succeeding operation of the machine, if the amount to be indicated is less than that previously indicated, the rack plate 224 will be adjusted by the downward movement of the differential element 177, and then latched by the alining pawl 245 engaging with a notch of the disk 192. By the continued movement of the driving shaft 163, a cam 251 carried thereby will contact with a roller 252 projecting from the arm 234 near its lower end, and cam the lower end of said arm forwardly. This forward movement of the lower end of the arm 234 will, through the roller 233 carried by the arm 232, rock the segmental portion 238 of said arm 232 forwardly and carry the indicator 231 to the desired position.

From the above description it will be seen that in operating the machine to indicate any amount, the lever arm 232, when the indicator stands at zero, will be rocked with the roller 233 as its fulcrum, and after the indicator has been adjusted and locked by its alining pawl, the rack plate 224 which determines the amount of movement of the indicator, will be returned to its normal position. During this movement the teeth 238 located at the upper end of the lever arm 232 will act as a fulcrum for said arm. At a succeeding operation of the machine, if it is desired to indicate an amount less than that previously indicated, the cam 251 secured to the driving shaft 163 will act upon the roller 252 of the arm 234 and move said arm and also the arm 232 in a forward direction, with the lower end of the latter arm as its fulcrum point.

Owing to the length of the connection between the adjustable elements 177 and the indicators 231 there is danger of slight overthrow of the indicator, due to lost motion between the various connections. This danger is the greatest when the indicator is moved from "zero" to "nine" or from "nine" to "zero" and to prevent any overthrow of the indicators at these points the following mechanism is provided: In Fig. 2 the indicator 231 is shown in "zero" position and if it is desired to indicate "nine" the disk 244 is rotated in the direction of the arrow surrounding the shaft 235. This disk 244 has extending laterally therefrom a pin 257 which, when the indicator reaches "nine" position, contacts with a forward projection 258 of an arm 259 extending up from the shaft 243 and thereby arrests the disk 244 and the indicator 231 connected thereto. In moving from "nine" to "zero" an extension 260 of the alining pawl 242 is in the path of a shoulder 261 formed by enlarging a portion of the disk 244 and will contact with the head of the extension 260 when the disk 244 and indicator connected thereto is returned to normal or "zero" position, and thereby arrest said indicator so that the alining pawl 242 will engage in the proper notch formed on the disk 244.

It is to be understood that there is one set of the above described devices for actuating the indicators for each bank of amount manipulative devices.

The indicators 231 indicate to the front of the machine while another set of indicators 253 are arranged to indicate at the back of the machine, see Fig. 1. The movement from the front to the back set of indicators is conveyed by a series of shafts 254 and pinions 255 which mesh with gears 256 attached to the indicators 231 and 253, as is well known in the art.

*Clerks' indicators.*—The mechanism for operating the clerk's indicator under the control of the clerk's keys is substantially the same as that described in connection with the amount indicators and will now be described. The clerk's differentially adjustable element or rack bar 199 meshes at its lower end with a segmental rack arm 262, see Fig. 14, forming a part of a yoke frame 263 which is loosely pivoted upon the transverse shaft 221. The other arm of this frame 263 has attached thereto a segmental rack 264 which meshes with a rack plate 265, this plate in turn having pivotally connected thereto the lower end of an arm 266 which is rocked with a pin 267 as its fulcrum when the said rack plate is moved forwardly by the downward movement of the adjustable element 199. This forward movement of the lower end of the arm 266 moves the upper end rearwardly which end is provided with a segmental rack portion 268 meshing with gear portion 269 of a plate 270, provided on its periphery with teeth 271 which mesh with an idler 272, the latter in turn meshing with a pinion 273 mounted upon one of the machine frames 125. This pinion 273 meshes with a gear 274 which in turn engages a similar gear 275 attached to the clerk's indicator 276. This train of intermediate gears is provided in order to locate the clerk's indicator above the amount indicators as shown in Figs. 1, 14, and 15. Attached also to the yoke frame 263, which is connected to the clerk's differential element 199, is a segment 277 which meshes with a segmental rack 278 formed upon the forward end of a centrally pivoted plate 279. The rear end of the plate 279 is also provided with a segmental rack 280 which meshes with a pinion 281 suitably mounted upon one of the machine frames, and this pinion carries a bevel gear 282 which meshes with a bevel gear 283 suitably mounted upon a finger shaft 284 connected to the multiple drawer mechanism. This shaft, after being properly positioned, is elevated by a cam 285 upon the driving shaft 163, which engages with a roller 286 projecting from the upper end of one of the arms of a bell crank lever 287, the other arm of said bell crank lever being suitably connected to raise said shaft 284. As this multiple drawer releasing mechanism forms no part of the present invention a further description of same need not be given. Owing to the location of the multiple drawer mechanism the rear end of the rack plate 265 differs slightly from the rack plate 224 shown in connection with the amount indicators. The rear end of the plate 265 is, nevertheless, engaged by the bar 225 in the same way as are the projections 230 of the rack plates 224, to return the plate 265 and coöperating mechanism to normal position at the end of each operation of the machine. Alining pawls 242 and 245 as well as the arms 259 and 260 are provided for the clerks' indicators to perform the same function as they perform in connection with the amount indicators.

*Special indicators.*—The differential movement of the element 211, see Fig. 16, which is controlled by the special keys 41 and the "no sale" key 68, is conveyed by a pinion 288 secured to one of the transverse shafts and this shaft carries a similar pinion 289 near the center thereof which meshes with a rack bar 290, see Fig. 12, suitably mounted upon the transverse shafts 88 and 98. This rack bar meshes with a disk 291 similar to the disk 192 with which the differential element controlled by the amount keys engages. This disk 291 carries a segment 292 which meshes with a rack plate 293 and the latter through an arm 294 conveys the movement of said rack plate 293 to a special indicator 295 located directly above the front set of amount indicators 231 and in alinement with the clerk's indicator 276 through suitable intermediate gearing as shown in Figs. 12 and 13 and fully described in connection with the clerks' indicators.

*Flashes.*—A novel form of concealing means for the indicators is provided so that only the indicators involved in the transaction are exhibited to the customer and clerk, thereby overcoming any confusion as to the amount indicated. In previous machines flashes have been provided for concealing the indicators until near the end of the operation of the machine, when they were withdrawn, and in transactions involving lower denominations only the higher denomination indicators to the left of the indicators exhibiting the amount of the transaction would also be exposed, thereby causing confusion.

Referring now to Figs. 4, 27, and 28 a description of the improved form of concealing means for the indicators will be given. The rock shaft 243 carrying the alining pawls 242 is provided with a forwardly extending arm 296 which has at its forward end a roller 297 that plays in a cam groove 298 formed in a disk 299. The first movement of this cam disk 299 rocks the arm 296 and thereby the shaft 243, which withdraws the alining pawls 242 out of engagement with the notches formed in the disks 244. This movement of the rock shaft 243 also moves an arm 300 secured thereto forwardly and downwardly, see Fig. 4. This arm 300 has at its free end a pin 301 which moves in a slot 302 formed in an arm 303 extending downwardly from a hub 304 loosely mounted upon the shaft 235. This movement of the arm 300 rocks the arm 303 forwardly and an arm 305 extending upwardly from the hub 304 rearwardly. At its upper end the arm 305 is pivoted to one end of a link 306, the other end of said link being pivoted to the outer end of a screen 307, the latter being pivoted at its other end about the indicator shaft 227. Another upwardly extending arm 308 is secured to the rock shaft 243, and at its upper end is provided with a pin 309 which plays in an elongated slot 310 formed in an arm which is pivoted about the shaft 227, and carrying at its outer end a screen or concealing means 311.

From the above description it will be seen that upon the first movement of the disk 299, the upper ends of the arms 300 and 308 will be rocked forwardly and will, through the pin 301, rock the arms 303 and 305 so that the flash 307 will be raised to conceal the back set of indicators 253 while the arm 308 will, through the pin 309 and the slot 310, raise the screen 311 in front of the front set of indicators 231. This construction for raising the screens 307 and 311 upwardly is necessitated on account of the position of the shafts 250 and pinions 255 which transmit the movement of the front indicators to the back set of indicators.

The above described flash mechanism, with the exception of the novel means for raising both flashes upwardly, is substantially the same as heretofore employed, and next a description of the individual flashes or concealing means for the indicators will be given. To each one of the front and back amount indicators is secured a disk 312 with a notch 313 cut therein. When the indicator stands at zero as shown in Fig. 28, a roller 314 extending laterally from an arm 315, which is pivoted loosely upon one of the shafts 254, rests in this notch 313 and it will be seen from the shape of such notch, that upon the first movement of the indicator the free end of the arm 315 will be elevated. The free end of each arm 315 carries a pin 316 which projects into a slot 317 formed in an arm 318 loosely mounted upon the indicator shaft 227. Each one of these arms 318 carries at its front or rear end, in accordance with which set of indicators it is employed, a screen 319 which is moved from its concealing position by the first movement of its indicator, the indicators in the meantime being concealed by the main flashes 307 and 311. Each of the screens 319 is provided at its upper end, see Fig. 27, with a laterally extending projection 310 which overlaps the screen to the right thereof so that when one of the screens 319 is moved by the rotation of its indicator all of the screens for lower denominations to the right will also be withdrawn to expose the indicators, but the screens to the left will be left in concealing position. The screen 319 for the units of cents indicator, which is the right hand screen shown in Fig. 27, is provided with a flange 321 so that if the units indicator is the only one to be moved it will carry the screen of the tens indicator to expose the zero of the tens indicator so as correctly to indicate the amount. The weight of the free ends of each of the arms 315 is sufficient to carry the screens 319 to concealing position when the indicators are at home position and when the machine is operated after the "no sale" and clerk's key have been depressed, all of the screens will remain in concealing position as all the amount indicators are brought to zero position.

Shields 322 (Fig. 1) are secured to the frame work of the machine and are provided with openings 323 so as to indicate singly the clerk's initial, the kind of transaction, and the amount of said transaction.

*Registering mechanism.*

The registering mechanism comprises a plurality of totalizers, a number of which are adapted to register separately the amounts taken in by the various clerks employed in the establishment and a grand totalizer which registers amounts entered on any of the clerk's totalizers. The machine is further provided with special totalizers for "charge" "received on account" and "paid out" transactions, and whenever a transaction is entered on any of these special totalizers, the clerks' as well as the grand totalizer will be held out of engagement with registering racks controlled by the differentially adjustable elements, already described which are in turn controlled by the amount manipulative devices.

*Grand totalizer.*—This totalizer comprises a plurality of registering elements or wheels 324 (Figs. 2, 4, and 7 to 11 inclusive) which are mounted upon a shaft 325, the latter being supported in the side arms of a frame 326 which is pivoted upon stub shafts 327 projecting from the machine frame 125. Each of the arms of the frame 326 is provided at its extreme rear end with a roller 328 (Fig. 4) which projects into a slot 329 formed near the upper end of an arm 330. The extreme upper end of the said arm 330 is bent so as to form a hook which passes around the shaft 98, the latter acting as a guide for the upper end of said arm. At its lower end the arm 330 is forked and straddles a collar 332 formed upon the cam shaft 11. Pivoted to the forward prong of the lower forked end of the arm or slide 330 as at 333 is a three pronged lever 334. The lower forked end of the slide 330 passes between a pair of cams 335 and 336 which are secured to the shaft 11. The first movement of the operating handle 153 starts to rotate the shaft 11 in the direction of the arrow shown in Fig. 4 and the cam 335 will immediately engage with a roller 337 projecting from the downwardly extending arm of the lever 334, and carry said lever and the arm or slide 330 to which it is pivoted, downwardly. This downward movement of the slide 330 will rock the frame 326 carrying the registering wheels 324 so that pinions 338 secured to the wheels 324 will engage with rack portions 339 of the adjustable elements 177 controlled by the amount manipulative devices. This movement of the grand totalizer frame occurs immediately upon the starting of the crank handle 153, and as soon as this is accomplished the operating pinions 181 on the shaft 160 will be rotated and the differentially movable elements 177 that have been connected to said pinions 181 by the manipulation of the amount manipulative devices 1, will be carried downwardly. Shortly after the differential elements 177 have been given their movement by the pinions 181 to register the amount upon the wheels 324 of the grand totalizer, the cam 336 secured to the shaft 11 will contact with a roller 340 projecting from the slide 330 and raise said slide to its normal position, the latter in turn rocking the totalizer frame 326 so as to carry the pinions 338 out of mesh with the rack portions 339 of the differential elements 177. The shapes of the cams 335 and 336 are such as to prevent any accidental displacement of the slide 330 and the totalizer frame 326 connected therewith. The extreme upward end of the rearward arm of the lever 334 pivoted to the slide 330 is provided with a roller 341 which normally contacts with the forward edge of the previously described pawl 126 so as to prevent the rocking of said lever 334 about its pivot when the roller 337 of said lever is engaged by the cam 335. The lever 334 is prevented from rocking in a clockwise direction by a pin 342 carried on slide 330 which contacts with the forward side of the rearwardly extending arm of said lever. This rearward arm of said lever is also provided with a roller 343 which is similar to the roller 341 and is arranged to be used in connection with the mechanism for maintaining the totalizer out of operative relation with the adjustable elements 177 hereafter described. It is to be understood that there is one of these slides 330 and coöperating mechanism at each side of the totalizer frame 326.

*Clerks' totalizer.*—The differential movements of the elements 177 by the operating pinions 181 are conveyed to two sets of racks 344 (Figs. 23 and 36) for actuating the clerks' and special totalizers, by a series of pinions and transverse shaft located directly in rear of the differentially movable elements 177. The upper shaft 345, see Fig. 2, is actuated by the units of cents element 177 through a pinion not shown but which is similar to pinions hereafter described and this shaft extends to the left of the machine and is provided with pinions for actuating the units of cents racks 344 of each set of racks. The tens of cents shaft 346, which is fourth from the top as shown in Fig. 2, is provided with a pinion 347 which is similar to the pinion mentioned in connection with the units of cents. This pinion secured to the tens of cents shaft meshes with the rack 179 carried by the adjustable element 177 shown in Fig. 2, so that any movement of said element by its rack 179 and operating pinion 181 will be conveyed to the pinion 347 of the tens of cents shaft. This shaft like the units of cents shaft extends toward the left of the machine and is provided with two additional pinions, only one of which is shown, see Fig. 36, which engage with the racks 344 for actuating the tens of cents registering wheels of the clerks' and special totalizers. The other shafts 348, 349, 350, and 351 are driven in the manner just described and actuate racks 344 for the "dollars", "tens of dollars", "hundreds of dollars", and "thousands of dollars" elements of the clerks' and special totalizers. The third shaft from the top is connected with the differentially adjustable elements 211 controlled by the special transaction keys as previously described.

Each clerks' totalizer comprises a plurality of registering wheels 352, see Figs. 29 to 33 inclusive, which are mounted upon a shaft 353 supported in the side arms of a frame 354. These frames are supported by partitions 355 and are arranged to be rocked by their respective manipulative devices or keys 31 so as to bring pinions 356 into engagement with the actuating racks 344. These pinions 356 are secured to the registering wheels 352 so that any movement imparted to the pinions 356 by the racks 344 will necessarily be imparted to the wheels 352 of the clerks' totalizer.

In normal position the clerks' totalizers are latched in their outer position free of the actuating racks 344 and are arranged to be tripped and positively moved into engagement with said racks by the manipulative devices 31. Upon depressing any one of the clerk's keys 31 its pin 32 (Fig. 29), will contact with a flange 357 of a pawl 358 pivoted to the partition 355 and withdraw a locking shoulder 359 from engagement with a pin 360 projecting from one of the side walls of the frame 354 of the totalizer and the continued movement of said key will carry its pin 32 into contact with a flange 361 of a pawl 362 pivoted to a slide 363. This pawl is provided with a slot 364 the walls of which engage with the pin 360 projecting from the totalizer frame 354. From this description it will be seen that the latching pawl 358 will be first withdrawn and the continued movement of the key will depress the throwing pawl 362 so as to carry the registering elements of the clerks' totalizer into engagement with the actuating racks. This, of course, happens before any movement is imparted to the racks.

After the amount has been registered upon the clerks' totalizer by movement of the actuating racks 344, the said totalizer will be positively moved out of engagement with the racks, after which the racks are returned to their normal position by the return of the differential elements 177. This positive return for the clerks' totalizers is as follows: For each totalizer there is a pin 365 projecting from the partition 355. When the throwing lever 362 of the clerks' totalizer is actuated by the key pin 32 to throw the totalizer in engagement with the actuating racks a shoulder 366 formed on the lever 362 passes around its pin 365. The lever 362 is pivoted to a slide 363 and after the amount has been registered upon the totalizer this slide 363 is lowered by a cam 367 secured to the shaft 11 contacting with a pin 368 projecting from the slide. This lowering of the slide will carry with it the operated lever 362 the shoulder of which rides upon the pin 365 and thereby return said lever to its normal position. This return of the lever will also return the clerks' totalizer as one wall of the slot 364 engages with the pin 360 projecting from the totalizer. It will, of course, be understood that the clerk's key or manipulative device is released and positively restored to its normal position, as previously described, before the slide 363 is operated to restore the totalizer to its normal position. When the totalizer is finally restored the shoulder 359 of the latching pawl 358 will spring into engagement with the pin 360 projecting from the totalizer frame, and hold said frame in its outer position. A cam 369 secured to the shaft engages with a pin 370 projecting from the slide 363 and positively restores the slide and throwing pawls connected thereto to normal position, after which the cam passes clear of the pin 370, so that the slide 363 may be withdrawn by suitable mechanism when it is desired to operate the machine without throwing in one of the clerk's totalizers as will be hereafter more fully described. This slide 363 is normally maintained in its upper position by a light coil spring 371 which is withdrawn when it is desired to move the slide independently of its operating cams.

*Special totalizers.*—The special totalizers are identical with the clerks' totalizers and are similarly mounted upon partitions 355 the only difference being that instead of having the throwing levers 362 mounted upon the slide 363 the said slide is cut away as shown in Figs. 34 and 35, and the levers are mounted upon a slide 362ª located adjacent to the slide 363. Upon the operation of one of the special transaction keys 41, its key pin 55 will contact with the flange 357 at its latching pawl, and withdraw said pawl from out of engagement with the pin 360 projecting from the totalizer frame. The continued movement of this key or manipulative device 41 will bring its pin 55 into contact with the flange 361 of its throwing lever 362 and by said lever positively move the elements of the totalizer into engagement with the actuating racks 344. The initial movement of the special key will by its pin 55 raise the slide 130, see Fig. 16, and by the shoulder 136 formed near the lower end of said slide rock the arm 138 and through arm 140 rock the shaft 127. This shaft 127, see Figs. 29 and 34, has forwardly extending arms 372 the forward ends of which contact with pins 373 projecting from the slides 363 and thereby lower the slides. This lowering of the slides 363 will carry the throwing levers 362 out of the path of the key pins 32 of the clerks' keys 31 so that when one of the latter is operated to release the machine it will not throw its totalizer into connection with the actuating racks 344. This movement of the slides 363 will also rock the latches 358 by the throwing levers 362 pivoted upon the slides 363 contacting with pins 374 projecting from the latch pawls 358, thereby withdrawing the flanges of said pawls out of the path of the key pins 32 of the clerks' keys 31. This movement of the slides 363 will carry the shoulders 366 of the throwing levers 362 over the pins 365 projecting from the partitions 355 in which position the levers positively lock out the various clerks' totalizers.

In order to prevent the tensioning of the springs 371 and thereby increasing the power needed to operate the special keys, the said springs are rocked out of the path of the slides 363 when any one of the special keys is operated, by the following means: Extending up from each of the arms 372 secured to the shaft 127 is an upright portion 417 having a laterally projecting pin 418, which, when the shaft 127 is rocked by the operation of one of the special keys, engages with the lower end of a lever 419 which is provided with a slot 420 through which passes a pin 421 projecting from the partition 355, and by thus rocking this lever 419 a flange portion 422 thereof will be withdrawn from under a shoulder 423 formed upon the slide 363. Passing through this flange 422 is the upper end of a leaf spring 424 which is secured at its lower end to a flange 425 projecting from the partition 355. Surrounding this leaf spring 424 is a coil spring 371 which is interposed between the flange 422 formed on the lever 419 and the flange 425 projecting from the side frame 355. Ordinarily when a cash transaction is to be entered in the machine the movement of the slide 363 will compress the coil spring 371 by the shoulder 423 formed on said slide contacting with the flange 422 of the lever 419 thus moving the lever 419 with the slide 363. Upon the operation of a special key the lever 419 will be rocked as previously described thus carrying the flange 422 from out of the path of a shoulder 423 so that the movement of the slide will be independent of the lever 419 thereby relieving the special keys of the work of compressing the springs 371. After the special key has been released and the slide 363 returned to its normal position by its cam the leaf spring 424 will carry the flange 422 under the shoulder 423 of the slide 363.

Projecting from the clerk's and special totalizer frames, see Fig. 37, are pins 375 with which hooks 376 formed upon a slide 377 engage at the beginning of the operation of the machine, positively to lock the totalizer that is brought into engagement with the actuating racks, and also positively to lock out the unoperated totalizers. This slide is returned to normal position just previous to the operation of the slide 363 carrying the throwing elements 362 so as not to interfere with the return of the totalizer to its normal inoperative position. The operation of the slide 377 is controlled by cams 378 and 379 which engage with rollers 380 and 381 respectively projecting from the side of the slide 377.

It was previously mentioned that the throwing elements 362 operated by the special keys 41 were mounted upon a slide adjacent to the slide carrying the throwing levers for the clerks' totalizers that are located in the same bank with the special totalizers, in order to permit the movement of the slides carrying the clerks' totalizer throwing levers independently of the movement of the slide carrying the special totalizers' throwing levers. This is done in order to permit the operation of a clerk's key without moving its counter or totalizer into engagement with the actuating racks 344. The slide for operating the clerks' totalizers that are mounted in the same bank with the special totalizer is provided with a pin 382 (Fig. 34) which plays in a slot 383 formed in the slide 362ª carrying the throwing levers of the special totalizers. The movement imparted to the clerk's slide 363 by the operation of one of the special transaction keys is only sufficient to move the pin 382 of the clerk's slide to the end of the slot 383 and the further movement of this slide by its cam 367 secured to the rotation shaft 11 also moves the slide carrying the throwing levers 362 of the special totalizers so that the shoulders 366 of said levers will ride upon the pins 365 projecting from the partition 355 and positively force out the special totalizer that is in engagement with the actuating racks 344.

The cam shaft 11 located at the forward and lower portion of the machine is divided so that the clerks' special totalizers and coöperating mechanism, which are mounted on the partitions 355 may be built as a unit and inserted in the machine, one side of said shaft forming a portion of the coöperating mechanism for the totalizers. That portion of the shaft embodied with the clerks' and special totalizer mechanism is provided with a disk 355ª, see Fig. 25, the latter being equipped with a recess 355ᵇ. Extending into this recess is a pin 355ᶜ, which is mounted at the outer end of an arm 355ᵈ which is secured to that portion of the shaft 11 which is mounted in the machine proper.

In order to prevent any overrunning of either portion of the shaft 11, each portion is provided with suitable mechanism for arresting it at the end of complete rotation. A pin 42ª, see Fig. 14, projecting from the disk 47 is normally in contact with the hook portion 42ᵇ formed upon an arm 42ᶜ which is loosely mounted upon the rock shaft 127. Another portion 42ᵈ of said arm is forked at its extreme end and straddles a pin 42ᵉ projecting from the clerks' releasing slide 42. When said slide is elevated by the operation of any of the clerks' keys the hook portion 42ᵇ will be withdrawn from the pin 42ª leaving the shaft 11 free to be rotated. Near the end of the operation of the machine the roller 46 projecting from the other side of the disk 47 will contact with the foot 45 of the slide 42 and positively return said slide to its normal position, by the return of which the hook portion 42ᵇ, through the pin 42ᵉ projecting from the said slide, will pass in the path of the pin 42ª from the disk 47 and thereby prevent any overrunning of this portion of the shaft. This arm 42ᶜ also acts as a lock for the machine which requires the operation of the clerks' key to release.

The other portion of the shaft 11 which is mounted in the machine proper is normally locked by a lever 165ª, see Fig. 38, which is centrally pivoted to the machine frame and one portion of said lever has a fork into which projects a pin 165ᵇ extending from the arm 111. This lever, as previously described, is secured to shaft 88, and, when any amount key is depressed, will be rocked with the shaft and the pin 165ᵇ will rock the lever 165ª so as to withdraw the lower end of said lever from over a pin 165ᶜ projecting from the side of the gear 166 which is secured to one end of the shaft 11. Near the end of the operation of the machine the arm 111 is returned to its normal position, as previously described, which will also return the lever 165ª to its normal position so that the lower end of said lever will stand in the path of the pin 165ᵉ projecting from the gear 166 and arrest the latter from making more than a full rotation.

*Throwout for grand totalizer.*—The rocking of the shaft 127, see Fig. 16, by the operation of one of the special keys 41 rocks the pawl 126 secured to the right hand end of the shaft 127, see Fig. 4, the forward end of which by this rocking movement contacts with the roller 343 projecting from the rearward arm of the lever 334, and rocks said lever about its pivot so as to carry the roller 337 extending from the lower arm of said lever out of the path of the cam 335. This movement of the lever 334, by the rocking of the shaft 127, carries a hook portion 385 formed upon the upper end of the forward arm of the lever 334 over the transverse arm of the shaft 94, thereby preventing any accidental displacement of the slide 330 and consequently any rocking of the totalizer frame 326 during an operation of the machine. It is to be understood that the other lever 334 carried by the slide 330 on the opposite side of the totalizer frame 326 from that shown in Fig. 4 will also be operated by a pawl similar to the pawl 126 whenever the shaft 127 is rocked.

It will be recalled that the operation of the "no sale" key 68 (Figs. 12 and 25) will also rock the shaft 127, this rocking of the shaft 127 being brought about by the rocking of the frame or cross bar 81 and the downward movement of the arm 143, (Fig. 25) through pin 141 extending from an arm 142 secured to the rock shaft 127.

From the above description it will be seen that the throwing means for the clerks' totalizers and the grand totalizer are disabled by an operation of one of the special transaction keys or the "no sale" key.

*Transfer mechanism.*—The transfer mechanism between the elements of different denominations of all of the totalizers is substantially the same, and comprises devices which are normally out of the path of their actuators and which, when the totalizer is moved into engagement with the actuating racks, carries the transfer devices into position to be engaged by the actuating slides therefor. When the totalizer is moved out of engagement with the actuating racks, if a transfer is to be effected the device for effecting this transfer is left in the path of its actuating slide and said device is carried in the same direction by the slide to effect the transfer as it was initially moved, after which the slide will return the transfer device to its normal position. Each of the registering wheels 324, see Figs. 3 and 8, is provided with a one tooth disk 386 which, as the wheel passes from "nine" to "zero" while said wheel is in engagement with its rack, actuates a spring operated trip pawl 387 to release a lever 388 carrying at its forward end a transfer pawl 389. The rearward end of each of the levers 388 is provided with a roller 390, which is caused to pass into a recess 391 formed in the upper end of a transfer slide or actuator 392, by a spring 393 which is interposed between the retaining pawl 387 and the upper side of the lever 388. It is to be understood that there is one of these actuators for each element of the grand totalizer above that of the lowest denomination, each actuator being forked at its lower end to straddle a suitable collar placed upon the cam shaft 11. There are provided two cams 396 and 397 secured to the shaft 11 acting on rollers 394 and 395 carried by each actuator, and these cams are so formed as first to lower the actuator 392, then to raise said actuator to an abnormal position, and finally to return it to its normal position. Just previous to the downward movement of the first actuator 392, the grand totalizer is rocked out of engagement by mechanism previously described, but the roller 390 of the tripped transfer lever 388 will remain in the recess 391 of its actuator. The downward movement of the actuator 392 rocks the tripped transfer lever 388 so that its pawl 389 will engage with a ratchet wheel 398 secured to the registering wheel or element of the next higher denomination to effect the transfer, and upon the movement of the actuator 392 to its abnormal upward position the transfer lever 388 is returned to its latched position as shown in Figs. 3, 7, and 8 after which the actuator is restored to its normal position, so that the roller 390 of the transfer lever 388 will drop into the recess 391 formed in the upper end of the actuator when said lever is tripped as previously described. As previously described there is one of these actuators for each element of the totalizer above the lowest denomination, and the cams 396 and 397 for operating each actuator 392 are so placed upon the cam shaft 11 as successively to operate said actuators beginning with the actuator for the tens of cents registering element. Spring pressed retaining pawls 399 engage with the ratchet wheels 398 of each registering element 324 of the totalizer. A spring 400 is interposed between the tail of each transfer pawl 389 and a flange of an arm 401 centrally pivoted upon a shaft 402. The upper end of each of the arms 401 abuts against the rear end of the bar 403 supported by the ends of the totalizer frames 326 so as to force the upper end of the transfer pawl 389 into engagement with its ratchet wheel 398 when the lever 388 carrying said pawl is tripped. Each of these springs 400 by the above method of mounting the same assists the spring 393 to throw the rear end of the transfer lever 388 carrying the roller 390 into the recess 391 of its actuator 392.

The transfer devices for the clerk and special totalizers are practically the same as those described in connection with the grand totalizer, and they comprise transfer levers 404 pivoted upon a rod 405 suitably mounted in the totalizer frame 354, see Figs. 30, 31, and 36. These levers 404 carry rollers 406 at their rear ends which are normally held out of operative position with their actuator slides by trip pawls 407 suitably mounted upon a rod 408 also secured in the totalizer frame 354. The forward end of each of the levers 404 carries a transfer pawl 409 provided with a flange 410 near its pivotal point and which flange plays between prongs 411 formed upon the forward end of the transfer lever 404 so as to limit the pivotal movement of pawl 409. Spring wires 412 extend up from the base of the totalizer frame 354 and each one of said wires pass through a flange 413 projecting laterally from the pawl 409. Interposed between each flange 413 and the base of the totalizer frame 354 and surrounding the wire 412 is a light coil spring 414 by which the flange 410 of said pawl is normally kept in contact with the upper fork 411 formed in the forward end of the transfer lever 404. When one of the clerk's or special totalizer wheels 352 passes from "nine" to "zero" a pin 415 carried by said wheel will trip the pawl 407 and the corresponding transfer lever will, by the spring 414, be rocked about the rod 405 carrying its roller 406 into the path of its actuator, which will complete the movement of the lever 404, so that its pawl 409 will engage with a pinion 356 secured to the next higher registering wheel and thereby effect the transfer.

Owing to the fact that the clerks' and special totalizers are grouped in banks there are provided two sets of actuating slides for the transfer levers 404 and these slides are operated exactly in the same manner as the actuating slides 392 for the transfer elements of the grand totalizer. The wheels 352 of the clerks' and special totalizers are retained in their adjusted positions by spring pressed retaining pawls 416 which engage with the pinions 356 connected to the wheels 352, the said pawls being loosely mounted upon the rod 408.

*Special counters.*

Each of the totalizers previously described is provided with a counter upon which one unit is registered each time its totalizer is brought into engagement with the actuating mechanism so as to ascertain the number of transactions that go to make up the totals shown on the various totalizers.

*Grand totalizer counter.*—Each time the grand totalizer frame 326 is rocked about its pivotal point 327 by the slides 330 and cooperating mechanism, see Fig. 4, an arm 426 attached to the totalizer frame 326 will, by the forked end of said arm engaging a roller 427 projecting from an arm 428 pivoted to the under side of a tie bar 429, rock the latter arm. This arm 428 has an extension 430 which carries a three pronged pawl 431 for actuating the wheels 432 of a step by step counter, the transfer between said wheels being of the deep notch type well known in the art.

*Counters for clerks' and special totalizers.*—The wheels forming the counter to record the number of transactions entered upon the respective totalizers are mounted upon the same shaft 353 as the wheels 352 of the totalizer and are located at one end of said shaft. The figures engraved upon these wheels may be of a different color from the figures representing the amount, so as easily to distinguish between the totalizer and its special counter. The three wheels forming the special counter for each totalizer are actuated by levers similar to the transfer levers 404 of said totalizers, except that the actuating lever 404 of the units wheel of the special counter is not provided with a retaining pawl 407, and is normally held in the plane of the other levers 404 by a suitable spring which acts upon said lever in the opposite direction from the spring 414 shown in Fig. 36. The actuating slide for the lever 404 which actuates the units wheel of the special counter is so timed that it will actuate its lever 404 while the registering wheels 352 of that particular totalizer are in engagement with their actuating racks, the transfer levers 404 for the amount elements of each totalizer and the remaining wheels of the companion special counter being operated, if tripped, by their actuating slides while the wheels of the totalizer are out of engagement with the racks 344. Immediately after the operation of this lever 404 for the units wheel of the special counter, the totalizer, with the special counter, are rocked out of engagement with the actuating racks, thereby carrying the transfer levers 404 for the tens and hundreds wheel of the special counter out of the path of their respective slides unless the said levers have been tripped to carry a transfer. As all of the counters for the clerks' and special totalizers are the same it is thought no further description need be given of said counters.

"*No sale*" *counter.*—It will be recalled that by the operation of the "no sale" key 68 the differentially adjustable element 211 will be connected with its operating pinion 181, see Figs. 12 and 16, and said element be given one more step of movement than when under the control of the special keys 41, this movement of the differentially movable element 211 being conveyed by suitable pinions and a transverse shaft to a rack bar 290, which adjusts the controlling mechanism for the special transaction indicator. This additional movement of the element 211 and consequently of the rack bar 290, see Fig. 12, rocks an arm 433 loosely mounted upon the transverse shaft 98 by a pin 434 carried by the rack bar 290. This arm 433 is provided with a slot 435 in which plays a pin 436 projecting from the lower end of an arm 437 suitably secured to the tie bar 429 previously mentioned. The arm 437 has an extension 438 which carries a three pronged pawl 439 to actuate the wheels 440 of a three wheel counter, the transfer from one wheel of said counter to another being made by the prongs of the pawl 439, which are of different depths, entering deep notches formed upon the ratchet wheels 441 carried by the wheel 440 as is well known in the art.

*Customer's counter.*—This counter is provided with four wheels 442 each having a ratchet wheel 443, see Fig. 3, with which the prongs of a pawl 444 engage as said pawl is moved upon each operation of the machine. This pawl 444 is carried in the upper end of an arm 445 pivotally mounted on the underside of the tie bar 429. At its lower end the arm 445 carries a pin 446 with which one of the transfer actuators 392 engages and rocks the arm 445 at each operation of the machine. The various shafts supporting the wheels of the "no sale", "customer's" and "cash sale" special counters are provided with knurled knobs by which the shaft may be rotated to pick up the various wheels and reset them to zero by longitudinal grooves in said shafts, which engage with suitable pawls attached to the various counter wheels, all of which is well known in the art.

There is provided another special counter for recording the number of times the grand totalizer is reset and the operation of this counter will be described in connection with the resetting of the grand totalizer.

*Resetting mechanism.*

Any one or more of the totalizers may be reset to zero at an operation of the machine or all of the totalizers may be simultaneously reset. Each of the totalizers has manipulative devices associated therewith which bring them into connection with the resetting means and a special manipulative device is provided to bring said resetting means into connection with the operating mechanism so as to reset the totalizers that have been previously brought into connection with the resetting means by an operation of the machine.

*Grand totalizer resetting device.*—The shaft 98 has attached to the extreme right hand end, see Fig. 1, a key barrel 447 which is under the control of a detachable key 447ª. When the key is inserted within the barrel 447 the barrel and said shaft 98 may be rotated in the direction of the arrow shown in Fig. 18. This movement of said shaft 98 rotates an arm 448 fast thereon clockwise, and near the end of movement of the shaft 98 a foot 449 formed on the arm 448 contacts with a pin 450 projecting from the forward end of a bell crank lever 451 which is loosely mounted upon rock shaft 243, and rocks a pin 452 projecting from the extreme end of the downwardly extending arm of said bell crank, into a groove 453 formed upon a cam disk 454 secured to the driving shaft 163. This movement of the arm 448, by a pin 455 projecting from said arm into a slot 456 formed in the upper end of an arm 457, raises said arm so as to carry a shoulder 458 formed upon a forwardly extending portion 459 of said arm out of the path of the key pin 83 of the "main counter reset" key 82 thereby unlocking said key. Upon depressing the key 82 its pin 83 will contact with the rear prong of a forked arm 460 which is loosely pivoted upon a rod 461, and rock said arm 460 so that a pin 462 carried thereby and which plays in an elongated slot 463 formed in a link 464 will rock the latter with the shaft 98 as its pivot. This rocking movement of the link 464 will force a hook portion 465 formed in the lower end of said link 464 over a pin 466 projecting from a slide 467. This slide 467 at its upper end is provided with an inverted L shaped slot 468, see Fig. 19, in which plays the pin 450 projecting from the bell crank lever 451. The vertical portion of the slot 468 is an arc of a circle struck from the center of the rock shaft 243, so that when the bell crank 451 is rocked by the foot 449 of the arm 448 it will not affect the slide 467. Now upon the rotation of the shaft 163 in the direction of the arrow shown in Fig. 18 the forward end of said bell crank 451 will be elevated and by its pin 450 carry the slide 467 therewith, this slide being guided in its vertical movement by the shaft 98 and the shaft 88. By this movement of the slide 467 the link 464 will also be elevated if the "main counter reset" key 82 has previously been operated, and will, by the bottom wall of a slot 469 formed in the forward upper edge of the link 464 engaging with a roller 470, rotate a segmental plate 471 from which the roller 470 projects. This segmental plate 471 is pivoted upon one of the supporting pins 327 of the totalizer frame 326, see Fig. 9, and is provided with a cam groove 472 in which projects a pin 473 on a plate 474 loosely mounted upon the totalizer shaft 325. The shape of the groove 472 in the plate 471 is such that at the beginning of movement of the plate 471 the plate 474 will be rocked to carry devices into position to arrest the wheels of the totalizer at zero position as hereinafter described. The segmental rack plate 471 meshes with a pinion 475 secured to the totalizer shaft 325 and by a full upward movement of the link 464 the said plate 471 will rotate the pinion 475 and shaft 325 a full rotation.

The segment 471 is locked from any accidental displacement by a bell crank pawl 476 pivoted to the totalizer frame 326. The rearwardly extending arm of this pawl 476 is provided with a roller 477 which projects into a slot 477ᵃ formed in the extension 459 of the arm 457, so that any movement of the arm 457 by the rotation of shaft 98 as previously described, will rock the bell crank pawl 476 and unlock the segmental plate 471.

The shaft 325 carrying the totalizer elements 324 is provided with a longitudinal groove 478, see Figs. 7, 8, and 11, which as said shaft is rotated by the mechanism just described engages with spring pressed pawls 479 pivotally mounted upon the sides of the registering wheels or elements 324 and carries said wheels to their zero or normal position, as is well known in the art.

The rocking of the plate 474 by the groove 472 in the segmental plate 471 as previously described, rocks a frame 480 by a slot 481 formed in the plate 474 engaging with a pin 482 projecting from one arm of the frame 480. This frame 480 extends across all of the registering wheels or elements 324 of the totalizer, and has downwardly and rearwardly extending arms 483 and 484 respectively, see Figs. 7 and 8. When this frame 480 is rocked as just described, the downwardly extending arm 483 passes over shoulders 485 of the transfer pawls 389, and thereby prevents any movement of the levers 388 carrying said pawls 389 when the pawls 387 are tripped by the single tooth disk 386 as the wheels pass from nine to zero. The rearwardly extending arms 484 of said frame are moved into the path of the single tooth of each of the transfer disks 386 so as to arrest said disks at their zero position and thereby prevent any overrunning of the wheels 324 by a rapid resetting operation.

The link 464 when raised by the slide 467 actuates a special counter which registers the number of times the main counter is reset to zero in the following manner: A shoulder 416ᵃ formed upon the forward upper edge of the link 464 will contact, when the said link reaches nearly the limit of its upward movement, with a pin 487 extending from an arm 488 which is pivoted to the tie bar 429 in any suitable manner. This arm 488 has an upward extension 489 which is provided at its upper end with a three pronged pawl 490 that engages with the teeth of ratchet wheels 491 fast to the counter wheels 492 of the special counter. The shaft 493 upon which the special counter wheels 492 are mounted has fastened to one end a knurled knob 494 by which said shaft may be rotated to reset the wheels to zero, the shaft 493 having a longitudinal groove 495 which engages with pawls 496 secured to the wheels 492 as is well known in the art. Upon the return of the slide 467 by the bell crank 451 the link 464 will also be returned and a curved forward extension of said link 464 contact with the pin 487 projecting from the arm 488 and return the parts to normal position, as shown in Fig. 18.

It has been previously described that the arm or slide 457 will be raised when the shaft 98 is rotated. The raising of this slide 457 brings a flange 498 formed on the slide near its lower end into the path of the inner end of the "no sale" key 68 thereby preventing the operation of said "no sale" key while the slide 457 is in an elevated position.

The shaft 98 is provided with a collar 98ᵃ, see Fig. 4, which has three fingers 98ᵇ extending therefrom. Upon turning the shaft as previously described, one of said fingers 98ᵇ will contact with the forward prong of a forked lever 89ᶜ which is centrally pivoted upon one of the transverse shafts of the machine, and move the upper end of said lever forwardly. As the upper end of said lever moves forwardly the lower end, which is provided with a hook portion 98ᵈ, will pass under a pin 98ᵉ extending from the rearward extension 146 of the lever 115 and while in this position lock said lever from movement, and consequently prevent the depressing of any of the clerks' keys. The continued rotation of the shaft 98 will bring the downwardly extending finger 98ᵇ, shown in Fig. 4, in contact with the rear prong of the fork lever 98ᶜ, and move said lever back to the position shown in said figure. As the shaft 98 is partially turned one of the fingers 98ᵇ will pass in front of a pawl 98ᶠ which is suitably pivoted to the side frame 125 and thereby prevent the return of said shaft. When the machine is operated a pin 98ᵍ carried on the gear 162 will contact with the downward extension 98ʰ of the pawl 98ᶠ and rock said pawl to such a position that the finger 98ᵇ will be free to rotate beneath it.

The shaft 98 is given a positive partial return movement by the pin 450 carrying in the forward end of the horizontal arm of the bell crank 451 contacting with the foot 449 of the lever 448 as said bell crank is returned by the cam 454 secured to the shaft 163, see Fig. 18. By this partial return of the shaft one of the fingers 98ᵇ actuates the forked lever 89ᶜ so as to carry the lower hook end 98ᵈ of said lever beneath the pin 98ᵉ of the extension 146 of the lever 115 and thereby prevent the operation of the clerks' keys as previously described. This locking of the clerks' keys serves as a reminder to the person operating the machine that the manipulative device or reset key 447ª has not been detached from the machine and in order to remove the key it is necessary to turn the shaft 98 back to normal position, in which position the shaft is shown in Fig. 4.

While the shaft 98 is being returned by the operating mechanism just described the pawl 98ᶠ will be elevated by the pin 98ᵍ contacting with the rear side of the downward extension 98ʰ of the pawl so as not to interfere with the finger 98ᵇ extending from the collar 98ª of the shaft 98. This shaft is returned far enough so that when the pin 98ᵍ passes clear of the extension 98ʰ the front end of the pawl 98ᶠ will rest upon one of the fingers 98ᵇ.

*Clerks' and special totalizer resetting devices.*—Each of the clerks' and special totalizer resetting means is normally out of position to be actuated by certain resetting slides, and the said resetting means for any particular totalizer is moved into the path of the resetting slide by an attachment secured to each of the totalizers. The operation of this attachment which controls the connection of the resetting means and the actuating slides therefor, is effected by a detachable implement which may be inserted through plates on the front of the machine casing in order to operate the attachment for connecting the resetting means and their slides. The resetting means for each of the above described totalizers is normally locked, and is unlocked by the attachment which connects said means to the resetting slide.

The resetting means for all of the clerks' and special totalizers are the same and therefore it is thought that a description of one will suffice for all. Referring now to Figs. 30 to 33 inclusive, it will be seen that the shaft 353 upon which the totalizer elements 352 are mounted is normally locked by a pinion 498 secured to shaft 353. This pinion as shown in Fig. 33 has a concave locking surface 499 with which engages the periphery 500 of a resetting segment 501, which is suitably pivoted on the totalizer frame 354. This segment 501 when in normal position as shown in Fig. 33 is locked by a pawl 502 which engages with a shoulder 503 of said segment. The transverse rod 405 upon which the transfer levers 404 are mounted has secured thereto at one end a disk 504, see Fig. 23, which has a projection 505 normally extending toward the front of the machine. A detachable implement 504ª (Fig. 24) is arranged to be inserted through the recesses 506, see Fig. 1, and partially turn the disk 504 secured to the rod 405. This turning of the rod 405 will by means of a camming portion 507 (Fig. 33) formed upon an arm 508 secured to the opposite end of the rod 405 rock the locking pawl 502 by engaging with a flange 509 formed on said pawl so as to release the resetting segment 501. By the continued rocking movement of the rod 405 a pin 510 projecting from the free end of the arm 508 will engage with the inner wall 511 of the resetting segment 501 and partially move said segment. By this movement of the resetting segment 501 rollers 512 projecting from the segment will be moved into the path of a nose 513, see Fig. 23, formed upon a slide 514 so that when said slide is elevated as hereafter described, the nose 513 will pass between the rollers 512 and rotate the segment 501 which will in turn rotate the pinion 498 and thereby the shaft 353. This shaft 353, as shown in Figs. 30 and 31, is provided with a longitudinal groove 515, which, as said shaft is rotated, engages with pawls 516 secured to the wheels 352, and thereby carries the said wheels to zero as is well understood in this art. As the slide 514 is returned the resetting segment 501 will also be returned thereby returning the shaft 353. The slide 514 only returns the segment 501 the distance it has moved it forward and the final movement of said segment to restore it to normal position is effected by a slide 517 (Fig. 23) mounted adjacent to the slide 514. This slide 517 is provided with projections 518, one for each totalizer in the bank of totalizers with which this slide coöperates. The slide 517 will be first lowered, then near the end of the operation of the machine be given an upward movement, and then returned to an intermediate position, and this upward movement of the slide 517 near the end of the operation of the machine will cause one of the projections 518 to contact with a pin 519 on the disk 504 which has previously been adjusted, and restore said disk to its normal position. This restoration of the disk 504 will, through the rod 405 to which it is attached, also restore the arm 508 upon the opposite side of the totalizer to normal position, which movement will fully restore the segment 501 and carry the camming shoulder 507 out of the path of the lug 509 on the locking pawl 502, and the latter will then be forced into locking engagement with the shoulder 503 by a spring 520. This movement imparted to the rod 405 by the slide 517 will carry the rollers 512 of the segment 501 out of the path of the nose 513 of the resetting slide 514. From this description it will be seen that unless the disk 504 is rotated previous to the operation of the machine the slide 514 will not actuate said segments.

It is to be understood that there is one of these resetting slides 514 for each bank of totalizers and that any one or more of the resetting segments 501 may be connected thereto so as to reset one or more of the totalizers to zero.

The rod 405 has attached thereto a segmental plate 521, see Fig. 32, a portion of which is provided with rack teeth 522. These teeth 522, when the rod 405 is rocked as previously described, engage with teeth 523 formed upon a disk 524 which is mounted within the totalizer frame 354 upon bearings 525. A rod 526 mounted eccentrically of the bearings 525 is carried thereby so that when the rod 405 is rocked previous to the resetting of the totalizer to zero, the eccentric rod 526 will engage with the trip pawl 407 of each wheel 352 and rock it out of the path of the pin 415 projecting from each wheel 352. Simultaneously with the rocking of the pawls 407 the eccentric rod 526 will pass over the forward end of the transfer levers 404 thereby preventing any movement of the levers by their springs 414. The movement of the eccentric rod 526 will also carry the retaining pawls 416, see Fig. 31, out of engagement with the pinions 356 so that there is no resistance offered to the rotation of the wheels 352. This eccentric rod 526 passes through slots 527 formed in downwardly extending arms of a frame 528 which extends across in front of all of the wheels 352. This frame 528 is provided with rearwardly extending fingers 529 which normally are out of the path of the pins 415 of the totalizer wheels 352. As the eccentric rod 526 is moved by the preliminary movement in resetting the totalizer to zero, the said rod 526 will rock the frame 528 about its pivotal point 520 so as to carry the rearwardly extending fingers 529 of said frame into the path of the pins 415 of the wheels 352, thereby forming stops for the wheels when they are turned to zero by the resetting means, as previously described. It is of course to be understood that in resetting the elements or wheels of the special and clerks' totalizers, the special counters for said totalizers will also be reset.

The lower end of the slide 467, see Fig. 18, is provided with rack teeth 531 which engage with teeth formed upon a segmental plate 532 fast to a transverse shaft 221. This shaft is further provided with segmental plates 533 which mesh with teeth 534 formed in the resetting slides 514, see Fig. 23. From this it will be seen that as the slide 467 is elevated by the rocking of the bell crank 451 the slides 514 will also be elevated to reset the clerks' and special totalizers connected therewith to zero. These slides 467 and 514 are positively returned to their normal position by the pin 450 traveling in the horizontal portion of the L shaped slot 468 formed in the upper end of the slide 467.

It was previously stated that the machine cannot be operated until one of the clerks' keys is depressed, and in order to permit the depression of one of the clerks' keys when it is desired to reset the totalizers to zero, the slides 363 carrying the throwing levers 362 for the clerks' totalizers are moved so that the operation of any of the clerks' keys will not affect its totalizer and in addition the amount and special keys will be locked from operation. The rocking of the transverse shaft 98, by the turning of the key barrel shown in Fig. 1, will rotate a pinion 535 (Fig. 25) which will lower a slide 536 by engaging a rack 537 secured to the upper end of the slide. This slide is supported upon the shafts 88 and 98 and is provided at its lower end with pins 538 and 539. The pin 538 will contact with the arm 143 when the slide 536 is lowered, and rock said arm so that the upper prong of the inner fork portion of said arm will contact with the pin 141 projecting from the forward end of the arm 142 which is secured to the shaft 127. There is sufficient play between the arms 142 and 143 to permit the pin 539 to pass below a projection 540 of the arm 142 before the latter is rocked. This pin 539 and projection 540 are for the purpose of positively restoring the shaft 127 when the slide 536 is returned to normal position. The rocking of the shaft 127 by the downward movement of the slide 536 will, through arms 372 (only one of which is shown) secured to the shaft 127, depress the slides 363, see Figs. 29 and 34, so as to carry the throwing levers 362 mounted on said slide out of the path of the key pins 32 of the clerks' keys 31. This movement of the slides 363 will carry the shoulders 366 of the levers 362 over the pins 365 projecting from the partitions 355, and thereby positively lock the totalizers out of engagement with the actuating racks 244. This rocking of the shaft 127 will, through the pins 418 carried by the extensions 417 of the pawls 372, rock the levers 419 so as to carry the springs 371 from supporting position for the slides 363, as previously described in connection with the operation of the special keys 41.

The rocking of the arm 143 by the pin 538 carried in the lower end of the slide 536, as the latter is lowered upon the rotation of the shaft 98, rocks the frame or bar 81, see Figs. 2, 12, and 25, and thereby locks from operation the amount keys 1 and the "no sale" key 68. The rocking of this shaft also elevates a slide 541, see Fig. 16, by the arm 140 fast to said shaft, which carries a pin 139 that projects into the rearward fork end of a lever 138 centrally pivoted to the key frame 2. This lever 138 carries at its forward end a pin 137 which engages with a recess portion 542 formed in the slide 541 to elevate the said slide when the shaft 127 is rocked. By the elevation of this slide 541 inclined slots 543 formed therein will pass out of the path of key pins 55 and the straight forward edge of said slide will pass under the pins 55 of the special keys 41 thereby locking said keys from operation.

It was previously mentioned that the clerks' keys are normally locked and are only unlocked by the operation of either an amount key or the "no sale" key, but it is obvious that when it is desired to reset the totalizers to zero an amount or "no sale" key should not be depressed, and in order to overcome the necessity of operating one of these keys to release the clerks' keys a suitable mechanism is provided, which is operated by the turning of the shaft 98 by the detachable key 447ª. Referring to Figs. 4, 14, 16, and 25 it will be seen that when the shaft 98 is rotated and the slide 536 lowered the arm 143 projecting rearwardly from the cross bar or frame 81 will be rocked and as previously explained this frame, see Fig. 4, is provided with an arm 109 which carries a pin 110 at its extreme upper end. As the frame 81 is rocked this pin 110 will rock the arm 111 secured to the transverse shaft 88 and this shaft, see Fig. 25, carries a forwardly extending arm 89 which as said shaft is rocked, elevates a link 92 and by the notch 99 formed near the upper end of said link engaging with a roller 100 projecting from the arm 101 of the yoke frame 102 rock the latter so as to carry arms 104 and 105 of the said yoke 102, see Figs. 14 and 16, out of the path of the clerks' slide 42 and an extension 67 of the special key slide 57 which overlaps the upper end of the slide 49 for the three clerks' keys 31 located in the same bank with the special keys.

The movement of the arm 111, see Fig. 4, fast to the shaft 88 will carry the lug 113 projecting therefrom from over the shoulder 114 formed in the forward end of the lever 115 which is rigidly secured to the shaft 116 so that when the said shaft 116 is rocked by one of the pins 115 projecting from the clerks' slides 42 and 49 engaging with the forwardly extending arms 144 secured to said shaft the extension 146 of the lever 115 will rock the prong 149 of the arm 147 out of the path of the pin 150 leaving the crank handle 153 free to be rotated.

The rocking of the shaft 127 by the special manipulative device 447ª disables the mechanism for rocking the grand totalizer into engagement with its actuating devices as is clearly shown in Fig. 4, and which has been described in detail.

Printing mechanism.

A novel form of printing mechanism is provided by which the amounts registered and indicated will be recorded twice upon a check strip and once upon a record strip, during an operation of the machine, and in addition thereto record the date and consecutive number of the transaction. The check strip is arranged to be fed forward and perforated between the impressions thereon, after which the portion containing the impression will be severed and delivered to a check ejector to be delivered to the exterior of the machine. Devices are employed in connection with the "no sale" key such that when this key is operated the feeding mechanism, the perforating device, and the severing and check ejector mechanism will be disabled. A novel form of mechanism for equalizing the feed of the record strip is also provided, as will be pointed out in the detailed description which follows.

*Type carriers.*—The transverse shafts 345, 346, 348, 349, 350, and 351 which represent respectively "units of cents", "tens of cents"; "units", "tens", "hundreds", and "thousands" of dollars, extend to the extreme left hand frame of the machine and are provided with an additional set of pinions 544, see Figs. 43 and 46, which mesh with teeth 545 formed upon the front edge of bars 546, which carry at their rear edges two sets of type 547 and 548, the former for printing on a check strip 549 and the latter for printing upon a record strip 550. Each type bar 546 with the exception of the one which carries the "thousands of dollars" type is provided with a pivoted arm 551 bearing the zero character for each set of type, see Fig. 44. The arms carrying the zero characters are normally at the printing line but are held out of printing position by plates 552 mounted adjacent to each type bar. Each of these plates is provided with longitudinal slots 553 the upper ends of which are curved slightly toward the front of the machine. Normally resting in the curved portion of the slots 553 formed in each plate are pins 554 projecting from the zero type-carriers 551 of each type bar. Each of the plates 552 is provided with a flange 555 at its upper end which overlaps the plate 552 of the next higher denomination, and when one of the type bars 546 is elevated its plate 552 will also be raised by the pins 554 of the zero type contacting with the upper ends of the slots 553 in said plate. The elevation of this plate 552 will, by the flanges 555, carry the plates 552 of lower denominations so that these plates in their movement will cam the lower denomination zero types 551 by the curved portion of the slots 553. The zero type operating plate 552 of the units of cents type-carrier is connected to the plate 552 of the tens of units by a pin 556, see Fig. 45, so that the movement of the plate 552 belonging to the units of cents will also carry the tens of cents plate 552 in order to cam the tens' zero type carrier to printing position so that the amount will be correctly recorded. These type bars are provided with elongated slots 557 through which pass rods 558 acting as guides for said type bars.

Adjacent to the units type-carrier (Fig. 64) is a slide 552ª slidably mounted upon the same rods as the type-carriers, which has an extension 552ᵇ that overlaps the upper end of all of the plates 552. This slide 552ª carries a pin 552ᶜ with which engages the forward end of a bell crank lever 552ᵈ pivoted to the side frame, and the upwardly extending arm of said lever is arranged to be engaged by a pin 552ᵉ at the end of the operation of the machine. This pin is carried by an arm 552ᶠ which is secured to the driving shaft 163. From the construction as disclosed in said figure, it will be seen that upon the beginning of the rotation of the shaft 163, the pin 552ᵉ will pass from engagement with the vertical arm of the bell crank 552ᵈ, so that when any of the type-carrier plates 552 are elevated they will, by contacting with the flange 552ᵇ, raise the slide 552ª. If the plates 552 are not returned to their normal position by gravity the slide 552ª will positively return them when said slide is lowered at the end of the operation of the machine by the arm 552ᶠ rocking the bell crank 552ᵈ, the latter in turn engaging with the pin 552ᶜ on the slide 552ª.

A type bar 559 bearing types having the "$" symbol (Fig. 64) is normally in printing position and remains in such printing position during the operation of the machine except when the "no sale" key is operated, and when the machine is operated to reset the totalizers to zero, as will be more fully explained hereafter.

Adjacent to the bar carrying the dollar symbol is a type bar bearing two sets of clerks' initial characters. This bar is similar to the other bars 546 and is operated by a pinion similar to the pinions 544 heretofore described. This pinion is fast upon a shaft 560 which is in horizontal alinement with the heretofore described rock shaft 116 and at its inner end, see Fig. 14, this shaft 560 is provided with a pinion 561 which meshes with the clerks' differentially adjustable element 199. From this it will be seen that any movement of the element 199 will be transmitted to its type bar to bring the proper characters into printing position.

Adjacent to the type bar carrying the clerks' initial is a type bar bearing abbreviations for the special characters "received on account," "charge," "paid out," and "no sale" and this type bar is driven by the differential element 211, see Fig. 16, which engages with the pinion 288 fast upon a transverse shaft 563 which at one end carries a pinion similar to the previously described pinions 544 which engage with teeth of the type bar carrying the special transaction characters.

As previously mentioned the dollar character is moved out of printing position when the "no sale" key is operated or the machine operated to reset some one of the totalizers and this is accomplished in the following manner: Secured to the shaft 563 and adjacent to the pinion 544 which is driven by the differential element 211 controlled by the special keys is a disk 544ª (Fig. 64) which is provided with two teeth. It will be recalled that the greatest movement imparted to the differential element 211 is when the "no sale" key is depressed and the machine operated, and when this element is given its greatest throw it will rotate the shaft 563 far enough so that the two teeth of the disk 544ª will engage with the teeth of the type bar carrying the dollar character and move said type bar out of printing position so that only the abbreviation for "no sale" will be printed upon the check and the record strip is connected with the date, consecutive number, and the initial of the clerk. This type-carrier bearing the dollar character will also be moved out of printing position when the machine is operated to reset any one or all of the totalizers. It will be recalled that when the resetting mechanism is operated the shaft 221 is rocked and this shaft has a cam 221ª (Fig. 64) which, when said shaft is rocked, engages with a pin 221ᵇ on the type bar carrying the dollar character, and slightly elevates said bar so as to carry the type thereon out of printing position.

The lower ends of all of the rack bars 546 are provided with V shaped notches 546ª (Figs. 43 and 64) with which an alining frame 546ᵇ engages so as properly to aline the type while impressions are being taken therefrom. This frame is fast to a short shaft 546ᶜ and this shaft, see Fig. 64, carries a forwardly extending arm 546ᵈ which has two prongs. Each of the prongs of this arm carries a roller 546ᵉ with which cams 546ᶠ secured to shaft 11 engage. The timing of these cams in connection with the alining frame 546ᵇ is such that upon the very beginning of the operation of the machine, the frame 546ᵇ will be withdrawn from the alining notches 546ª so that the type bars may be adjusted. Immediately after the adjustment of the type bars the frame is rocked into engagement with the notches, and said type bars are held thereby until the impressions have been taken therefrom. Immediately thereafter the frame is disengaged from the notches to permit the type bars to be returned to their normal position, after which the frame is again rocked into engagement with said type bars to prevent any accidental displacement thereof between operations of the machine.

*Inking and platen operating devices.*—As described, all of these type bars 546 are controlled by the movement of their respective differentially movable elements 177, 199, and 211. After the proper characters have been brought into printing position a frame 564, see Figs. 46 and 50, carrying an ink pad 565 at its lower end, will be lowered by disks 566, which are provided with cam grooves 567 in which play rollers 568 projecting laterally from arms 569 which are loosely mounted at their rear ends upon a rod 570, the latter being suitably mounted in the printer frame 571. The front ends of these arms 569 are forked and a rod 572 mounted in the upper end of the frame 564 plays in the forked ends of said arm. The shape of the grooves in the disks 566 is such that after the type bars have been properly positioned the arms 569 supporting the frame 564 will be lowered so as to bring the pad 565 between the types that are in printing position for recording upon the check strip, and a platen 573. This ink pad 565 will be held temporarily in this position and while in this position a cam point 574 (Fig. 50) formed on a disk 575 will engage with a roller 576 projecting from one arm of a lever 577, the latter being pivoted upon a transverse rod 578, and move said arm with the platen 573 which is carried thereby toward the type. This movement of the platen will press the pad 565 in contact with the types that are in printing position to ink the same. Immediately after this movement of the platen 573 the frame carrying the ink pad 565 will be withdrawn by its operating cams 566 and a second and higher camming point 579 on the disk 575 will engage the roller 576, and rock the arm 577 to carry the platen and the check strip 549 into contact with the adjusted types.

When the frame 564 carrying the ink pad 565 is withdrawn from before the platen 573 it is carried to its normal position in which a second ink pad 580 mounted thereon is before a second platen 581 which is mounted upon arms 582 also pivoted upon the rod 578, there being one only of these arms shown. In this position the arms 582 will be rocked by cam grooves 583 formed in the disks 566 but on the opposite sides of said disks from the grooves 567 previously described. These grooves 583 rock the arms 582 by engaging with rollers 584 projecting from the upper ends of the arms 582 into the grooves 583. The shape of the grooves 583 is such that the pad 580 will be forced against the types of the upper set that are in printing position, and then will move the platen with the record strip 550 into contact with said type, the frame 564 in the meantime being lowered so as to carry the pad 580 from before the platen 581, and carry the pad 565 again into the path of the check platen 573. By this time a third raised portion 585 of the disk 575 will contact with the roller 576 and rock the arms 577 so as to force the platen 573 into contact with the rear of the ink pad and thereby the latter a second time into contact with the type. The frame 564 carrying the pads 565 and 580 will then be returned to its normal position and a fourth raised portion 586 of the disk 575 will contact with the roller 576 and rock the arm 577 so as to carry the platen 573 and the check strip which passes thereover into contact with the types a second time. A cam 587 mounted adjacent to the disk 575 engages with a roller 588 extending from the opposite side of a prong of the lever 577 from that which the roller 576 extends, and if said arm does not return to its normal position by gravity this cam 587 will positively return said arm. It is to be understood that there are two each of the arms 577 and 582 and that they are connected by their respective platens 573 and 581. These platens are adjustably mounted upon said arms by screws 589 (Figs. 50 and 51) which project through slots 590 formed in rearwardly extending arms 591 of the platens and into the arms 577 or 582. Additional screws 592 are provided which contact with flanges on the rearwardly extending arms 591 of the platens for preventing any sliding movement of the platens when they contact with the type-carriers.

The sides of the frame 564 carrying the pads 565 and 580 are provided with elongated slots 593 through which pass the rod 578 and a similar rod 594 which act as guides for the up and down movement of said frame, these grooves having cut away portions which permit the rocking of said frame.

*Feed devices for the check strip.*—The check feeding devices are of such a construction that they may be connected to the operating mechanism at all operations of the machine in which an amount is indicated or registered or they may be disconnected so as to not issue a check at any operation of the machine. When they are arranged to issue a check upon all operations of the machine in which an amount is either registered or indicated, they may be disabled by an operation of the "no sale" key but after an operation of the machine involving the "no sale" key, the feeding devices will be automatically restored to their normal position in which they are constructed to issue a check upon every operation other than where the "no sale" key is involved.

The check strip 549 passes from a suitable supply roll attached to the machine through a chute 595, see Fig. 46, and between a feed roller 596 and an electroroller 597. This electroroller 597 is suitably cut away so as intermittently to feed the check strip. The check strip then passes through a second chute 598 suitably secured within the printer frame 571. From there the strip is fed between a second pair of feed and electro rollers 599 and 600 respectively. From the latter mentioned rollers the strip is fed over a plate 601 forming the bottom of a frame having side arms 602 which are mounted upon the rods 578 and 594 previously referred to. This frame is provided with a short rod 603 upon which is pivoted a clamping plate 604 for clamping the check strip to the bottom plate 601. This clamping plate 604 is suitably held in contact with the plate 601 by a light coil spring 605 and is to prevent any excessive feed of the check strip. From this plate the said strip passes over a movable knife blade 606 and beneath a stationary blade 607 and thence over the check platen 573.

The two pairs of feed and electro rollers 596, 597, 599, and 600 are rotated in the following manner: In horizontal alinement with the driving shaft 163 is a shaft 608 (Fig. 48) which has rigidly fastened thereto at one end a gear 609. This gear is provided with two pins 610 which enter into recesses 611 formed upon the opposite ends of an arm 612 (Fig. 49), which is rigidly connected at its center to the shaft 163. Instead of having two shafts 163 and 608 one shaft would answer if it were not for the convenience of assembling the printing mechanism as a unit and then connecting it to the rest of the machine. This gear 609 meshes with a similar gear 613 secured to the end of a shaft 614 carrying the cam disks 566 for operating the ink pad frame 564 and the record strip platen 581. Connected to the gear 609 is a larger gear 615 which meshes with a similar gear 616 loosely mounted upon a shaft 617 (Fig. 47). Adjacent to the gear 616 and fastened to the shaft 617 is a gear 618 similar to the gear 616. These two gears 616 and 618 are connected by a pinion 619 mounted upon the vertical arm of a bell crank lever 620 which is loosely mounted upon a stub shaft 621 extending from the printer frame 571 (Fig. 48). From this description it will be seen that any movement of the shaft 163 of the machine proper will be conveyed to the gear 609 and through the gears 615, 616, 618, and pinions 619, to the shaft 617. This shaft 617 has attached to it just on the inside of the right hand printer frame 571 a gear 622 (Figs. 47 and 50) which meshes with an idler gear 623 the latter in turn meshing with gears 624 and 625 which are attached to the electroroller 597 and the feed roller 599 respectively. The gear 624 meshes with a gear 626 secured to the feed roller 596 and the gear 625 meshes with a gear 627 secured to the electroroller 600. From the above described gearing it will be seen that the movement of the shaft 163 of the machine proper will be conveyed to the feeding mechanism for the check strip when the machine is in the condition shown in Fig. 48.

As previously mentioned, mechanism is provided to disable the feeding mechanism and coöperating devices when the "no sale" key 68 is operated. This disabling mechanism controlled by said manipulative device is operated as follows: Upon depressing the "no sale" key 68, see Fig. 12, its key pin 106 will contact with an arm 628 extending upwardly from a shaft 629, which has secured to its other end a rearwardly extending arm 630 provided with a pin 631 which normally rests upon the upper side of a forwardly extending arm 632 of a bell crank lever 633 which is pivoted upon the stub shaft 621, see Figs. 48, 52, and 53. This rocking of the shaft 629 by depressing the key 68 will rock the bell crank lever 633, and the vertical arm 634 of said bell crank 633 which is provided with a segmental rack portion 635 at its upper end will engage a pinion 636 and rotate said pinion. Connected to this pinion is an eccentric disk 637 which plays in the forked upper end 638 of the vertical arm of the bell crank lever 620 which is also pivoted upon the stub shaft 621, as previously described. The rotating of the eccentric disk 637 as just described, will carry the vertical arm of the bell crank 620 upon which is mounted the pinion 619, see Fig. 52, out of engagement with the gears 616 and 618 so that the movement of the gear 609 by the rotation of the shaft 163 will not be conveyed to the shaft 617. The gear 616 has attached to its inner side a ring 639, see Figs. 52 and 53, which is provided with a cut away portion 640. When this gear 616 is in normal position as shown in Figs. 48 and 52, a pin 641 extending from the vertical arm 634 of the bell crank 633 will be in position to pass through the cut away portion 640 of said ring when the bell crank 633 is rocked by the "no sale" key. At any other time the periphery of the ring 639 will present itself to the pin 641 and thereby prevent the rocking of the bell crank 633. In Fig. 52 the bell crank 633 is shown as having been depressed by the "no sale" key and in Fig. 53 this bell crank is shown in the position which it assumes when the "no sale" key is released but before the machine has completed its movement. It will be seen from Fig. 53 that the inner periphery of the disk 639 prevents the return of the bell crank 633 to its normal position by its spring 642 until the last increment of movement of the gear 616. If the spring 642 should fail to return the bell crank 633 to its normal position a projection 643 extending from the gear 616 will engage with a projection 644 on the bell crank 633, and positively return said bell crank to its normal position, it being understood that the return of said bell crank will through the pinion 636 and eccentric disk 637 return the bell crank 620 and the pinions 619 carried thereby into engagement with the gears 616 and 618.

To prevent any displacement of the gear 618 and the shaft 617 to which it is connected, the said gear is provided with an inverted U shaped plate 645 into which a pin 646 carried by the forward end of the horizontal arm of the bell crank 620 will enter when the vertical arm of said bell crank carrying the pinions 619 is rocked rearwardly, thereby locking the gear wheel 618 from any accidental movement. It is also desirable to disconnect the check feeding devices just described when any of the totalizers are to be reset and this is accomplished in the following manner: Upon the rotation of the shaft 98 by the detachable manipulative device or key 447ᵃ the slide 457, see Fig. 12, will be elevated as previously described. This slide at its lower end has a rearward extension 647 which contacts with a pin 648 extending from an arm secured to the shaft 629 and rocks said shaft to disconnect the pinion 619 as previously described in connection with the operation of the "no sale" key.

*Check perforating device.*—As previously described, two impressions are made upon the check at each operation of the machine, and mechanism about to be described is provided for perforating the said check between the impressions so that the said check may be easily torn apart, one part being given to the customer as a receipt for his purchase, and the other part retained for any desired auditing purpose.

As previously described, the feed roller 596 and its companion electro roller 597 with the feed roller 599 and its companion electro roller 600 are of such formation that the check strip is intermittently fed. During the cessation of the feed of the check strip 549 perforating rollers 649 carried upon a frame 650, which is loosely mounted upon a shaft 651, see Figs. 46 and 56, are moved across the check transversely of the direction in which said check strip is fed. This frame 650 is provided with two rollers 652 which extend through a slot 653 formed in a yoke 654 which is pivoted also upon the shaft 651. The yoke frame 654 is provided with an arm 655 which carries a roller 656 that extends into a groove 657 formed in one end of a cylinder 658, the latter being secured to the shaft 617. From Fig. 56 it will be seen that the frame 650 carrying the perforating rollers 649 may be moved laterally independent of the yoke 654 because of the slot 653 formed in said yoke, but that any rocking movement of said yoke will impart a similar movement to the frame 650. This rocking movement of the yoke is accomplished by the cam groove 657 formed in the cylinder 658. The shape of said groove 657 is such that while the check strip 549 is being fed the perforating rollers 649 will be held out of contact with said strip, during which time the frame 650 carrying the rollers 649 will be moved to the opposite side of the shaft 651 from that shown in Fig. 56 by a lever 659 (Fig. 46) which is pivoted at its lower end to a part of the printer frame, and is provided at its upper end with a forked portion which straddles a pin 660 projecting from one of the arms supporting the frame 650 upon the rod 651. The oscillation of the lever 659 is caused by a roller 661 projecting from the center of the said lever into a cam groove 662 formed upon the lateral surface of the cylinder 658. The grooves 657 and 662 formed in the cylinder 658 are so timed that the frame 650 carrying the perforating rollers 649 is first moved to the extreme left (Fig. 56) of the shaft 651 while withdrawn from the check strip, and is then rocked into engagement with said strip through a recess 663 formed in the chute 598, and is then returned laterally to its normal position upon the rod 651 after which the yoke 654 will be rocked to carry the perforating rollers out of contact with the check paper. When the rollers 649 are thrown in contact with the check strip the rear side of the chute 598, see Fig. 36, will act as a backing for the check strip while the rollers 649 are carried transversely over the strip during the perforating operation.

Other means have been previously designed for perforating a check strip but such means have been embodied in either the feed or electro roller so that as said rollers are rotated this perforating mechanism will impinge upon the check strip as said strip passes between said rollers and thus perforate the strip. In manually operating machines with this construction it is always noticeable when the perforation is taking place owing to the extra load placed upon the machine, caused by the perforating device carried by one of the rollers contacting with the surface of the other roller. With the construction herein shown this objection is entirely obviated as the perforating mechanism is simply moved over the check strip while the latter is stationary.

It is to be understood that this perforating mechanism operates upon the check which is issued at the succeeding operation of the machine. This is on account of the location of said perforating mechanism, but it, of course, could be located so as to perforate the check that is issued at the same operation of the machine.

*Check severing mechanism.*—After the check is printed it may be severed from the remaining portion of the check strip 549 by any of the well known severing devices employed in the art. The mechanism herein shown consists of a movable knife 606 and a stationary knife 607. The movable knife, see Fig. 47, is constructed to have a vertical shearing movement and this movement is imparted by parallel links 664 which are pivoted at their lower ends to the plate which forms the stationary knife 607, the free ends of said links 664 carrying said knife 606. One of these links 664 has an extension 665 in the forked end of which plays a roller 666 secured to the upper end of a slide 667. This slide is arranged to have a vertical reciprocatory movement and is guided upon the shaft 617 and by a pin 668, see Fig. 46, mounted upon a portion of the printer frame. This slide 667 is provided with a roller 669 which plays in a cam groove formed in one end of a cylinder 670 the latter being secured to the shaft 617. This slide 667 is lowered near the end of the rotation of the cylinder 670, and through links 664 imparts a shearing movement to the knife 606 to sever the check.

*Check ejecting mechanism.*—Simultaneously with the severing of the check as just described, a gripping device forming a part of the check ejecting mechanism is operated to grip the check after which it is ejected from the machine.

The check ejecting mechanism is shown in normal position in Fig. 47, and upon the beginning of the rotation of the shaft 617 the cylinder 670 carried by said shaft, will, by flanges 671 carried upon the lateral surface of the cylinder 670 which engage with a roller 672 projecting from an arm 673, cam said arm to the right. This arm is pivoted at its upper end to a cross plate forming a part of the frame for the printing mechanism and is provided at its lower end with teeth 674 which mesh with teeth 675 formed upon an offset 676 of an arm 677. This latter arm at one end is pivoted to the printer frame and the other end of said arm is forked and straddles a pin 678 extending from a check gripping arm 679, the latter being arranged to slide upon an inclined rod 680. From this it will be seen that the arm 677 will be rocked clockwise upon the beginning of an operation of the machine, and, by means of its forked end, carry the check gripping plate 679 up the inclined bar or rod 680 in which position it will be held until near the end of the operation of the machine. It has been stated previously that simultaneously with the operation of the check severing mechanism the gripping device forming a part of the check ejecting mechanism will be operated to grip the severed check. The operation of this gripping device is as follows: When the gripping plate 679 is carried to the upper end of the rod 680 it stands directly behind a plate 681 which is secured to one of the printer side frames. The rod 680 upon which the gripping plate 679 is slidably mounted is rocked as the check is severed by a cam disk 682, see Fig. 57, secured to the shaft 617, which contacts with a roller 683 projecting from an arm 684 which is pivoted at its forward end to the lower end of an arm 685 secured to the rod 680. This rocking of the rod 680 will also rock the plate 679 and two pin points 686 extending from the plate 679 will grip the check which has previously passed between the plates 679 and 681, after which the flanges 671 on cylinder 670 will return the arms 673 and 677 to the position shown in Figs. 47 and 57 in which position the check is accessible to either the clerk or customer.

If the check is not removed from the pin points 686 previous to a succeeding operation of the machine, the rod 680 will be rocked in an opposite direction from that previously described, upon the beginning of the succeeding operation of the machine, by a second cam disk 687, which engages with a roller 688 projecting from the opposite side of the arm 684 from that of the roller 683. This rocking of the rod 680 will carry the extension of the gripping plate 679 from which the pin points 686 project over prongs 689 extending forwardly from a plate 690 secured to the outside printer frame 571 and thereby force the check off of said pin points. This rocking movement of the gripping device 679 occurs just previous to the movement of said plate up the inclined bar 680.

That portion of the bar 680 upon which the plate 679 slides is square in cross section but both ends of said bar are rounded so as to form bearings for the said bar in extensions of the plates 681 and 690, which as previously described, are attached to the side frames 571 of the printer, this rounding of the ends of the bar permitting the rocking of said bar by the cams 682 and 687 on the shaft 617 as previously described.

*Record strip feeding mechanism.*—The record strip is arranged to be fed from a supply roll 691, see Figs. 46 and 54, through a chute 692 secured to the side frame of the printer, over the record strip platen 581, over a plate 693 suitably secured to the printer frame, and between a feed roller 694 and a tension roller 695, from whence the strip passes to a storage roll 696 which is loosely mounted upon a stub shaft 697 projecting from one of the printer frames. Loosely mounted upon the stub shaft 697 (Fig. 54) is an arm 698 which carries a feed pawl 699 adapted to engage with a ratchet 700 secured to the feed roller 694. This arm 698 also carries a winding pawl 701 which engages a ratchet 702 secured to the storage roll 696. This arm 698 carrying the feed pawl 699 and winding pawl 701 is arranged to be operated by a two pronged cam 703 which is fast to the shaft 614. From Fig. 54 it will be seen that the prong 704 of the cam 703 will contact with a roller 705 projecting from the arm 698 and move said arm forwardly and upwardly. This movement of said arm will bring a roller 706 also mounted on said arm into the path of the prong 707 of the cam 703 so as to give the arm 698 an additional movement. The movement of the arm 698 will carry the feed pawl 699 idly over the ratchet 700 and as the shaft 614 continues to rotate the prong 704 will contact with a roller 708 projecting from an extension 709 of the arm 698 and move said arm rearwardly. This movement of the arm by the prong 704 contacting with the roller 708 will bring the roller 710 into the path of the other prong 707 of the cam 703 and restore the arm to its normal position. During this restoration of the arm the feed pawl will turn the feed roller 694 by engaging the ratchet 700 fast to said roller. The pawl 699 is forced into engagement with the ratchet 700 by a spring 711 interposed between said pawl and the upper end of the arm 698. A retaining pawl 712 is mounted upon a shaft 720 and engages with the ratchet 700 to prevent any retrograde movement of said ratchet.

An arm 714 is pivoted to the arm 698 as at 715 and at its free end carries the winding pawl 701 which engages with the ratchet 702 of the storage roll 696. A curved extension 716 of the winding pawl 701 passes through a flange 717 of the arm 714. A spring 718 surrounds this extension and is interposed between the pawl 701 and the flange 717. The arm 714 is limited in its pivotal movement by pins 719 projecting from the arms 698. The winding pawl 701 is arranged to rotate the ratchet 702 at the beginning of the operation of the machine, and the feed pawl 699 rotates the feed roller 694 upon the return of the arm 698 to normal position. Upon the first operation of the arm 698, after a new record strip has been placed in the machine, arm 714 carrying the winding pawl 701 will be lowered and the spring 718 compressed owing to the fact that the feeding mechanism comprising the feed roller 694 and the tension roller 695 has not as yet been operated. As the arm 698 is returned to its normal position the pawl 699 will operate the feeding devices as previously described. That portion of the strip just fed will remain slack between the feed roller 694 and the storage roller 696 until the succeeding operation of the machine when the pawl 701 will wind it upon the roller 696.

From the description above given it will be seen that the arm 698 carrying the feed pawl 699 will be given a constant excursion during each operation of the machine and this pawl will rotate the feed roller 694 to feed the record strip an equal distance at each operation. As it is desired only to wind the amount of strip that has previously been fed, upon the storage roll 696, it will be obvious that as said roll increases in diameter and if the winding pawl 701 be given a constant excursion during each operation of the arm 698 the feed of the strip would be increased in proportion to the increase of the diameter of the storage roll, and in order to overcome this defect the flexible arm 714 carrying the winding pawl 701 is provided. By this means the amount of strip previously fed is wound upon the storage roll and then the arm 714 lowered and the spring 718 compressed owing to there being sufficient tension between the feed roller 694 and the tension roller 695 to prevent the record strip being drawn between said rollers by the winding pawl 701. A suitable retaining pawl 712$^a$ engages the ratchet 702 of the storage roll to prevent retrograde movement of said ratchet, this pawl being mounted upon the frame work by a pivot screw 713.

In order that the feed roller 694 and the winding roller 695 may be separated in order easily to place the record strip in position, the tension roller 695 which is nothing more than a ring, see Figs. 54 and 55, is mounted upon a roller 719 which has eccentric bearings 720. Secured to this roller 719 is a plate 721 which carries a spring pressed pawl 722. This pawl is arranged to engage with a tooth 723 when the roller 695 is in contact with the feed roller 694 and thereby hold said rollers in contact. To withdraw the rollers out of contact it is only necessary to depress the pawl 722 and lower the plate 721. This will rotate the roller 719 carrying the tension ring 695 so as to withdraw the latter from out of contact with the feed roller 694.

*Dating and consecutive numbering devices.*—The devices about to be described are for printing the consecutive number of the transaction and the day, month, and year when the transaction occurred, upon both the record and check strips in alinement with the amounts. The date printing wheels 724 (Figs. 58 and 59) are provided with small pinions 725, the said wheels and pinions being mounted upon short rods 726 suitably secured in the printing frame. Meshing with the pinions of each of the upper type wheels 724, which are for recording upon the record strip, is the upper end of a segmental rack plate 727 which is loosely mounted upon the extreme left hand end of the transverse shaft 349. At the lower end the plate 727 is provided with teeth which mesh with similar teeth formed in the upper end of a segmental rack plate 728 which is fast to the inner end of one of a series of nested sleeves 729 which surround the extreme left hand end of the transverse shaft 350. These sleeves 729 extend through the printer frame and each one of said sleeves has fast thereto a plate 730 the forward edge of which is provided with a series of characters to indicate the date. These characters are viewed singly through an opening 731 in a plate 732 secured to the printer frame. The rear edges of the plates 730 are provided with V shaped notches 733 with which a combined locking and alining frame 734 engages. This frame is pivoted upon a stub shaft 735 and has connected therewith an arm 736 which engages with a bolt of a lock 737 so that the said plates cannot be accidentally displaced after they have been set. The segmental plates 728 which are secured to the inner ends of the nested sleeves 729 are provided at their lower ends with teeth which engage with the pinions 725 that are attached to the date printing wheels 724 for printing upon the check strip. The plates 727 and 728 have attached to their sides alining plates 740ᵃ with which spring pawls 740ᵇ engage properly to aline both sets of wheels 724.

Adjacent to the date printing wheels 724 are consecutive numbering wheels 738, see Figs. 60, 61, and 62, the first wheel of each set being provided with a ratchet wheel 739. A spring pressed pawl 740 is pivoted to the upper end of a vertical portion of a bell crank lever 741 which is pivoted upon a stub shaft 742 extending from the left hand side frame. The horizontal arm of the bell crank lever 741 is forked at its forward end and straddles a pin 743 projecting from a slide 744 which is reciprocated at each operation of the machine by a cam 745 secured to the cam shaft 11. It is to be understood that there are two of these bell crank levers 741 for actuating the different sets of consecutive numbering wheels, both of these levers being operated by the slide 744. Any suitable transfer mechanism between the units wheels 738 of each set of consecutive numbering wheels and the other wheels of the set may be provided, and that shown is the well known single tooth transfer.

The shafts 726 upon which the date and consecutive numbering wheels are mounted are provided with longitudinal grooves 746 which, when said shafts are rotated, engage with pawls 747 secured to the consecutive numbering wheels 738 and carry said wheels to zero position. The upper shaft extends outside of the left hand side frame and is provided with a knurled knob 748 (Fig. 58) by which said shaft may be rotated. Secured to this shaft is a pinion 749 (Fig. 60) which engages with a rack plate 750 secured to a slide 751. This slide is suitably mounted upon the side frame and at its lower end is provided with a plate 752 similar to the rack plate 750 which meshes with a pinion 753 secured to the lower consecutive numbering shaft 726.

The knurled knob 748 is first given a rotation in one direction by which movement the slide 751 will be elevated. This elevation of the slide will rotate the lower shaft 726 carrying the consecutive numbering wheels and as the knob 748 on the upper shaft 726 is rotated in the opposite direction, the slide will be returned to normal position and thereby rotate the lower shaft 726 in the opposite direction. The first rotation of the shaft 726 is an idle movement but as said shafts are returned to their normal position they pick up the pawls 747 of the consecutive numbering wheels and carry said wheels to zero. The slide 751 is provided with a notch 754 (Fig. 58) into which a pin 755 projects from one end of an arm 756, which is loosely mounted upon the side frame of the machine, and the other end of which contacts with a rearwardly extending portion of the arm 736. This construction is such that when the frame 734 is in locking position, the rearward extension of the arm 736 will contact with the arm 756 and hold the pin 755 in the recess 754 of the slide 751 and thereby lock the latter from movement so as to prevent any manipulation of the resetting means for the consecutive numbering devices.

*Résumé of operation.*

This completes the detailed description of the invention and in order that the memory may be refreshed as to the movement of the various parts a résumé of the operation of the machine will now be given.

In Fig. 1 it will be seen that clerk "A" has made a cash sale of 9 cents; now assuming that clerk "B" has made a sale of $35.79 he will first depress the amount keys representing that amount, the operation of any one of which will release the clerks' keys and upon operating the "B" key the elements of the totalizer corresponding thereto will be rocked into engagement with the actuating racks 344. This operation of the initial key releases the operating crank handle 353 which upon being rotated will rotate the operating shafts 11, 160, and 163 through the gearing shown in Figs. 1 and 7. When the amount keys are depressed they move the racks 179, see Fig. 2, positively in engagement with the operating pinions 181 carried upon the shaft 160, and the actuation of the "B" key will positively move the rack 200 carried on the adjustable element 199 into engagement with its operating pinion 181 secured to the shaft 160. As the shaft 160 is rotated by the crank handle as previously mentioned, the pinions 181 mounted thereon will carry the differential elements 177 of the "units" and "tens" of cents and the "units" and "tens" of dollars denominations, and also the clerks' differential element 199, downwardly until the racks 179 of the amount element and the rack 200 of the clerks' element are disconnected from their operating pinions by the movements of the slides 188 and 203 mounted respectively upon the amount and clerks' differential elements. The movements of the amount differential elements will be conveyed by pinions 349 and shafts 345, 346, 348, and 349 to actuating racks 344 which impart their movements to the elements of the clerks' totalizer that is in engagement therewith. This downward movement of the amount elements 177 will also actuate the registering wheels or elements 324 of the grand totalizer which previously to the downward movement of said elements is rocked into engagement with the differential adustable elements 177. As the latter elements move downwardly they rotate disks 192 while the clerks' element 199 rocks yoke frame 263 loosely mounted upon the shaft 221. The movements of the disk 192 and the yoke frame 263 will through segmental plates 222 and 264 connected respectively to the disks 192 and frame 263, move rack plates 224 and 265 forwardly, alining pawls 245 being drawn out of engagement with the alining notches just previous to the downward movement of said elements. Before the rack plates 224 and 265 are moved forwardly the bar 225 supported in the arms 226 will be allowed to move forwardly by the cams 228 supported upon the driving shaft 163 moving out of the path of the rollers 229 suitably mounted upon the arms 226. The forward movement of the rack bar plates 224 and 265 will carry the lower ends of the arms 232 and 266 also forwardly. This forward movement of the lower ends of the tens of cents and units and tens of dollars arms 232 will rotate their respective indicators by the upper segmental portion 238 of said arms and suitable intermediate gearing. The rack portions will move rearwardly as the lower ends of said arms move forwardly, the pins 233 projecting from said arms acting as the pivotal points. The lower end of the arm 232 of the units of cents will also move forwardly with its rack plate 224 but owing to the fact that the indicator indicated "nine" at the previous transaction the said indicator will not be moved, the lower end of the bar simply moving forward with the rack plate 224 the teeth 238 of said bar acting as a pivot. For the clerks' indicator the differential element 199 will move the rack plate 265 forwardly two spaces, one degree of movement of said bar being idle on account of the indicator previously exhibiting "A".

This idle degree of movement of the plate 265 will carry the hook extension of the floating arm in which the pivotal roller 267 is mounted, into contact with the collar upon the shaft 163. The second degree of movement of said plate 265 forwardly will then rotate the arm 266 with the said roller 267 as its pivot. This rotation of the arm 266 will move the segmental portion of said arm 268 rearwardly and through the intermediate gearing shown in Figs. 14 and 15 rotate the clerks' indicator an additional step to bring "B" in posititon to be exhibited. After the indicators have been properly set alining pawls 242 are rocked into engagement with notches formed in plates 244 to aline the indicators and prevent any accidental displacement of same.

The transverse shafts 345, 346, 348, 349, and 563 coöperating respectively with the units and tens of cents, the units and tens of dollars, and the clerks' differential elements will through pinions 544 set up the amount and the initial of the clerk making the transaction on the type-carriers 546. After the type-carriers have been properly positioned they will be inked by pads 565 and 580 after which impressions will be taken upon the check strip 549 and the record strip 691 by platens 573 and 581 respectively, the check strip platen being arranged to take two impressions upon the check. Previous to the taking of impressions upon the check, the perforating device is operated to perforate the check so that the impressions taken thereon will be on opposite sides of the perforation. After the check has been printed it is cut off by a pair of knives and then gripped by a device forming a part of the check ejecting mechanism. This gripping device with the check will then be carried to the exterior of the machine in such a position that the check is accessible to either the customer or the clerk. The mechanism shown in Fig. 54 provides for feeding the record strip an equal distance at each operation of the machine.

Upon the movement of the indicators by the mechanism previously described, the cam disks 312 carried thereby will withdraw the individual flashes from a position concealing the indicators, the main flash in the meantime having been moved to a position to conceal them. At very nearly the end of the operation of the machine the main flash or concealing means will be withdrawn so as to expose the indicators that have been adjusted by the operating mechanism. By this recording of the sale one will be added upon each of the "clerk's," "customers," and "cash sales" special counters.

The operation involving a special transaction will be practically the same as that described above but in addition certain mechanism operated upon the depression of a special or transaction key will prevent the rocking in of the clerks' totalizer and the grand totalizer upon the operation of the machine, and while the transaction will be completely indicated and recorded the amount will be added upon the special totalizer only.

If at any time it is desired to set any one or all of the totalizers to zero the detachable key 447ᵃ is inserted in the key barrel 447 and the shaft 98 rotated. This rotation of the shaft 98 will rock the bell crank 451 (Fig. 18) so as to bring the pin 452 projecting from the downwardly extending arm of the bell crank into the cam groove 453 in the disk 454 secured to the shaft 163. Upon the operation of the machine the bell crank 451 will be further rocked during which movement slide 467 will be elevated by the pin 450 projecting from the horizontal arm of the bell crank contacting with the upper edge of the slot formed in the upper end of the slide 467. This upward movement of slide 467 will rock the segment 532 which is secured to the shaft 221 and thereby rock the latter. Secured on the shaft 221 are a plurality of segments 533 which mesh with teeth 534 formed upon the lower end of slides 514. If previous to the operation of the machine the "main counter reset" key 82 is depressed a link 464 will be connected to the slide 467 so that when the latter is raised the link 464 will also be raised. The raising of this link will rotate a segmental plate 471 which will rotate the shaft 325 carrying the elements of the grand totalizer and through a longitudinal groove 478 cut in said shaft which engages with the pawls 479 secured to the elements 324 of the grand totalizer, carry said elements back to normal or zero position. In addition to the depressing of the "main counter reset" key 82 if the disks 504 are rotated by the detachable manipulative device 504ᵃ the resetting segments 501 for the clerks' and special totalizers will be moved into such a position that rollers 512 carried thereby will be moved into the path of fingers 513 formed upon the slides 514 so that when the latter are elevated by the segments 533 secured to the shaft 221 the said segments will be rotated to reset the clerks' and special totalizers, see Fig. 23, simultaneously with the resetting of the grand totalizer. When the link 464 is connected to the slide 467 and elevated thereby one will be added upon a special counter to indicate the number of times the grand totalizer has been reset.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In an accounting machine, the combination with an operating mechanism, of a differentially movable element normally disconnected from said operating mechanism, and constructed to be positively connected thereto, and manipulative means controlling the positive connection of the operating mechanism and movable element and adapted to obstruct at different points the movement imparted to the latter by the operating mechanism.

2. In an accounting machine, the combination with an operating mechanism, of a differentially movable rack bar normally disconnected from said operating mechanism and constructed to be positively connected thereto, and manipulative means controlling the positive connection of said operating mechanism and rack bar and adapted to obstruct at different points the movement imparted to the latter by the operating mechanism.

3. In an accounting machine, the combination with an operating mechanism, of a differentially movable element normally disconnected from said operating mechanism, a device carried by said element and constructed to be positively operated to connect the latter with the operating mechanism, and manipulative means controlling the positive connection of the operating mechanism and said element and adapted to obstruct at different points the movement imparted to the latter by the operating mechanism.

4. In an accounting machine, the combination with an operating mechanism, of a differentially movable rack bar normally disconnected from said mechanism, a second rack bar carried by the first mentioned rack bar and constructed to be positively operated to connect the latter with the operating mechanism, and manipulative means controlling the positive connection of the operating mechanism and the first mentioned rack bar, and the movement imparted to the latter by the operating mechanism.

5. In an accounting machine, the combination with an operating mechanism, of a differentially movable element normally disconnected therefrom, a device positively operated for connecting the operating mechanism and the movable element, and manipulative means controlling the p  i  connection of the operating mechan  an and the said element, and adapted to obstruct at different points the movement imparted to the latter by the operating mechanism.

6. In an accounting machine, the combination with an operating mechanism, of a differentially movable rack bar normally disconnected therefrom, a second rack bar positively operated for connecting the operating mechanism and the first mentioned rack bar, and manipulative means controlling the positive connection of the operating mechanism and the first mentioned rack bar, and the movement imparted to the latter by the operating mechanism.

7. In an accounting machine, the combination with an operating mechanism, of a differentially movable element normally disconnected therefrom and constructed to be positively connected thereto, manipulative means controlling the positive connection of the operating mechanism and movable element and adapted to obstruct at different points the movement imparted to the latter by the operating mechanism, and a totalizer element actuated by the movement of the differentially movable element.

8. In an accounting machine, the combination with an operating mechanism, of a differentially movable rack bar normally disconnected therefrom and constructed to be positively connected thereto, manipulative means controlling the positive connection of the operating mechanism and the rack bar and adapted to obstruct at different points the movement imparted to the latter by the operating mechanism, and a totalizer element actuated by the movement of the rack bar.

9. In an accounting machine, the combination with an operating mechanism, of a differentially movable element normally disconnected therefrom, a device positively operated for connecting the operating mechanism and the movable element, manipulative means controlling the positive connection of the operating mechanism and said element and adapted to obstruct at different points the movement imparted to the latter by the operating mechanism, and a totalizer element actuated by the movement of the differentially movable element.

10. In an accounting machine, the combination with an operating mechanism, of a differentially movable rack bar normally disconnected therefrom, a device for positively connecting the operating mechanism and said rack bar, manipulative means controlling the positive connection of the operating mechanism and said rack bar and adapted to obstruct at different points the movement imparted to the latter by the operating mechanism, and a totalizer element actuated by the movement of the rack bar.

11. In an accounting machine, the combination with an operating mechanism, of a differentially movable element normally disconnected therefrom, and constructed to be positively connected thereto, means for holding the element in connection with the operating mechanism when connected thereto, and manipulative devices controlling the positive connection of the operating mechanism and said element, the extent of movement imparted to the element by the operating mechanism, and the tripping of the holding means.

12. In an accounting machine, the combination with an operating mechanism, of a differentially movable rack bar normally disconnected therefrom and constructed to be positively connected thereto, means for holding the rack bar in connection with the operating mechanism when connected thereto, and manipulative devices controlling the positive connection of the operating mechanism and rack bar, the extent of movement imparted to the latter by the operating mechanism, and the tripping of the holding means.

13. In an accounting machine, the combination with an operating mechanism, of a differentially movable element normally disconnected therefrom and constructed to be positively connected thereto, and manipulative devices controlling the positive connection of the operating mechanism and movable element, the extent of movement imparted to the latter by the operating mechanism, and the disconnection of said element and operating mechanism.

14. In an accounting machine, the combination with an operating mechanism, a differentially movable element normally disconnected therefrom, a device positively operated to connect the operating mechanism and movable element, means for holding the operating mechanism and movable element in connection when connected, and manipulative devices controlling the positive connection of the operating mechanism and movable element, the extent of movement imparted to the latter by the operating mechanism, and the tripping of the holding means.

15. In an accounting machine, the combination with an operating mechanism, of a differentially movable rack bar normally disconnected therefrom, a second rack bar carried by the first mentioned rack bar and constructed to be positively moved into connection with the operating mechanism, a latch for holding the second rack bar connected to the operating mechanism, and manipulative devices for controlling the positive connection of the operating mechanism and rack bar, the extent of the movement imparted to the latter by the operating mechanism, and the tripping of the latch.

16. In an accounting machine, the combination with an operating mechanism, of a differentially movable rack bar normally disconnected therefrom, a second rack bar carried by the first mentioned rack bar and constructed to be positively moved into connection with the operating mechanism, a latch for holding the second rack bar connected to the operating mechanism, manipulative devices for controlling the positive connection of the operating mechanism and rack bar, the extent of movement imparted to the latter by the operating mechanism, and the tripping of the latch, and a totalizer element actuated by the movement of the first mentioned rack bar.

17. In an accounting machine, the combination with an operating mechanism, of a differentially movable element normally disconnected therefrom, a device positively operated to connect the operating mechanism and movable element, means for holding the operating mechanism and movable element in connection, means carried by said element and having a movement independent thereof for tripping the holding means, and manipulative devices controlling the connection of the operating mechanism and movable element, and the independent movement of the means for tripping the holding means.

18. In an accounting machine, the combination with an operating mechanism, of a differentially movable element normally disconnected therefrom, a device positively operated to connect the operating mechanism and movable element, a latch for holding the operating mechanism and movable element in connection, a plate carried by said element and having a movement independent thereof for tripping the latch, and manipulative devices controlling the connection of the operating mechanism and movable element, and the independent movement of the plate.

19. In an accounting machine, the combination with an operating mechanism, of a differentially movable rack bar normally disconnected therefrom, a second rack bar carried by the first mentioned rack bar and constructed to be moved into engagement with the operating mechanism, a latch for holding the second rack bar connected to the operating mechanism, a plate also carried by the first mentioned rack bar and having a movement independent thereof for tripping the latch, and manipulative devices controlling the movement of the rack bars by the operating mechanism, and the independent movement of the plate.

20. In an accounting machine, the combination with an operating mechanism, of a differentially movable rack bar normally disconnected therefrom, a second rack bar carried by the first rack bar and constructed to be moved into engagement with the operating mechanism, a latch for holding the second rack bar connected to the operating mechanism, a plate also carried by the first rack bar and having a movement independent thereof for tripping the latch, and manipulative devices for connecting the second bar to the operating mechanism, arresting the movement of the racks by the operating mechanism, and actuating the plate to trip the latch.

21. In an accounting machine, the combination with an operating mechanism, of a differentially movable rack, a second rack carried thereby and constructed to be moved into connection with the operating mechanism, a latch for said second rack brought into operation when the second rack is connected to the operating mechanism, a plate also carried by the first rack and having a movement independent thereof, means including a sliding plate for positively connecting the second rack to the operating mechanism, and a series of keys for actuating the sliding plate, arresting the movement of the rack bars and moving the plate to trip the latch.

22. In an accounting machine, the combination with an operating pinion, of a differentially movable rack, a second rack carried thereby and constructed to be moved into connection with the operating pinion, means for supporting the racks in inoperative positions, and a series of keys for tripping the supporting means and connecting the second rack to the operating pinion.

23. In an accounting machine, the combination with an operating pinion, of a differentially movable rack, a second rack carried thereby and constructed to be moved into connection with the operating pinion, means for holding the racks in normal positions, a pawl for latching the second rack in engagement with the pinion, a plate carried by the first rack and having an independent movement thereof for tripping the pawl, and a series of keys for releasing the holding means and connecting the second rack to the operating mechanism, arresting the movement of the rack bars and moving the plate to trip the pawl.

24. In an accounting machine, the combination with an operating mechanism, of a differentially movable element normally disconnected therefrom, a device carried by said element for connecting the latter to the operating mechanism, means for latching the device in engagement with the operating mechanism, and means including a sliding plate for operating the connecting device, the said sliding plate being constructed positively to trip the latching means.

25. In an accounting machine, the combination with an operating mechanism, of a differentially movable rack bar normally disconnected therefrom, a second rack bar carried by the first mentioned rack bar for connecting the latter to the operating mechanism, a pawl for latching the second rack bar in operative position, a series of keys, and means operated thereby including a sliding plate for moving the second rack bar into engagement with the operating mechanism, the said sliding plate being constructed positively to trip the latching means.

26. In an accounting machine, the combination with an operating mechanism, of a differentially movable element normally disconnected therefrom, means for connecting the operating mechanism and movable element, and a device carried by the movable element for holding it in connection with the operating mechanism, the said holding device having a movement independent of the movable element for disconnecting the latter from the operating mechanism at different points of movement of the operating mechanism.

27. In an accounting machine, the combination with an operating mechanism, of a differentially movable rack bar normally disconnected therefrom, a second rack bar carried by the first mentioned rack bar and constructed to be moved positively into connection with the operating mechanism, means carried by the first rack bar for holding the second rack bar connected to the operating mechanism, the said holding means having a movement independent of the rack bar for disconnecting the latter from the operating mechanism, and manipulative devices for controlling the independent movement of the holding devices.

28. In an accounting machine, the combination with an operating mechanism, of a differentially movable rack bar, a second rack bar carried by the first mentioned rack bar and constructed to be moved into connection with the operating mechanism, means also carried by the first rack bar for holding the second bar in connection with the operating mechanism, a spring placed under tension by the movement of the second rack bar into connection with the operating mechanism and connected for moving the holding means into operative position, and manipulative devices for moving the second rack bar.

29. In an accounting machine, the combination with an operating mechanism, of a differentially movable rack bar, a second rack bar carried by the first mentioned rack bar and constructed to be moved into connection with the operating mechanism, a plate also carried by the first rack bar for holding the second rack bar in connection with the operating mechanism, a spring placed under tension by the movement of the second rack into connection with the operating mechanism and connected for moving the plate into operative position, a series of keys controlling the engagement of the second rack bar with the operating mechanism and the extent of movement of the first rack bar, and an indicator controlled by the movement of the first mentioned rack bar.

30. In an accounting machine, the combination with an operating mechanism, of a differentially movable element normally disconnected from said mechanism, manipulative devices controlling the connection of said operating mechanism and movable element and the extent of movement imparted to the latter by the operating mechanism, an indicator, and a connecting link between said element and indicator, the said link being pivoted at both ends and at the center at different times during an operation of the machine.

31. In an accounting machine, the combination with an operating mechanism, of a differentially movable element, manipulative devices controlling the movement of said element by the operating mechanism, an indicator, and connecting mechanism constructed to be pivoted successively at both ends and at the center in moving the indicator from one position to another during an operation of the machine.

32. In an accounting machine, the combination with an operating mechanism, of a differentially movable element, manipulative devices controlling the movement of said element by the operating mechanism, an indicator, connecting mechanism constantly in engagement with the movable element and indicator, and a swinging frame carrying the connecting mechanism.

33. In an accounting machine, the combination with an operating mechanism, of a differentially movable element, manipulative devices controlling the movement of said element by the operating mechanism, an indicator, connecting mechanism constantly in engagement with the movable element and the indicator, a swinging frame carrying the connecting mechanism, and a cam for operating said frame to turn the indicator from one position to another during an operation of the machine.

34. In an accounting machine, the combination with an operating mechanism, of a differentially movable element, manipulative devices controlling the movement of said element by the operating mechanism, an indicator, connecting mechanism constantly in engagement with the movable element and the indicator, a swinging frame carrying the connecting mechanism, a cam for operating said frame to turn the indicator from one position to another during an operation of the machine, and means for returning the movable element to normal position without affecting the indicator.

35. In an accounting machine, the combination with an operating mechanism, of a differentially movable element, manipulative devices controlling the movement of said element by the operating mechanism and indicator, connecting mechanism constantly in engagement with the movable element and the indicator, a movable frame carrying the connecting mechanism, a second movable frame for returning the movable element to normal position, and cams for successively operating said frames during an operation of the machine.

36. In an accounting machine, the combination with a totalizer comprising a plurality of movable elements, of a movable frame carrying said totalizer, actuating devices for said elements, means for holding the movable elements of said totalizer out of operative relation with their actuating devices, and a manipulative device for operating the holding means, and positively moving the movable elements in engagement with the actuating devices.

37. In an accounting machine, the combination with a totalizer, of actuating devices therefor, a movable frame carrying said totalizer, a latch holding the totalizer out of engagement with the actuating devices, and a manipulative device for positively withdrawing the holding latch, and moving the totalizer into engagement with its actuating devices.

38. In an accounting machine, the combination with a totalizer, of actuating devices therefor, a movable frame carrying said totalizer, a latch for holding the totalizer out of engagement with the actuating devices, a lever for moving the totalizer in engagement with said devices, and a manipulative device for positively operating the latch and lever.

39. In an accounting machine, the combination with a totalizer, of actuating devices therefor, means normally holding said totalizer out of engagement with the actuating devices, a manipulative device for operating the holding means and moving the totalizer into engagement with the actuating devices, and means operated during the operation of the machine for positively moving the totalizer out of engagement with the actuating devices.

40. In an accounting machine, the combination with a totalizer, of actuating devices therefor, means normally holding said totalizer out of engagement with the actuating devices, a manipulative device for operating the holding means and moving the totalizer into engagement with the actuating devices, a plate, and means carried thereby for positively moving the totalizer out of engagement with the actuating devices.

41. In an accounting machine, the combination with a totalizer, of actuating devices therefor, means normally holding said totalizer out of engagement with the actuating devices, means for moving the totalizer into engagement with said devices, a manipulative device for operating the holding and moving means, and a device carrying the moving means, the said device being constructed to be moved upon each operation of the machine to carry the totalizer positively out of engagement with the actuating devices, through the moving means.

42. In an accounting machine, the combination with a totalizer, of actuating devices therefor, a latch normally holding the totalizer out of engagement with the actuating devices, a lever for moving the totalizer into engagement with said devices, and a manipulative device for operating the latch and lever, the said lever being constructed to be moved positively to carry the totalizer out of engagement with the actuating devices.

43. In an accounting machine, the combination with a totalizer, of actuating devices therefor, a latch normally holding the totalizer out of engagement with the actuating devices, a lever for moving the totalizer into engagement with said devices, a key for operating the latch and lever, a plate carrying the lever, and means operating the plate at each operation of the machine, the lever carried by said plate being constructed positively to move the totalizer out of engagement with the actuating devices.

44. In an accounting machine, the combination with a totalizer, of actuating devices therefor, means for moving the totalizer into engagement with the actuating devices, a manipulative device controlling the operation of the moving means, and a movable device carrying the moving means and constructed to be operated at each operation of the machine to carry the totalizer positively out of engagement, through the moving means.

45. In an accounting machine, the combination with a totalizer, of actuating devices therefor, means for moving the totalizer into and out of engagement with the actuating devices, and a movable device carrying the moving means, the moving means being movable on the moving device.

46. In an accounting machine, the combination with a totalizer, of actuating devices therefor, means for moving the totalizer into and out of engagement with the actuating devices, a key controlling the movement of said means to carry the totalizer into engagement with the actuating devices, and a movable device carrying the moving means to disengage positively the totalizer and actuating devices.

47. In an accounting machine, the combination with a totalizer, of actuating devices therefor, and means for moving the totalizer into and out of engagement with the actuating devices, the said means having a pivotal movement to engage the totalizer and actuating devices, and a bodily and pivotal movement to disengage the totalizer and said devices.

48. In an accounting machine, the combination with a totalizer, of actuating devices therefor, means for moving the totalizer into and out of engagement with the actuating devices, a key for rocking said means to engage the totalizer and actuating devices, and a plate bodily moving said means to disengage the totalizer and said devices.

49. In an accounting machine, the combination with a totalizer, of actuating devices therefor, means for moving the totalizer into and out of engagement with the actuating devices, a key for rocking said means to engage the totalizer and actuating devices, a plate bodily moving said means, and a pin for camming said means during its bodily movement to disengage the totalizer and actuating devices.

50. In an accounting machine, the combination with an operating mechanism, of two totalizers either of which may be brought into engagement with the operating mechanism, a manipulative device for each totalizer controlling the engagement of its totalizer with the operating mechanism, and means controlled by one of the said manipulative devices for positively preventing the engagement of the totalizer controlled by the other manipulative device regardless of the movement of the latter device.

51. In an accounting machine, the combination with an operating mechanism, of two totalizers either of which may be brought into engagement with the operating mechanism, a manipulative device for each totalizer controlling the engagement of its totalizer with the operating mechanism, and means actuated by one of the said manipulative devices for positively locking the totalizer controlled by the other manipulative device out of engagement with the operating mechanism regardless of the movement of its manipulative device.

52. In an accounting machine, the combination with an operating mechanism, of two totalizers either of which may be brought into engagement with the operating mechanism, a pivoted lever for each totalizer and constructed to move its totalizer into engagement with the operating mechanism, a key for each totalizer and constructed to operate its corresponding lever, and means actuated by one of the keys to move the lever corresponding to the other key out of operative relation to said key and positively to lock said lever and its totalizer from movement.

53. In an accounting machine, the combination with an operating mechanism, of a totalizer comprising a shaft and a plurality of registering wheels mounted thereon, actuating mechanism for the totalizer, means for moving the totalizer into engagement with the actuating mechanism, means for rotating the shaft and thereby resetting the wheels to zero, the said means being normally out of operative relation with the operating mechanism, means for locking the resetting means, and mechanism for operating the locking means and establishing an operative relation between the resetting means and operating mechanism.

54. In an accounting machine, the combination with an operating mechanism, of a totalizer comprising a shaft and a plurality of registering wheels mounted thereon, means for actuating the totalizer, means for moving the totalizer into and out of engagement with said actuating means, means for rotating the shaft and thereby resetting the wheels to zero, the said means being normally out of operative relation with the operating mechanism, means for locking the resetting means, mechanism for unlocking the resetting means and establishing an operative relation between said means and operating mechanism, and a counter actuated each time the totalizer is reset.

55. In an accounting machine, the combination with an operating mechanism, of a totalizer comprising a shaft and a plurality of registering wheels mounted thereon, means for rotating the wheels to zero, the said means being normally out of operative relation with the operating mechanism, and a plurality of manipulative devices for establishing an operative relation between the resetting means and the operating mechanism.

56. In an accounting machine, the combination with an operating mechanism, of a totalizer comprising a shaft and a plurality of registering wheels mounted thereon, means for rotating the shaft and thereby resetting the wheels to zero, the said means being normally out of operative relation with the operative mechanism, means for establishing an operative relation between the resetting means and operating mechanism, and devices actuated by the resetting means for positively arresting the wheels at zero.

57. In an accounting machine, the combination with an operating mechanism, of a totalizer comprising a shaft and a plurality of registering wheels mounted thereon, a segment for rotating the shaft and thereby resetting the wheels to zero, the said segment being normally out of operative relation with the operating mechanism, means for locking the resetting segment, mechanism for unlocking the resetting means and establishing an operative relation between the resetting segment and operating mechanism, and devices actuated by the resetting means for arresting the wheels at zero.

58. In an accounting machine, the combination with an operating mechanism, of a totalizer comprising a shaft and a plurality of registering wheels mounted thereon, means actuated by the operating mechanism for rotating the shaft and thereby resetting the wheels to zero, means for locking the resetting means, mechanism for actuating the locking means, devices actuated by the resetting means for arresting the wheels at zero, and a counter actuated each time the totalizer is reset.

59. In an accounting machine, the combination with an operating mechanism, of a totalizer comprising a shaft and a plurality of registering wheels mounted thereon, a segment for rotating the shaft and thereby resetting the wheels to zero, a slide, a manipulative device connecting said slide to the operating mechanism, a second slide, and a second manipulative device for connecting the slides, the second slide being constructed to actuate the resetting segment on an operation of the operating mechanism.

60. In an accounting machine, the combination with an operating mechanism, of a totalizer comprising a shaft and a plurality of registering wheels mounted thereon, a segment for rotating the shaft and thereby resetting the wheels to zero, a slide, a manipulative device connecting said slide to the operating mechanism, a second slide, a second manipulative device for connecting the slides, the second slide being constructed to actuate the resetting segment on an operation of the operating mechanism, devices actuated by the resetting segment for arresting the wheels at zero, and a counter actuated each time the totalizer is reset.

61. In an accounting machine, the combination with a main operating mechanism, of locking devices for said operating mechanism, a series of keys controlling the locking devices, means normally locking the keys, a totalizer comprising a plurality of movable elements, means actuated by the operating mechanism for resetting the elements of said totalizer to zero, the said means being normally disconnected from the operating mechanism, and a manipulative device controlling the connection of the resetting means and operating mechanism and operating the key locking devices.

62. In an accounting machine, the combination with a main operating mechanism, of locking devices therefor, a series of keys controlling the locking devices, means normally locking the keys, a totalizer comprising a shaft and a plurality of registering wheels, means actuated by the operating mechanism for rotating the shaft and thereby resetting the wheels to zero, the said means being normally disconnected from the operating mechanism, and a manipulative device controlling the connection of the resetting means and operating mechanism and operating the key locking devices.

63. In an accounting machine, the combination with a main operating mechanism, of locking devices therefor, a series of keys controlling the locking devices, means normally locking the keys, a totalizer comprising a plurality of movable elements, means actuated by the operating mechanism for resetting the elements of said totalizer to zero, the said means being normally disconnected from the operating mechanism, a lock for the resetting means, and a manipulative device controlling the connection of the resetting means and operating mechanism and operating the locking devices for the keys and resetting means.

64. In an accounting machine, the combination with a main operating mechanism, of locking devices therefor, a series of keys controlling the locking devices, means normally locking the keys, a totalizer comprising a shaft and a plurality of registering wheels, means actuated by the operating mechanism for rotating the shaft and thereby resetting the wheels to zero, the said means being normally disconnected from the operating mechanism, a lock for the resetting means, a manipulative device controlling the connection of the resetting means and operating mechanism, and operating the locking devices for the keys and resetting means, and devices operated by the resetting means for arresting the wheels at zero.

65. In an accounting machine, the combination with a main operating mechanism, of a totalizer comprising a plurality of movable elements, a series of keys controlling the extent of movement imparted to the elements by the operating mechanism, locking devices for said operating mechanism, a second series of keys controlling the locking devices, means normally locking the second series of keys, means actuated by the operating mechanism for resetting the elements of the totalizer to zero, the said means being normally disconnected from the operating mechanism, a manipulative device and means controlled thereby for connecting the resetting means and operating mechanism, the locking of the first series of keys and the unlocking of the second series of keys.

66. In an accounting machine, the combination with a main operating mechanism, of a totalizer comprising a plurality of movable elements, differentially movable devices actuated by the operating mechanism for operating the elements of the totalizer, the said elements and actuating devices being normally out of operative relation, means for establishing an operative relation between said elements and devices, means actuated by the operating mechanism for resetting the elements of the totalizer to zero, the said means being normally disconnected from the operating mechanism, and a manipulative device controlling the connection of the resetting means and the operating mechanism and the disabling of the means for establishing an operative relation between the actuating devices and the elements of the totalizer.

67. In an accounting machine, the combination with a main operating mechanism, of devices differentially actuated thereby, a totalizer comprising a plurality of movable elements, means for moving the said elements into engagement with said actuated devices, means actuated by the operating mechanism for resetting the totalizer to zero, and a manipulative device for disabling the moving means when it is desired to reset the totalizer.

68. In an accounting machine, the combination with an operating mechanism, of devices differentially actuated thereby, a totalizer, means for moving the totalizer into engagement with the differentially actuated devices, means actuated by the operating mechanism for resetting the totalizer to zero, and means, including a detachable key, controlling the disabling of the moving means when it is desired to reset the totalizer.

69. In an accounting machine, the combination with an operating mechanism, of devices differentially actuated thereby, a totalizer, means for moving the totalizer into engagement with the differentially actuated devices, means actuated by the operating mechanism for resetting the totalizer to zero, the said resetting means being normally disconnected from the operating mechanism, and means, including a detachable key, controlling the disabling of the moving means and the connecting of the resetting means and operating mechanism.

70. In an accounting machine, the combination with an operating mechanism, of devices differentially actuated thereby, a totalizer, slides having arms mounted thereon for moving the totalizer into engagement with the differentially actuated devices, cams operating said slides, means actuated by the operating mechanism for resetting the totalizer to zero, the said means being normally disconnected from the operating mechanism, and means, including a detachable key, for moving the arms to disable the slides, and controlling the connecting of the resetting means and the operating mechanism.

71. In an accounting machine, the combination with an operating mechanism, of a totalizer comprising a plurality of movable elements, means actuated by the operating mechanism for resetting the totalizer, the said resetting means being normally disconnected from the operating mechanism, means for locking the resetting means, and means for first tripping the locking means and subsequently moving the resetting means to connect it to the operating mechanism.

72. In an accounting machine, the combination with an operating mechanism, of a totalizer comprising a shaft and a plurality of registering wheels carried thereon, means actuated by the operating mechanism for resetting the wheels to zero, the said resetting means being normally disconnected from the operating mechanism, means for locking the resetting means, the said resetting means in turn locking the shaft, and means for first tripping the locking means for the resetting means, and subsequently moving the latter to unlock the shaft, this movement of the resetting means controlling the connection between it and the operating mechanism.

73. In an accounting machine, the combination with an operating mechanism, of a totalizer comprising a shaft and a plurality of registering wheels, a slide normally disconnected from the operating mechanism, a manipulative device for connecting the slide and operating mechanism, a resetting means for the wheels of the totalizer, a lock for the resetting means, the latter in turn locking the shaft, and a second manipulative device for tripping the locking means for the resetting means and moving the latter to connect it with the slide, this movement of the resetting means unlocking the shaft.

74. In an accounting machine, the combination with an operating mechanism, of a plurality of totalizers any one of which may be brought into connection with the operating mechanism, means actuated by the operating mechanism for resetting the totalizers to zero, the said means being normally disconnected from the operating mechanism, and a manipulative device controlling the connection of the resetting means and operating mechanism and preventing the connection of any of the totalizers with said mechanism.

75. In an accounting machine, the combination with an operating mechanism, of a plurality of totalizers any one of which may be brought into connection with the operating mechanism, means actuated by the operating mechanism for resetting the totalizers to zero, the said means being normally disconnected from the operating mechanism, a manipulative device controlling the connection of the resetting means and operating mechanism, and a slide actuated by the manipulative device for positively preventing the connection of any of the totalizers with said operating mechanism.

76. In an accounting machine, the combination with an operating mechanism, of a plurality of totalizers any one of which may be brought into connection with the operating mechanism, means actuated by the operating mechanism for simultaneously resetting all of the totalizers to zero, the said means being normally disconnected from the operating mechanism, and a manipulative device controlling the connection of the resetting means and the operating mechanism.

77. In an accounting machine, the combination with an operating mechanism, of a totalizer comprising a plurality of movable elements, means actuated by the operating mechanism for resetting the elements of the totalizer, the said resetting means being normally disconnected from the operating mechanism, a check issuing device normally connected to the operating mechanism, and means controlling the connection of the resetting means with the operating mechanism and the disconnection of the check issuing device.

78. In an accounting machine, the combination with an operating mechanism, of a totalizer comprising a plurality of movable elements, means actuated by the operating mechanism for resetting the elements of the totalizer, the said resetting means being normally disconnected from the operating mechanism, a check issuing device connected to the operating mechanism, and a detachable device controlling the connection of the resetting means with the operating mechanism and the disconnection of the check issuing device.

79. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, check issuing feed rollers connected to the operating mechanism, and means controlling the connection of the resetting means and the disconnection of the feed rollers and operating mechanism.

80. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, check feeding and ejecting devices connected to the operating mechanism, and means controlling the connection of the resetting means and the disconnection of the check feeding and ejecting devices and the operating mechanism.

81. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a check issuing device normally connected to the operating mechanism, means for connecting the resetting means to the operating mechanism and disconnecting the check issuing device, and means locking the latter device when disconnected from the operating mechanism.

82. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a check issuing device, a pinion normally connecting the latter with the operating mechanism, and means for connecting the resetting means to the operating mechanism, bodily moving the pinion to disconnect the check issuing device, and locking the latter device when disconnected from the operating mechanism.

83. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a check issuing device, and means for connecting the resetting means to the operating mechanism and controlling the operation of the check issuing device.

84. In an accounting machine, the combination with an operating mechanism, of a totalizer comprising a plurality of movable elements, the said elements being constructed to be reset to zero by the operating mechanism, a check issuing device, and a manipulative device controlling the resetting of the totalizer and the check issuing device.

85. In an accounting machine, the combination with an operating mechanism, of a totalizer comprising a plurality of movable elements, said elements being constructed to be reset to zero by the operating mechanism, a printing mechanism, and a manipulative device controlling the printing mechanism and the resetting of the totalizer.

86. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a printing mechanism, and means connecting the resetting means to the operating mechanism and controlling the operation of the printing mechanism.

87. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a printing mechanism, normally connected to the operating mechanism, and means for connecting the resetting means to the operating mechanism and disconnecting the printing mechanism.

88. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a printing mechanism comprising type carriers and a platen, actuated by the operating mechanism, and means for connecting the resetting means to the operating mechanism and disabling the platen.

89. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a printing mechanism comprising a platen and strip feeding devices, and means for connecting the resetting means to the operating mechanism and disabling the platen and feeding devices.

90. In an accounting machine, the combination with an operating mechanism, of a totalizer comprising a plurality of movable elements, means actuated by the operating mechanism for resetting the elements of the totalizer to zero, the said resetting means being normally disconnected from the operating mechanism, a printing mechanism comprising a platen and strip feeding devices, the platen and feeding devices being normally connected to the operating mechanism, a manipulative device controlling the connection of the resetting means and operating mechanism and the disconnection of the platen and feeding devices, and means locking the platen and feeding devices when they are disconnected from the operating mechanism.

91. In a printing mechanism, the combination with a platen and strip feeding devices, of an operating mechanism therefor normally connected therewith, and a manipulative device for positively disconnecting the platen and feeding devices from the operating mechanism.

92. In a printing mechanism, the combination with a platen and strip feeding devices, of an operating mechanism therefor, a pinion connecting the platen and feeding devices with the operating mechanism, and a "no sale" key for bodily moving the pinion to disconnect the platen and feeding devices from the operating mechanism.

93. In a printing mechanism, the combination with a platen and strip feeding devices, of an operating mechanism therefor, a pivoted arm and a pinion mounted thereon for connecting the platen and feeding devices to the operating mechanism, an eccentric for moving the arm carrying the pinion to connect or disconnect the platen and feeding devices from the operating mechanism, and a "no sale" key for operating the eccentric.

94. In a printing mechanism, the combination with a platen and strip feeding devices, of an operating mechanism therefor, a bell crank lever and a pinion mounted on one arm thereof for connecting the platen and feeding devices to the operating mechanism, an eccentric for moving the bell crank carrying the pinion to connect or disconnect the platen and feeding devices for the operating mechanism, the other arm of the bell crank being constructed to lock the platen and feeding devices when disconnected from the operating mechanism, and a "no sale" key for operating the eccentric.

95. In a printing mechanism, the combination with a type carrier, of means for taking several impressions therefrom on a check strip and feeding the latter between the taking of impressions, and perforating mechanism, with means for moving it transversely of the check feeding means for perforating the check between the impressions.

96. In a printing mechanism, the combination with a type carrier, of means for taking a plurality of impressions therefrom on a check strip and feeding the strip between the taking of the impressions, and means independent of the feeding means for perforating the check between the impressions.

97. In a printing mechanism, the combination with a type carrier, of means for taking a plurality of impressions therefrom on a check strip, feeding means for the check strip, means independent of the feeding means for perforating the check, and means for moving the perforating means into contact with the check strip.

98. In a printing mechanism, the combination with a type carrier, of means for taking a plurality of impressions therefrom on a check strip, feeding means for perforating the check strip, and means for moving the perforating means into contact with the check strip and then transversely of the same to perforate it between the impressions.

99. In a printing mechanism, the combination with a type carrier, of means for taking a plurality of impressions therefrom on a check strip, feed rollers for the check strip, perforating rollers for the check strip, and cams for moving the perforating rollers into contact with the check strip and then transversely of the same to perforate it between the impressions.

100. In a printing mechanism, the combination with a type carrier, of means for taking an impression therefrom on a check strip, feeding and severing means for said strip, and ejecting mechanism having a gripping device constructed to grip the severed check and carry it to an accessible position.

101. In a printing mechanism, the combination with a type carrier, of means for taking an impression therefrom on a check strip, feeding and severing means for said strip, ejecting mechanism having a gripping device constructed to grip the severed check and carry it to a position accessible to the operator, and means for removing the check from the gripping device.

102. In a printing mechanism, the combination with a type carrier, of means for taking an impression therefrom on a check strip, feeding and severing means for said strip, an ejecting mechanism having a gripping device, and means for operating the latter to grip and discharge the check.

103. In a printing mechanism, the combination with a type carrier, of means for taking an impression therefrom on a check strip, feeding and severing means for said strip, an ejecting mechanism, and means for moving the latter mechanism transversely of the feeding means to receive the severed check and carry it to an accessible position.

104. In a printing mechanism, the combination with a type carrier, of means for taking an impression therefrom on a check strip, an ejecting mechanism including a gripping device, and means for operating the ejecting mechanism and rocking the gripping device to grip the severed check and discharge it.

105. In a printing mechanism, the combination with an operating mechanism, of a plurality of type carriers differentially adjusted thereby, each carrier having two series of type, platens, one for each series of type, for taking impressions on a record strip and a check strip, the check strip platen being operated twice to take impressions at each operation of the operating mechanism, a frame and two ink pads carried thereby, one for each series of type, and operated by the platens to ink the type in printing position, means for feeding the record and check strip, a device for perforating the latter strip between the impressions thereon, knives for severing the check strip, and ejecting mechanism for the severed check constructed to move transversely of the check feeding means to receive the severed check and carry it to an accessible position.

106. In a printing mechanism, the combination with an operating mechanism, of a plurality of type carriers differentially adjusted thereby, each carrier having two series of type, platens, one for each series of type, for taking impressions on a second strip and a check strip, the check strip platen being operated twice to take impressions on each operation of the operating mechanism, a frame and two ink pads carried thereby, one for each series of type, and operated by the platens to ink the type in printing position, means for feeding the record and check strip, a device movable transversely of the check feeding means for perforating the check, knives for severing the check strip, and an ejecting mechanism for the severed check.

107. In an accounting machine, the combination with an operating mechanism, of a differentially movable element normally disconected therefrom, a single device constructed to be operated positively to connect said element with said operating mechanism, and a plurality of keys for operating said device before the operation of the operating mechanism is begun to connect positively the operating mechanism and said element and for controlling the movement imparted to the latter by the operating mechanism.

108. In an accounting machine, the combination with an operating mechanism, of a differentially movable element normally disconnected therefrom and constructed to be positively connected thereto, manipulative means for effecting the positive connection of the operating mechanism with the movable element before the operation of the operating mechanism is begun, for controlling the extent of movement imparted to the element by the operating mechanism and the disconnection of said element and the operating mechanism.

109. In an accounting machine, the combination with a main operating mechanism, of a totalizer, actuating mechanism therefor normally out of engagement therewith and driven by the operating mechanism, a manipulative device for controlling the movement of said totalizer into engagement with said actuating mechanism preliminarily to the operation of the operating mechanism, and means operated by the main operating mechanism for moving said totalizer out of engagement with said actuator.

110. In an accounting machine, the combination with a main operating mechanism, of a totalizer, actuating mechanism therefor, normally out of engagement therewith, and driven by the operating mechanism, a manipulative device for positively moving said totalizer into engagement with said actuating mechanism, preliminarily to the operation of the operating mechanism, and means operated by the operating mechanism for moving said totalizer out of engagement with said actuating mechanism.

111. In an accounting machine, the combination with a totalizer, of actuating devices therefor, moving means for said totalizer, and two independently operable means, one of said means serving to operate the moving means to move the totalizer into engagement with the actuating devices and the other serving to operate the moving means to move the totalizer out of engagement with the actuating devices.

112. In an accounting machine, the combination with a totalizer, of actuating devices therefor, means for normally holding the totalizer out of engagement with the actuating devices, moving means for the totalizer, and two independently operable means, one of said means serving to move the holding means out of holding position and to operate the holding means to move the totalizer into engagement with the actuating devices, the other means serving to operate said moving means to move the totalizer out of engagement with the actuating devices.

113. In an accounting machine, the combination with a totalizer, of actuating devices therefor, moving means for the totalizer, and two independently operable means, one of said means serving to operate said moving means to move the totalizer positively into engagement with the actuating devices, the other means serving to operate said moving means to move the totalizer positively out of engagement with the actuating devices.

114. In an accounting machine, the combination with a totalizer, of actuating devices therefor, means for moving the totalizer into and out of engagement with the actuating devices, manipulative means for operating said moving means to move the totalizer into engagement with the actuating devices, a movable device carrying the moving means and operated to move the moving means and thereby move the totalizer out of engagement with the actuating devices, and operating means for operating said movable device.

115. In an accounting machine, the combination with a totalizer, of actuating devices therefor, means for moving the totalizer into and out of engagement with the actuating devices, the said means having a pivotal movement to engage the totalizer and actuating devices and a bodily and pivotal movement to disengage the totalizer and actuating devices, manipulative means for giving said moving means its pivotal movement, and operating means for giving said moving means its pivotal and bodily movement.

116. In an accounting machine, the combination with a main operating mechanism, of a totalizer comprising a plurality of movable elements, a movable frame carrying said totalizer, actuating devices for said elements, means for holding the movable elements of said totalizer out of operative relation with the actuating devices, and manipulative means operable independently of the operating mechanism for operating the holding means and positively moving the movable elements into engagement with the actuating devices.

117. In an accounting machine, the combination with a main operating mechanism, of a totalizer, actuating devices therefor, a movable frame carrying said totalizer, a latch holding the totalizer out of engagement with the actuating devices, and manipulative means operable independently of the operating mechanism for positively withdrawing the latch and moving the totalizer into engagement with the actuating devices.

118. In an accounting machine, the combination with a main operating mechanism, of a totalizer, actuating devices for the totalizer, a movable frame carrying said totalizer, a latch for holding the totalizer out of engagement with the actuating devices, a lever for moving the totalizer into engagement with said actuating devices, and manipulative means, operable independently of said operating mechanism for positively operating the latch and lever.

119. In an accounting machine, the combination with an operating mechanism, of differential means driven thereby, two totalizers either of which may be brought into engagement with the differential means, manipulative means for each totalizer, controlling the engagement of the corresponding totalizer with the differential means preliminarily to the operation of the operating mechanism, and means controlled by the manipulative means for one totalizer for positively preventing the engagement of the totalizer controlled by the other manipulative means regardless of the movement of the latter means.

120. In an accounting machine, the combination with an operating mechanism, of two totalizers, actuating means for the totalizers, either of which may be brought into engagement with the latter, manipulative means for each totalizer, operated independently of the operating mechanism for effecting the engagement of the corresponding totalizer with the actuating means, and means actuated by the manipulative means for one totalizer for positively locking the totalizer controlled by the other manipulative means out of engagement with the actuating means regardless of the movement of the last mentioned manipulative means.

121. In an accounting machine, the combination with a plurality of totalizers, of actuating means therefor normally out of engagement therewith, manipulative means for each totalizer, for moving the corresponding totalizer into engagement with the actuating means, and common means for moving the totalizers out of engagement with the actuating means.

122. In an accounting machine, the combination with a plurality of totalizers, of actuating mechanism therefor, normally out of engagement therewith, manipulative devices, one for each totalizer for positively moving the latter into engagement with said actuating mechanism, and common means for positively moving the totalizers out of engagement with the actuating mechanism.

123. In an accounting machine, the combination with a plurality of totalizers, of a common actuating mechanism therefor, normally out of engagement therewith, a plurality of members, one for each totalizer, connected to their corresponding totalizers, of manipulative devices, one for each totalizer for operating said members to move their corresponding totalizers into engagement with said actuating mechanism, and an element common to all of said members for operating the latter to move the totalizers out of engagement with the actuating mechanism.

124. In an accounting machine, the combination with a main operating mechanism, of a plurality of totalizers, a common actuating mechanism for the totalizers operated by the main operating mechanism, and normally out of engagement with the totalizers, a plurality of members, one for each totalizer, manipulative devices, one for each member, for operating the latter to move their corresponding totalizers into engagement with said actuating mechanism, and an element common to all of said members and operated by the main operating mechanism, for operating the members to move the totalizers out of engagement with the actuating mechanism.

125. In an accounting machine, the combination with a main operating mechanism, of a plurality of totalizers, actuating mechanism therefor, the totalizers being normally out of engagement therewith, manipulative devices, one for each totalizer, for positively effecting the movement of the totalizers into engagement with the actuating mechanism preliminarily to the operation of the operating mechanism, and a member operated by the operating mechanism for effecting a positive movement of the totalizers out of engagement with the actuating mechanism.

126. In an accounting machine, the combination with a main operating mechanism, of means differentially actuated thereby, a totalizer normally out of engagement with the differential means, a manipulative device for moving said totalizer into engagement with said differential means, a resetting device for the totalizer, means operated by the main operating mechanism for actuating the resetting device and normally out of operative relation therewith, and a manipulative device for moving the resetting device into operative relation to the operating mechanism.

127. In an accounting machine, the combination with a plurality of totalizers, of common differential mechanism therefor, operating mechanism for the differential mechanism, manipulative devices, one for each totalizer, for moving the totalizers into engagement with the differential mechanism, resetting devices, one for each totalizer, means for operating said resetting devices and normally out of operative relation therewith, and manually operated devices, one for each re-setting device, for establishing operative relation between the resetting devices and the operating means for the resetting devices.

128. In an accounting machine, the combination with a plurality of totalizers, of a common actuating mechanism therefor, manipulative devices, one for each totalizer, for moving the totalizers into engagement with the actuating mechanism, resetting devices, one for each totalizer, means for operating said resetting devices, and normally out of operative relation therewith, and manually operated devices, one for each resetting device for positively moving the resetting device into operative relation with said operating means.

129. In an accounting machine, the combination with a main operating mechanism, of a plurality of totalizers, differential mechanism for the totalizers driven by the operating mechanism, a plurality of resetting devices, one for each totalizer, actuating means for the resetting devices, normally out of operative relation with both the operating mechanism and the resetting devices, a manipulative device for establishing operative relation with the actuating means of the operating mechanism, and manually operated means for establishing operative relation between the actuating means and the resetting devices.

130. In an accounting machine, the combination with a main operating mechanism, of a plurality of totalizers, differential mechanism for the totalizers, driven by the main operating mechanism, a plurality of resetting devices, one for each totalizer, actuating means for the resetting devices, normally out of operative relation with both the resetting devices and the operating mechanism, a manipulative device for establishing operative relation between the actuating means and the operating mechanism, and manually operated devices, one for each resetting device, for establishing an operative relation between the actuating means and the resetting devices, one or more of said normally operated devices being capable of operation so that any number of said totalizers may be reset to zero at the same operation of the machine.

131. In an accounting machine, the combination with a member having a normal position, of a spring for retaining said member in normal position, operating mechanism for operating said member, and a manipulative device which when operated first disables said spring and then operates said member.

132. In an accounting machine, the combination with a totalizer, of actuating devices therefor, the totalizer being normally out of engagement therewith, means for moving the totalizer into engagement with the actuating devices, a device for moving the totalizer out of engagement with the actuating devices and having a normal position, a spring for retaining said device in normal position, operating means for operating said moving device, and a manipulative device which when operated disables said spring and operates said device to prevent movement of the totalizer into engagement with the actuating devices.

133. In a machine of the class described, the combination with a main driving mechanism and amount determining keys, of a segment gear designed to be differentially moved by the main driving mechanism under control of the keys, a sliding plate actuated by said keys, and elements operated by the sliding plate to positively connect the segment gear with said driving mechanism when any of the amount determining keys are pressed in.

134. In a machine of the class described, the combination with a main driving mechanism and value determining keys, of a segment gear to be differentially moved by the main driving mechanism under control of the value determining keys, a sliding plate actuated by said keys, and an arm operated by the sliding plate in such a manner as to positively connect the aforesaid segment gear with the main driving mechanism when one of the value determining keys is pressed.

135. In a machine of the class described, the combination with a main operating mechanism and amount determining keys, of a member to be moved differentially by the operating mechanism under control of the keys, a bell crank lever, an arm, and a sliding plate actuated by the said amount determining keys to operate the arm in connection with the bell crank lever in such a way as to positively connect the differentially moved member with the main operating mechanism.

136. In an accounting machine, the combination with an invariably movable driving member, of a driven member normally disconnected therefrom, manipulative devices controlling the connection and disconnection of the driving and driven members, an indicator, connections between the driven member and the indicator, and means for moving said connections to position the indicator to display a character indicative of the extent of movement imparted to the driven member by the driving member and after the former member has been adjusted by the latter member.

137. In an accounting machine, the combination with an invariably movable driving member, of a driven member normally disconnected therefrom, manipulative devices controlling the connection and disconnection of the driving and driven members, an indicator, connections between the driven member and the indicator, and means for directly moving the indicator, through the connections, from one position to another to display a character indicative of the extent of movement imparted to the driven member by the driving member and after the former member has been adjusted by the latter member.

138. In an accounting machine, the combination with a driving member, of a driven member normally disconnected therefrom, manipulative devices controlling the connection and disconnection of the driving and driven members, an indicator, connections between the driven member and the indicator through which connections the position to be taken by the indicator is predetermined by the driven member, and invariably moved means for adjusting said connections and thereby moving the indicator to said predetermined position.

139. In an accounting machine, the combination with an invariably movable driving member, of a member to be differentially driven by the driving member but normally disconnected therefrom, manipulative devices controlling the connection and disconnection of the driving and driven member, an indicator, connections between the driven member and the indicator through which connections the position to be subsequently taken by the indicator is predetermined by the position to which the driven member is differentially driven, and invariably moved means for adjusting said connections and thereby moving the indicator to said predetermined position.

In testimony whereof I affix my signature in the presence of two witnesses.

JOSEPH P. CLEAL.

Witnesses:
D. S. TOVELL,
H. M. CHRISTMAN.

DISCLAIMER.

1,142,079.—*Joseph P. Cleal*, Toronto, Canada. CASH REGISTER. Patent dated June 8, 1915. Disclaimer filed July 23, 1926, by the assignee by mesne assignments, *The National Cash Register Company*.

Hereby enters this disclaimer to that part of the claims in said specification which is in the following words, to wit:

"91. In a printing mechanism, the combination with a platen and strip feeding devices, of an operating mechanism therefor normally connected therewith, and a manipulative device for positively disconnecting the platen and feeding devices from the operating mechanism."

[*Official Gazette August 24, 1926.*]